(12) United States Patent
Haworth

(10) Patent No.: US 8,081,111 B2
(45) Date of Patent: Dec. 20, 2011

(54) METHOD AND APPARATUS FOR LOCATING THE SOURCE OF AN UNKNOWN SIGNAL

(75) Inventor: David Patrick Haworth, Malvern (GB)

(73) Assignee: Kratos Defense and Security Solutions, Inc., San Diego, CA (US)

( * ) Notice: Subject to any disclaimer, the term of this patent is extended or adjusted under 35 U.S.C. 154(b) by 0 days.

(21) Appl. No.: 12/312,159

(22) PCT Filed: Oct. 29, 2007

(86) PCT No.: PCT/GB2007/004100
§ 371 (c)(1),
(2), (4) Date: Apr. 28, 2009

(87) PCT Pub. No.: WO2008/053173
PCT Pub. Date: May 8, 2008

(65) Prior Publication Data
US 2009/0278733 A1    Nov. 12, 2009

(30) Foreign Application Priority Data

Oct. 28, 2006  (GB) .................................. 0621486.0

(51) Int. Cl.
  *G01S 3/02* (2006.01)
  *G01S 19/03* (2010.01)
(52) U.S. Cl. ..................................... 342/451; 342/357.4
(58) Field of Classification Search ............... 342/357.4, 342/432, 444, 451, 453
See application file for complete search history.

(56) References Cited

U.S. PATENT DOCUMENTS 6,018,312 A    1/2000  Haworth
6,618,009 B2   6/2002  Griffin et al.

OTHER PUBLICATIONS

Griffin C et al: "Interferometric radio-frequency emitter location" IEE Proceedings: Radar, Sonar & Navigation, Institution of Electrical Engineers, GB, vol. 149, No. 3, Jun. 3, 2002, p. 153-160, XP006018390.*

* cited by examiner

*Primary Examiner* — Dao Phan
(74) *Attorney, Agent, or Firm* — Lumen Patent Firm

(57) ABSTRACT

A method of locating the source of an unknown signal is provided that includes calculating a differential offset for a signal for each of a plurality of positions within a region in which the transmitter must lie, for each of a series of times m with respect to first and second signal relays and respective first and second receivers, the positions of the signal relays and receivers being known, generating a cross-ambiguity function (CAF) using data corresponding to samples of the unknown signal received at the first and second receivers via the first and second signal relays respectively, estimating the level of noise in the CAF, and using this data to obtain a measure of the likelihood that the source is located within defined areas within the region, where the differential offsets are differential time offsets, or differential frequency offsets, or both. The method provides location which is unconditionally convergent.

30 Claims, 35 Drawing Sheets

DF0 error =1 mHz

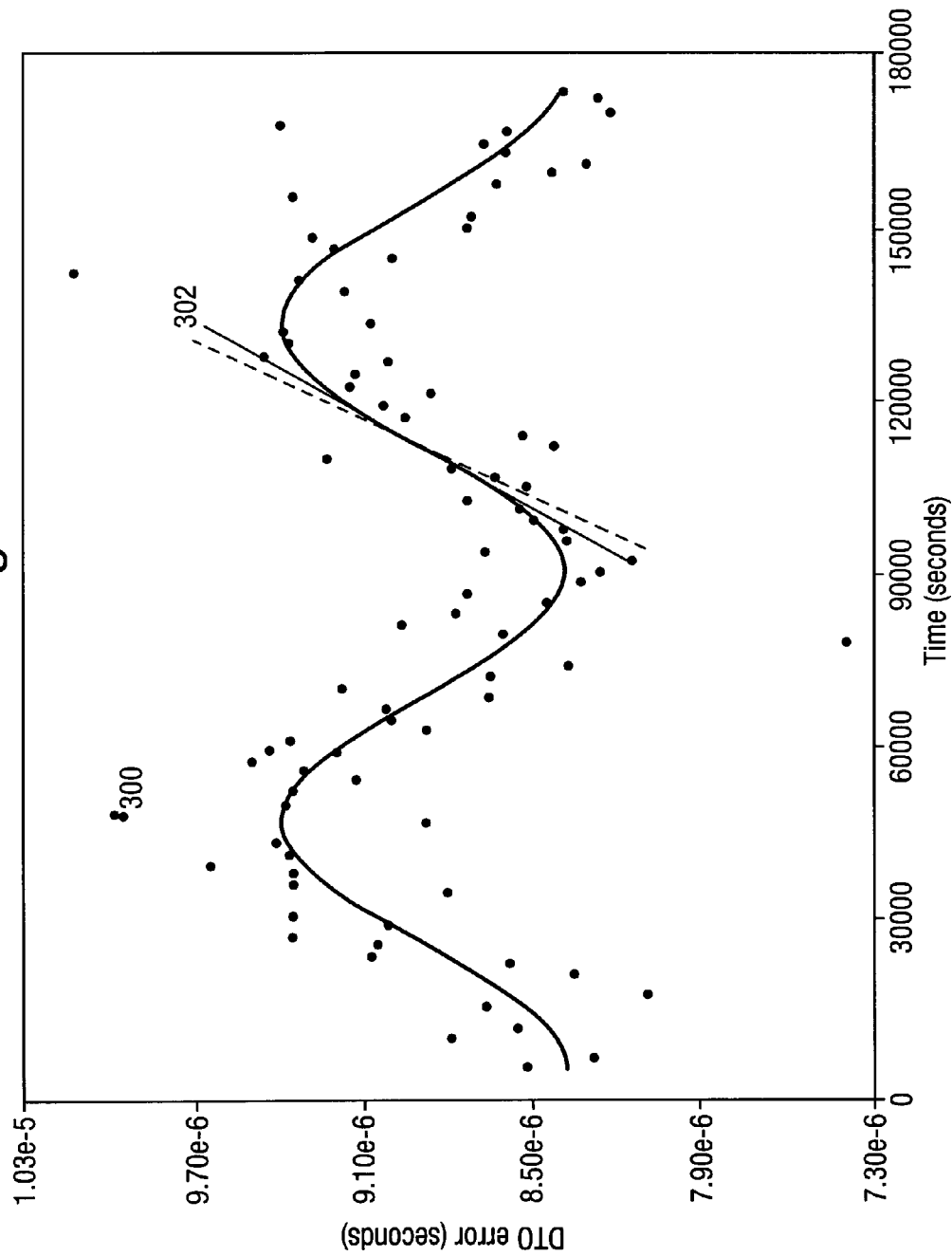

Fig.21a.

| m= | i= | Tar | Cal 350 | fR (MHz) | fC (MHz) | DTOdot (C) (μs/s) | DTO (μs) | FDOA_n (Hz) |
|---|---|---|---|---|---|---|---|---|
| 1 | 1 | Rome 356 | Defford | 14.069.494 | 14078.7 | -7.3495E-04 | 73.61 | -0.4792 |
|   | 2 | Beirut 352 | Defford | 14034.678 | 14078.7 | -7.3495E-04 | 472.75 | -1.11821 |
|   | 3 | Yerevan 354 | Defford | 14013.935 | 14078.7 | -7.3495E-04 | 549.76 | -1.07605 |
| 2 | 1 | Rome | Defford | 14.069.494 | 14078.7 | -1.2083E-03 | 71.86 | -0.65625 |
|   | 2 | Beirut | Defford | 14034.678 | 14078.7 | -1.2083E-03 | 471.00 | -1.41776 |
|   | 3 | Yerevan | Defford | 14013.935 | 14078.7 | -1.2083E-03 | 548.01 | -1.18522 |
| 3 | 1 | Rome | Defford | 14.069.494 | 14078.7 | -1.6077E-03 | 69.31 | -0.78129 |
|   | 2 | Beirut | Defford | 14034.678 | 14078.7 | -1.6077E-03 | 468.45 | -1.60205 |
|   | 3 | Yerevan | Defford | 14013.935 | 14078.7 | -1.6077E-03 | 545.46 | -1.19452 |
| 4 | 1 | Rome | Defford | 14.069.494 | 14078.7 | -2.0537E-03 | 62.55 | -0.8475 |

| Remote Station | Mean measured TDOA (ms) |
|---|---|
| Rome | 0.2 |
| Beirut | 0.599 |
| Yerevan | 0.676 |
| Tangier | -0.113 |
| Oil Rig | 0.069 |
| Toulouse | 0.027 |

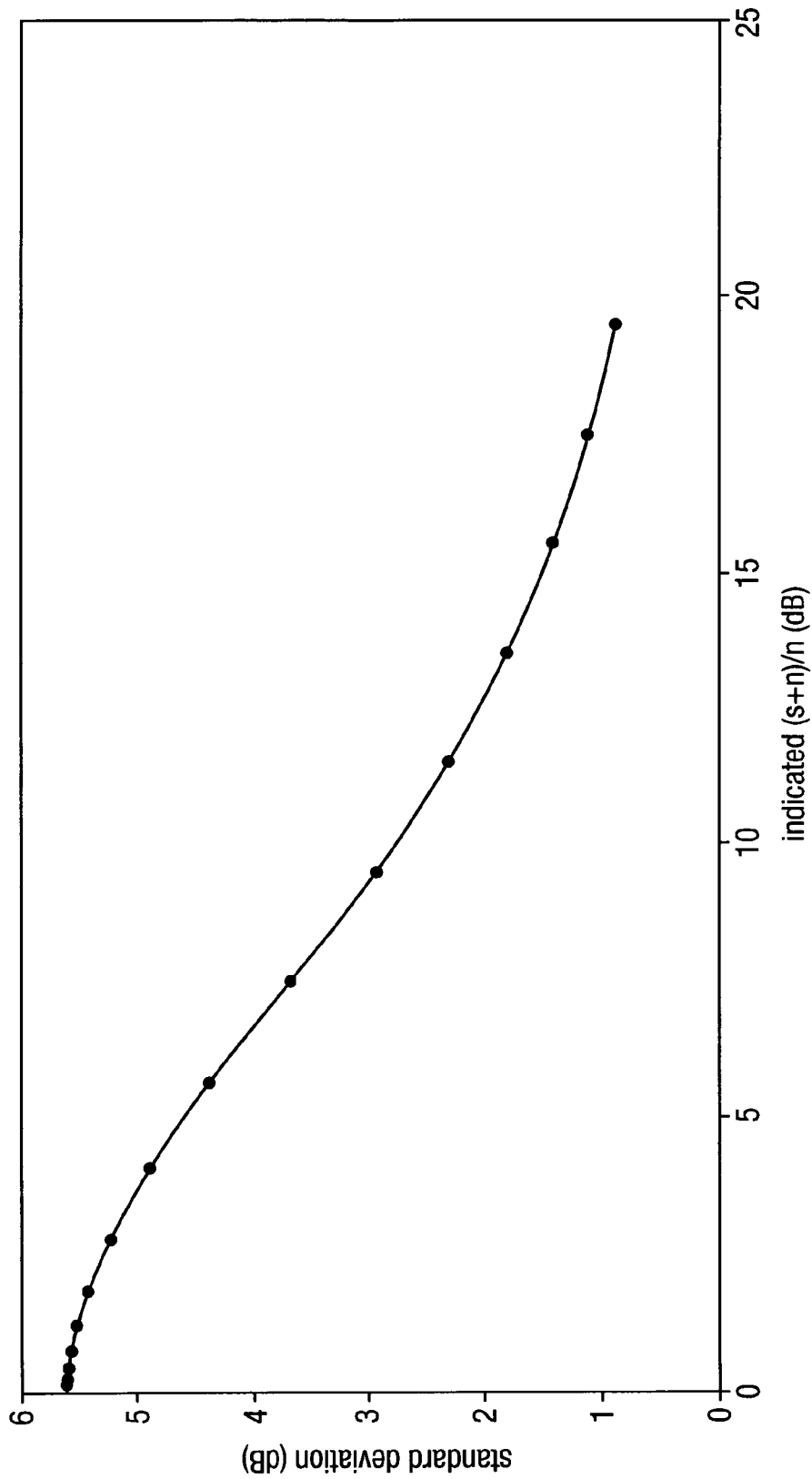

Actual standard deviation

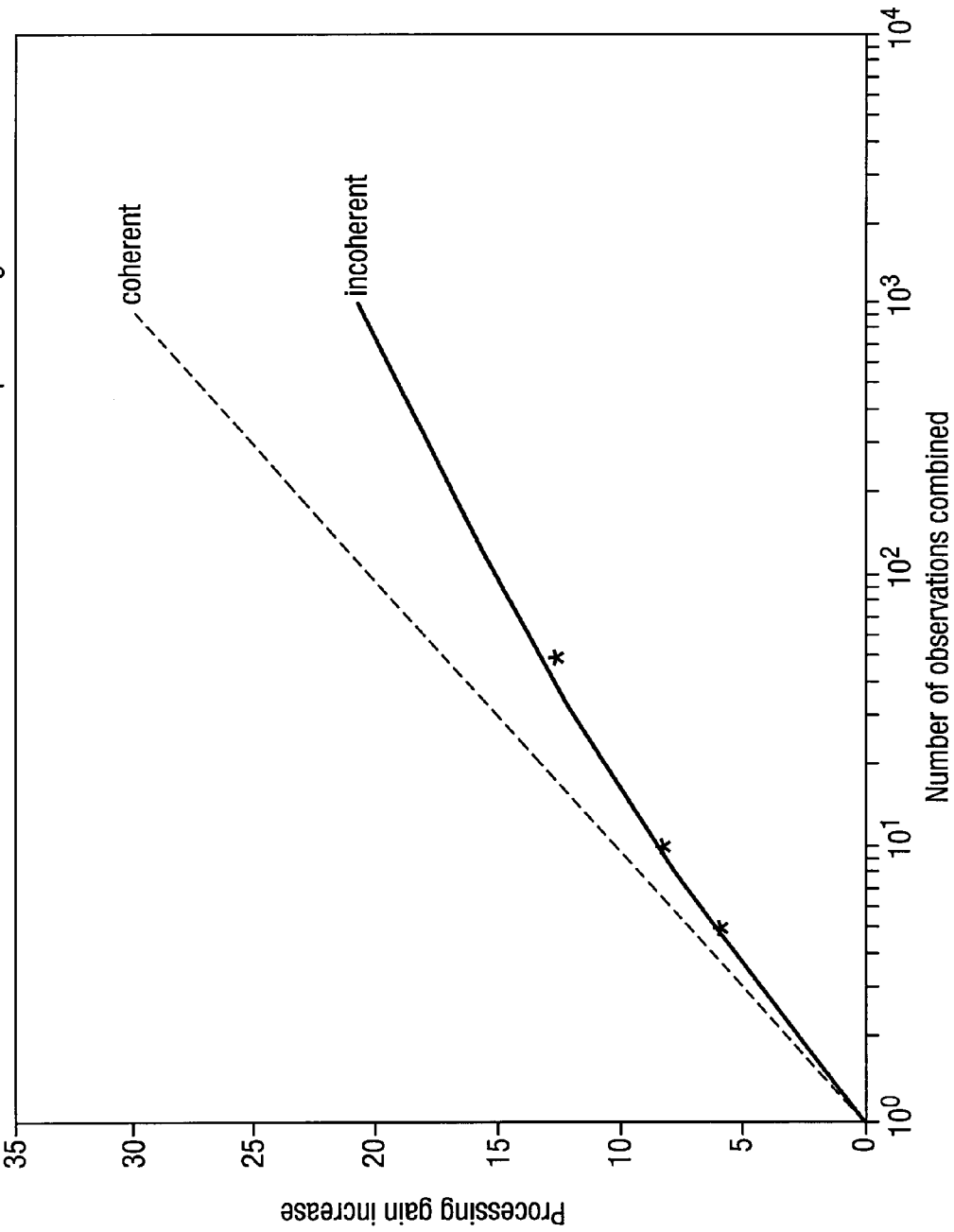

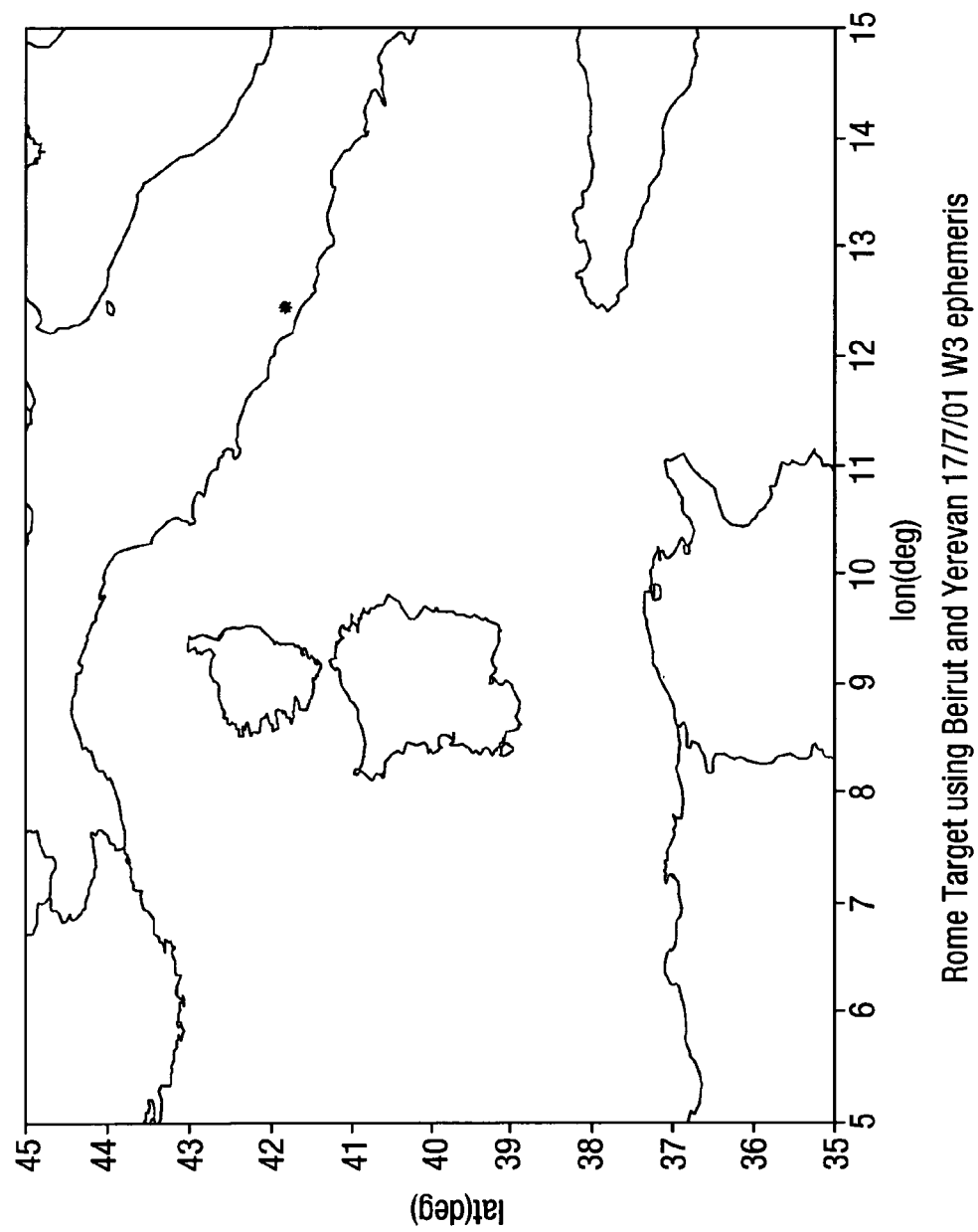

METHOD AND APPARATUS FOR LOCATING THE SOURCE OF AN UNKNOWN SIGNAL

The invention relates to apparatus and method for locating the source of an unknown signal.

There is an increasing need to accurately locate unknown transmitters which interfere with the uplinks to geosynchronous satellite communications systems. A number of techniques are theoretically possible to locate a transmission by directly detecting the uplink transmission, e.g. using one or more aircraft. The prior art has evolved to make use of the signals on the satellite downlink to estimate the location of the interference.

Early work in the US (MIT LL first report, Hutchinson, W, K, Pelletier, R J, Siegal D A, "RFI-Source Location", MIT LL TN 1979-29 (Rev. 1) 31 March 2000) on satellite systems operating at Ultra High Frequencies (UHF) established that locations of useful accuracy could be achieved using measurements on the downlink of a single satellite, provided that the frequency and/or amplitude of the signal was stable over an extended period of time. However, many real-life situations did not satisfy these criteria.

Work by Chestnut (Chestnut P C, "Emitter location using TDOA and Differential Doppler", IEEE Trans., AES-18, (2), 1982) established that combinations of Time Difference Of Arrival (TDOA) and Frequency Difference Of Arrival (FDOA) of signals received at two or more airborne receivers could be used to geolocate the source of a signal.

Work by Stein (Stein S, "Algorithms for Ambiguity Function Processing, IEEE Trans., ASSP-29, (3), 1981) established techniques for pre-detection correlation processing based on the calculation of the Cross Ambiguity Function (CAF) which enabled TDOA and FDOA to be measured. This technique enabled TDOA and FDOA to be measured even though the signal level may be below the satellite noise level in one or both satellites. Stein describes the process of peak interpolation, processing gain and errors in TDOA and FDOA measurement. Coarse and Fine processing are described. The impact of changing geometry and the subsequent modification of the CAF approach are presented in outline. An a priori approach to measurement error estimation is presented based on measurement of signal parameters on the input to the correlation process.

Subsequent work in the US (MIT LL second report, Kaufmann J E, Hutchinson W K, "Emitter Location with LES −8/9 Using Differential Time-of-Arrival and Differential Doppler Shift", Technical Report 698 (Rev. 1) 31 Mar. 2000) demonstrated the utility of the Chestnut and Stein approaches using pairs of specially equipped satellites operating at UHF at well-separated longitudes and in inclined geosynchronous orbits. This particular orbit configuration was a good match to the type of signals encountered, which were typically narrowband (few kHz wide) signals present on UHF satellite channels. Furthermore the inclined orbit of the satellites could be determined to such an accuracy that the contribution of ephemeris errors to TDOA and especially FDOA was minimal.

The emergence of Captain Midnight alerted the commercial satellite operators to the problem of interference to satellite communication channels (Marcus M J, "Satellite Security: legacy of Captain Midnight", Telecommun., June 1987, pp 61-66).

U.S. Pat. No. 5,008,679 describes a method and system for locating an unknown transmitter. This patent describes the technique of locating an interferer based on the measurement of TDOA and FDOA on the downlinks of an interfered satellite and an adjacent satellite. This technique is particularly applicable to the operation of satellites in the C and Ku bands where adjacent satellites operate with approximately the same translation frequency. Pre-detection cross correlation using a hardware correlator is used to detect signals which are weak in one or both satellite channels. Additionally calibration of satellite transponder frequency drifts in real time by simultaneous observation of transmitters of known location enhanced the accuracy of the determined location. Measurement errors are estimated by determining the variance from multiple measurements ie an a posteriori approach.

U.S. Pat. No. 5,594,452 describes a further method and system for locating an unknown transmitter but using calibrated oscillator phases. In this approach a band of frequencies containing a phase calibration signal and one or more of an unknown signal and position calibrating signals are correlated using a hardware correlator and a phase function derived based on the isolated cross correlation of the phase calibration signal. The phase function is applied to the unknown and possibly other position calibration signals. The application of the phase calibration function sharpens the correlations on the unknown and position calibrating signals and enables a more accurate determination of FDOA, resulting in more accurate locations.

U.S. Pat. No. 6,018,312 describes techniques for overcoming limitations in U.S. Pat. No. 5,008,679 and U.S. Pat. No. 5,594,452 to provide phase and position calibrated transmitter location. The coherent separation of target and reference channels prior to correlation is described as well as the benefits in reduction of ephemeris error in the use of known location reference signals. However, the iterative geolocation method described in U.S. Pat. No. 6,018,312 is not unconditionally convergent for certain geometries. For these geometries, the set of points that possibly satisfy the observations cover an extended region. The iteration process previously disclosed may fail to converge to a viable solution in these circumstances.

It is an object of the invention to provide an improved method for locating the source of an unknown signal. According to a first aspect of the invention, this object is achieve by a method of locating the source of an unknown signal, the method being characterised by the steps of:
  (i) calculating a differential offset for a signal for each of a plurality of positions within a region in which the transmitter must lie, for each of a series of times m with respect to first and second signal relays and respective first and second receivers, the positions of the signal relays and receivers being known;
  (ii) generating a cross-ambiguity function (CAF) using data corresponding to samples of the unknown signal received at the first and second receivers via the first and second signal relays respectively;
  (iii) estimating the level of noise on the CAF; and
  (iv) using data generated in steps (i), (ii) and (iii) to obtain a measure of the likelihood that the source is located within defined areas within said region;
wherein the differential offsets are differential time offsets (DTOs), or differential frequency offsets (DFOs), or both DTOs and DFOs.

In addition to providing reliable location, the method provides an efficient and scalable correlation approach which is not limited by the number of delay circuits in a hardware approach. The method minimises the computer memory storage requirements as well as enabling similar processing speeds as dedicated hardware correlators. A further advantage is that the method allows the use of general purpose Personal Computer architecture to facilitate parallel processing of signals thereby achieving a processing speed increase or the ability to process more signals in a given available time eg to perform ephemeris compensation.

A differential offset for the unknown signal, and its error, may be evaluated with respect to the first and second signal relays and the first and second receivers respectively, at each time m.

Preferably the method comprises the steps of
(i) defining intervals of latitude and longitude in which the source is likely to be located;
(ii) defining a matrix of positions ($\alpha$, $\beta$) within said intervals, each position having latitude $\alpha$ and longitude $\beta$;
(iii) for each position ($\alpha$, $\beta$), calculating a differential offset $D_m(\alpha, \beta)$ for a signal originating at the position ($\alpha$, $\beta$), for each of a series of times m, with respect to first and second signal relays and respective first and second receivers, the positions of the signal relays and receivers being known;
(iv) evaluating the differential offset $D_m$ at each time m for the unknown signal with respect to the first and second relays and the first and second receivers using data corresponding to signal samples obtained from the receivers;
(v) evaluating the error $\sigma_m$ associated with measured values $D_m$ obtained in step (iv);
(vi) for each position ($\alpha$, $\beta$) calculating the value $$\chi^2(\alpha, \beta) = \sum_m \frac{[D_m - D_m(\alpha, \beta)]^2}{\sigma_m^2};$$

(vii) interpolating a minimum value $\chi^2_{min}$ of the values $\chi^2(\alpha, \beta)$; and
(viii) associating positions ($\alpha$, $\beta$) in the matrix for which $\chi^2(\alpha, \beta) = \chi_{min}^2 - 2 \ln(1-P)$ to define a region within which the source of the unknown signal is located with a pre-selected probability P;
wherein the calculated and measured differential offsets are either differential time offsets $DTO_m(\alpha, \beta)$, $DTO_m$ or differential frequency offsets $DFO_m(\alpha, \beta)$, $DFO_m$.

This allows a region, for example on the Earth's surface, to be established within which the source of the unknown signal is located with a pre-selected probability.

Alternatively, the method may comprise the steps of
(i) defining intervals of latitude and longitude in which the source is likely to be located;
(ii) defining a matrix of positions ($\alpha$, $\beta$) within said intervals, each position having latitude $\alpha$ and longitude $\beta$;
(iii) for each position, calculating a differential time offset $DTO_m(\alpha, \beta)$ for a signal originating at the position ($\alpha$, $\beta$), for each of a series of times m, with respect to first and second signal relays and respective first and second receivers, the positions of the signal relays and receivers being known;
(iv) for each position, calculating a differential frequency offset $DFO_m(\alpha, \beta)$ for a signal originating at the position ($\alpha$, $\beta$), for each of a series of times m, with respect to the first and second signal relays and the first and second receivers;
(v) evaluating the differential time offset $DTO_m$ at each time m for the unknown signal with respect to the first and second relays and the first and second receivers using data corresponding to signal samples obtained from the receivers;
(vi) evaluating the differential frequency offset $DFO_m$ of the unknown signal at each time m with respect to the first and second relays and the first and second receivers, using data corresponding to signal samples obtained from the receivers, to generate measurements correlated with those in step (v);
(vii) evaluating errors $\sigma_{\tau m}$, $\sigma_{vm}$ associated with the measured values $DTO_m$ and $DFO_m$ obtained in steps (v) and (vi) respectively and the correlation $\rho_{\tau vm}$ therebetween;
(viii) for each position ($\alpha$, $\beta$) calculating the value $$\chi^2(\alpha, \beta) = \sum_m \frac{\sigma_{vm}^2[DTO_m - DTO_m(\alpha, \beta)]}{(\sigma_{\tau n}^2 \sigma_{vm}^2 - \rho_{\tau vm}^4)} +$$

$$\sum_m \frac{2[DTO_m - DTO_m(\alpha, \beta)][DFO_m - DFO_m(\alpha, \beta)]\rho_{\tau vm}^2 + \sigma_{\tau m}^2[DFO_m - DFO_m(\alpha, \beta)]^2}{(\sigma_{\tau n}^2 \sigma_{vm}^2 - \rho_{\tau vm}^4)}$$

where $\sigma_{\tau m}$ and $\sigma_{vm}$ are the errors associated with the measured values $DTO_m$ and $DFO_m$ obtained in steps (v) and (vi) respectively and $\rho_{\tau vm}$ is the correlation therebetween;
(ix) interpolating a minimum value $\chi^2_{min}$ of the values $\chi^2(\alpha, \beta)$; and
(x) associating positions ($\alpha$, $\beta$) in the matrix for which $\chi^2(\alpha, \beta) = \chi_{min}^2 - 2 \ln(1-P)$ to define a contour within which the source of the unknown signal is located with a pre-selected probability P.

In order to correct for changing positions and velocities of the signal relays, the calculated values $DTO_m(\alpha, \beta)$ and/or $DFO_m(\alpha, \beta)$, as the case may be, are preferably calculated by the steps of:
(i) calculating corresponding values $DSR_m(\alpha, \beta)$ of differential slant range and/or corresponding values $DSRR_m(\alpha, \beta)$ of differential slant range rate using knowledge of the relays' positions and velocities;
(ii) applying respective corrections to values calculated in step (i) to account for ephemeris errors;
(iii) converting the corrected values generated in step (ii) to values of differential time offset $DTO_m(\alpha, \beta)$ and/or differential frequency offset $DFO_m(\alpha, \beta)$ as the case may be.

Corrections $\delta DSR_m(\alpha, \beta)$ to calculated values $DSR_m(\alpha, \beta)$ of differential slant range may be established by the steps of:
(i) temporally interpolating corrections $\delta DSR_m(\alpha_i, \beta_i)$ (i=1 to N) for a time m for each of N ground-based reference transmitters having known locations ($\alpha_i$, $\beta_i$); and
(ii) spatially interpolating a correction $\delta DSR_m(\alpha, \beta)$ for a desired location ($\alpha, \beta$) using the N corrections generated in step (i), where N=3.

The corrections $\delta DSR_m(\alpha, \beta)$ may be obtained by use of two position calibrators and one phase calibrator.

Temporal interpolation of a correction $\delta DSR_m(\alpha_i, \beta_i)$ for the ith reference transmitter for time m is preferably carried out by the steps of:
(i) measuring and calculating differential slant range for said reference transmitter at a series of n times $t_j$ (j=1 to n) and taking the difference between corresponding measured and calculated values to generate a series of j known corrections $\delta DSR_{t_j}(\alpha_i, \beta_i)$ (j=1 to n);
(ii) using data generated in step (i) to obtain
(a) the correction $\delta DSR_{t_0}(\alpha_i, \beta_i)$ and rate of change of correction $[\partial/\partial t][\delta DSR_{t_0}(\alpha_i, \beta_i)]$ at a known origin of time $t_0$; and
(b) in-phase $\delta DSR_I(\alpha_i, \beta_i)$ and quadrature $\delta DSR_Q(\alpha_i, \beta_i)$ components of the sinusoidal oscillation of DSR correction, and hence (c) a general expression for $\beta DSR_t(\alpha_i, \beta_i)$ as a function of time t; and (iii) setting t=m. Preferably n≧4 to allow for noise smoothing and hence greater accuracy in interpolation.

Spatial interpolation of values $\delta DSR_m(\alpha_i, \beta_i)$ (i=1 to N) to generate a correction $\delta DSR_m(\alpha, \beta)$ for a position $(\alpha, \beta)$ is preferably carried out by the steps of:
(i) using the values $\delta DSR_m(\alpha_i, \beta_i)$ to obtain
    (a) a correction $\delta DSR_m(\alpha_0, \beta_0)$ at a known spatial origin $(\alpha_0, \beta_0)$; and
    (b) spatial rates of change of correction $\delta DSR_m$ at the origin $(\alpha_0, \beta_0)$;
(ii) using the results of (i) to obtain a general expression for $\delta DSR_m(\alpha, \beta)$ as a function of position $(\alpha, \beta)$; and
(iii) evaluating $\delta DSR_m(\alpha, \beta)$ for a desired matrix position $(\alpha, \beta)$.

Where the relays are comprised in respective satellites, the spatial rates of change are $$\left.\frac{\partial}{\partial u_y}\delta DSR_m\right|_{\alpha_0,\beta_0} ; \left.\frac{\partial}{\partial u_z}\delta DSR_m\right|_{\alpha_0,\beta_0}$$

$u_y$, $u_z$ being the y and z components respectively of a unit vector from the mean satellite position to a point on the ground in a coordinate system wherein the x axis passes through the centre of the Earth and the mean satellite position, the z axis passes through the centre of the Earth and the North Pole, and the y axis forms a right-handed set together with the x and z axes.

To provide noise smoothing and greater accuracy, the number N of reference transmitters is preferably greater than four, and even more preferably much greater than four.

Corrections $\delta DSRR_m(\alpha, \beta)$ to calculated values $DSRR_m(\alpha, \beta)$ of differential slant range rate may be established using like methods.

Conveniently, measured values $DTO_m$ of differential time offset and/or measured values $DFO_m$ of differential frequency offset are obtained by converting corresponding measured values $DSR_m$ of differential slant range and/or corresponding values $DSRR_m$ of differential slant range rate respectively.

Practically, measured values $DSRR_m$ of differential slant range rate are more easily obtained by measuring them relative to the differential slant range rate of a ground-based calibration transmitter of known location. In this case, calculated values $DSRR_m(\alpha, \beta)$ are calculated relative to this differential slant range rate.

Values of DTO and/or DFO for the unknown signal are conveniently obtained by cross-ambiguity function (CAF) processing. This may be achieved by first finding a DTO value and a coarse DFO value for a reference transmitter of known location by the steps of:
(i) sampling the reference signal at the first and second receivers respectively at a series of times to generate first and second signal samples of the reference signal;
(ii) applying a frequency offset to the second signal sample;
(iii) applying each of a series of time offsets to the second signal samples and calculating a cross-ambiguity function (CAF) for the first and second signal samples for each time offset;
(iv) applying further frequency offsets to the second signal samples and repeating step (iii) for each such offset; and
(v) finding the values of time offset and frequency offset corresponding to the largest CAF value.

DTO and DFO values for the unknown signal may then be obtained by the steps of:
(i) sampling the unknown signal at the first and second receivers respectively at a series of times to generate pluralities first and second signal samples of the unknown signal;
(ii) frequency-shifting and time-shifting the second signal sample with respect to the first by applying the coarse DFO and DTO of the reference signal; and
(iii) evaluating the CAF for a series of time and frequency offsets.

The computational resources needed for CAF processing are much reduced if the CAF processing is carried out by the steps of
(i) sampling the signal at the first and second receivers respectively to generate first and second signal samples;
(ii) dividing the first and second signal samples into first and second series of data blocks;
(iii) taking a pair of data blocks, the pair having a first data block from the first series and a corresponding second data block from the second series;
(iv) applying a frequency offset to data in the second data block;
(v) transforming data in the first and second data blocks to the frequency domain by applying a FFT;
(vi) applying a time offset to data in the second data block;
(vii) multiplying the complex conjugate of data in the first block and corresponding data in the second block to form a third block of data;
(viii) transforming data in the third block into the time domain by applying an inverse FFT to each block; and
(ix) repeating steps (iii) to (viii) for remaining pairs of data blocks, each pair having a first data block from the first series and a corresponding second data block from the second series.

For example, the CAF processing may be carried out using a standard personal computer.

Location of the unknown signal may also be performed using the steps of:
(i) for each of a series of times m, sampling the unknown signal at first and second receivers via first and second signal relays respectively;
(ii) generating a corresponding series of m CAF surfaces;
(iii) for a given latitude $\alpha$ and longitude $\beta$, computing differential time and frequency offsets $DTO_m$, $DFO_m$ at each time m, finding the associated CAF surface value $CAF_m$ at each time m, and corresponding values $SNR_m$ of signal-to-noise ratio; and
(iv) evaluating the chi-squared value $$\chi^2(\alpha, \beta) = -\sum_m SNR_m CAF_m.$$

Phase-noise degradation of correlation in the DFO direction during CAF processing may be reduced by carrying out the steps of:
(i) applying a weighting factor of a low linear level to points outside a window surrounding the peak on a CAF surface generated from samples of the signal originating at a given position, to generate a modified CAF function;
(ii) applying an FFT to the frequency domain and an inverse FFT to the time domain of the modified CAF function and a CAF function generated from samples of the unknown signal to generate surfaces $\tilde{A}_R(f,t), A_U(f,t)$ respectively;

(iii) generating the product function $p(f,t)=\tilde{A}_R^*(f,t)A_U(f,t)$;

(iv) applying to the function p(f,t) an inverse FFT to the delay domain and an FFT to the frequency domain to generate a normalised CAF; and (v) using the normalised CAF to find time- and frequency-difference of arrival for the unknown signal and measurement errors associated therewith.

Changes in DTO and DFO values resulting from movement of the signal relays may be compensated for carrying out the steps of:

(i) introducing a variable delay into time-offsets used to calculate a CAF function; and (ii) estimating a total phase for respective signal paths via the first and second signal relays at specific block times based on the given position.

The invention also provides apparatus for locating the source of an unknown signal, the apparatus being arranged to execute a method of the invention.

Embodiments of the invention are described below by way of example only and with reference to the accompanying drawings in which:

FIGS. 14a & 14b illustrate typical errors between calculated and measured values of Differential Time Offset (DTO) and ∂DTO/∂t respectively;

FIGS. 21a & 21b illustrate measurement of reference and unknown signals for use in emphemeris correction;

Figure 24A:
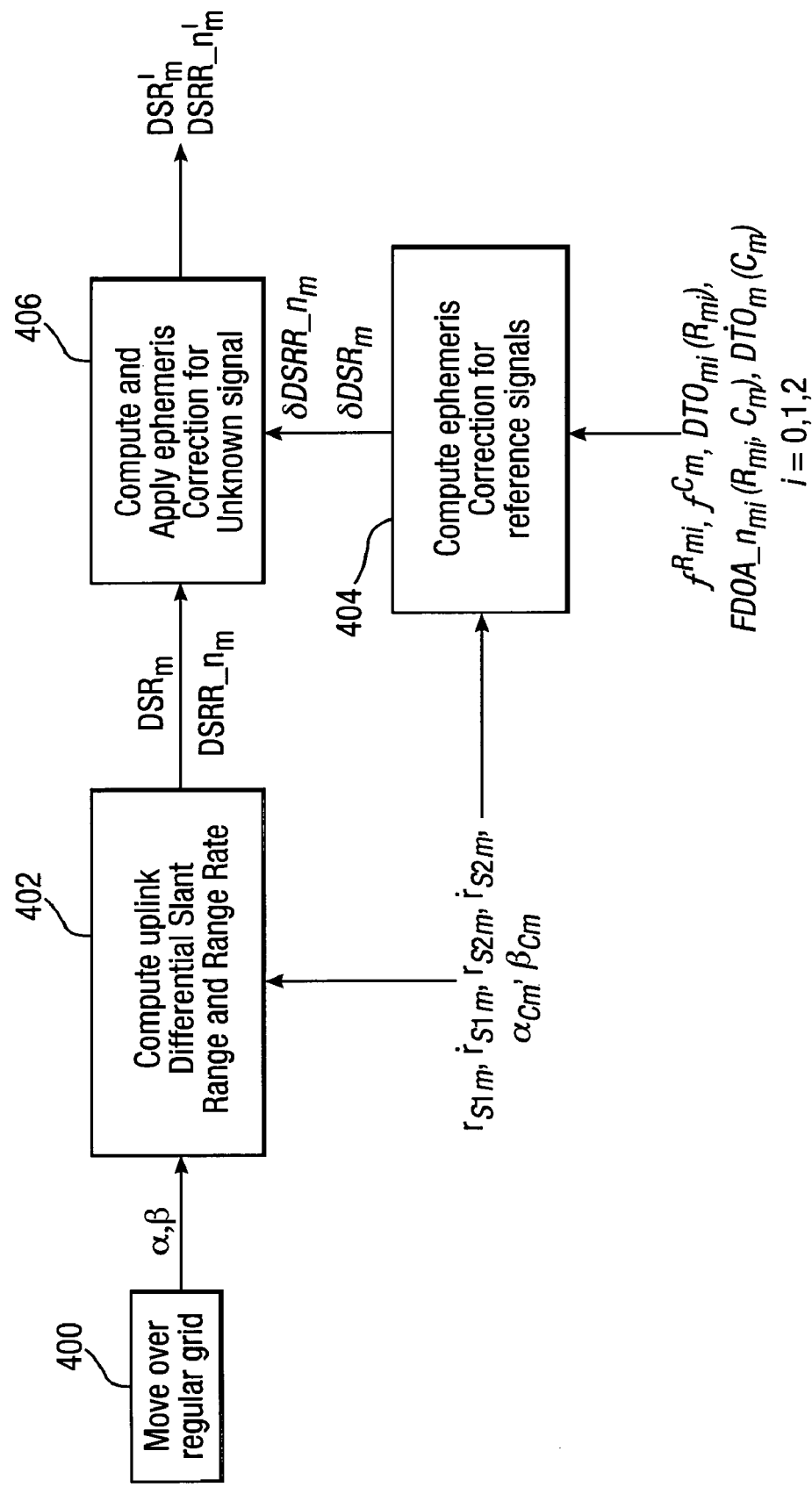
Figure 24B:
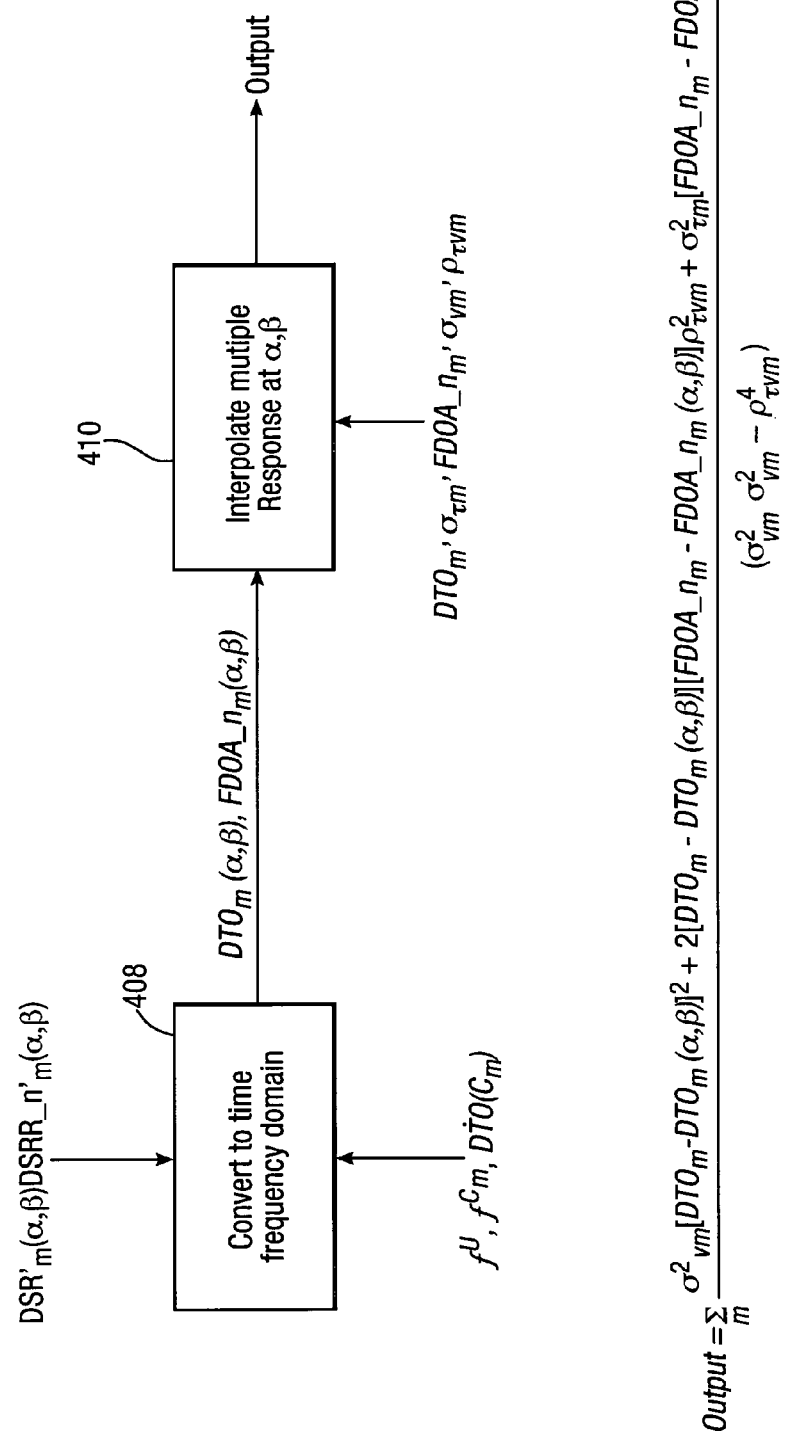
Figure 25A:
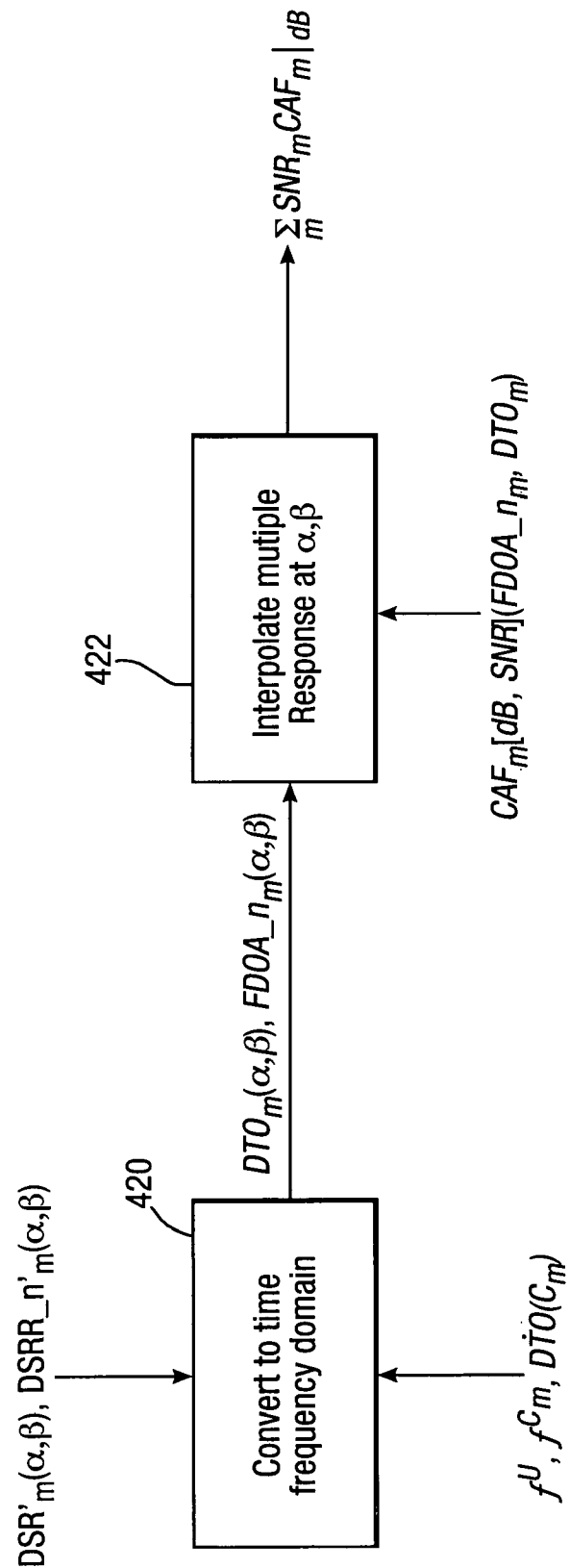
Figure 25C:
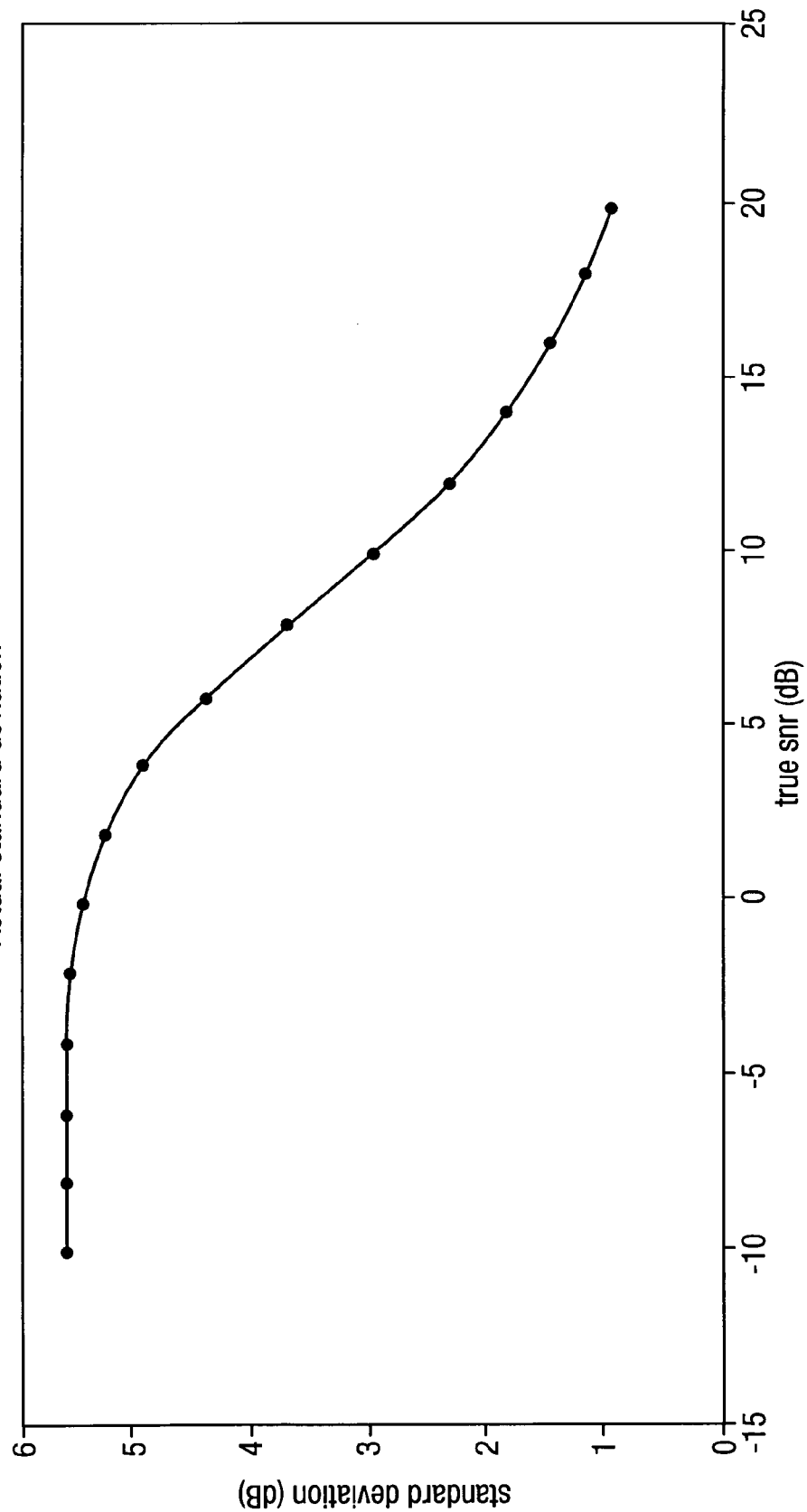
Figure 26A:
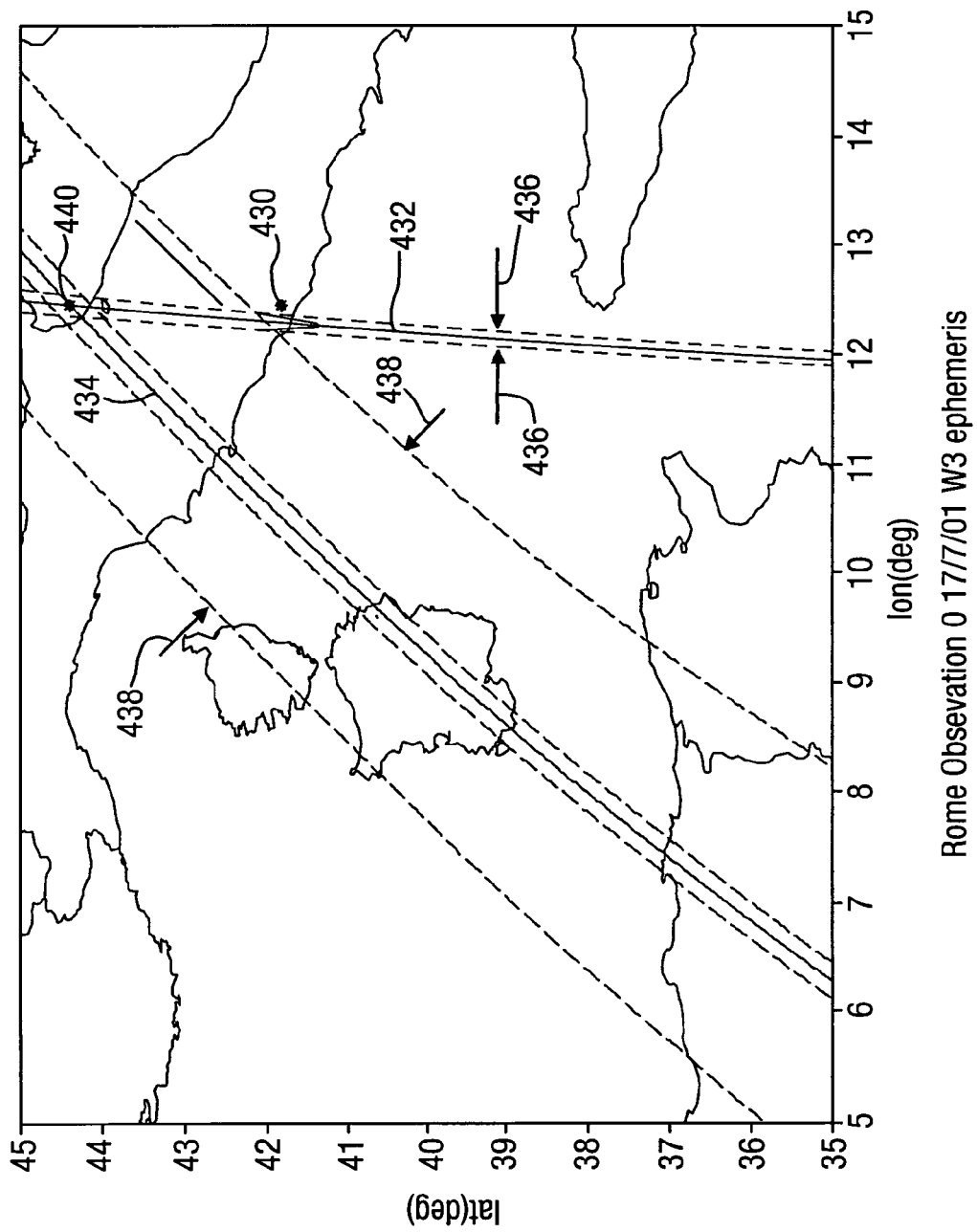
Figure 26C:
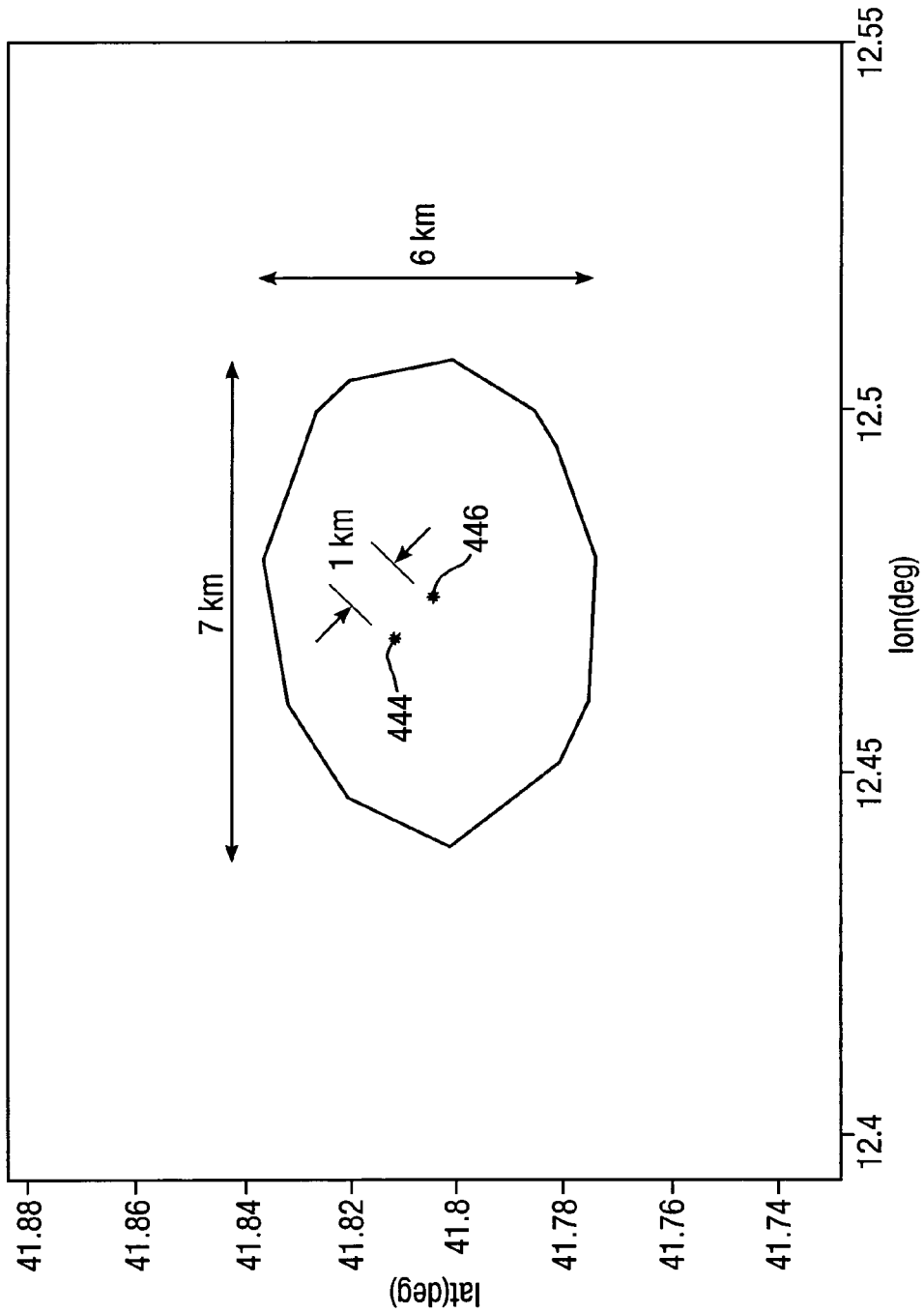

FIGS. 24a&b & 25a-d show steps in geolocation of a transmitter by association of both TDOA and FDOA measurements; and FIGS. 26a, 26b & 26c illustrate geolocation of a transmitter in accordance with the steps shown in FIGS. 24a, 24b and 25.

Figure 1:
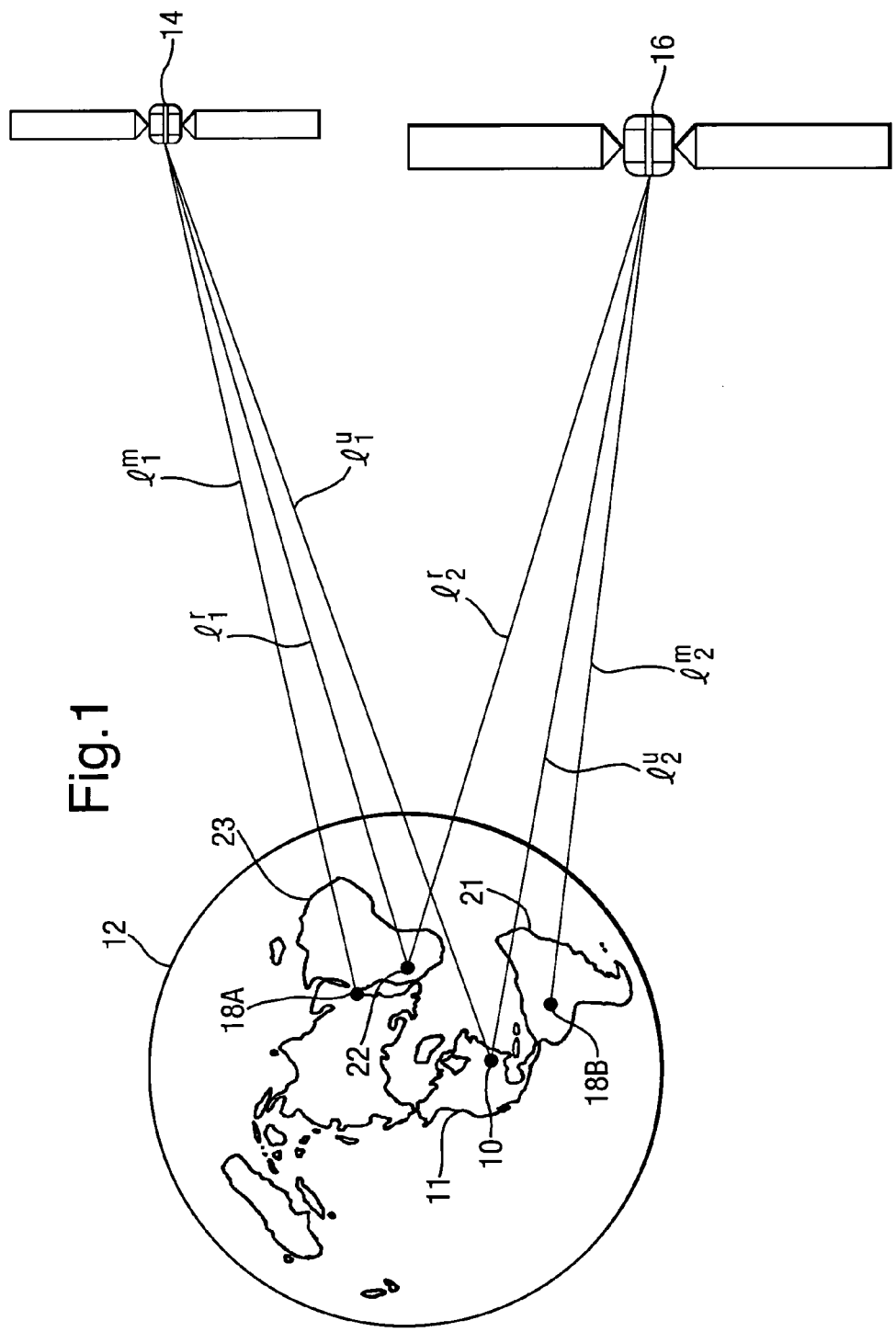
FIG. 1 illustrates signal propagation between Earth-based transmitters, satellite relays and Earth-based receivers.

Referring to FIG. 1, an unknown transmitter 10 located in the United States of America 11 is shown on the surface of the Earth 12, the northern hemisphere of which is illustrated with the North Pole (not shown) located centrally. The unknown transmitter 10 has radiation intensity lobe (not shown) directed to a first satellite 14 in a geosynchronous orbit. It transmits a signal which propagates to that satellite along a first uplink path $\lambda_1^u$ and produces interference with unknown signals using the first satellite 14. The unknown signal frequency is determined by spectrum analysis equipment (not shown) which routinely monitors unknown channels of the first satellite 14. A typical communications satellite operating at Ku band has 16 channels each 36 MHz wide and each capable of carrying 100 communications signals. The transmitter 10 also has a radiative sidelobe (not shown) directed to a second satellite 16 in a geosynchronous orbit, to which its signal propagates along a second uplink path $\lambda_2^u$. The superscript "u" to path references $\lambda_1^u$ and $\lambda_2^u$ denotes these paths originate at the unknown transmitter 10.

The first satellite 14 receives the signal from the unknown transmitter 10 and retransmits it along a first downlink path $\lambda_1^m$ to a first Earth-based ground station or receiver 18A directed at that satellite and located in Israel. The second satellite 16 also receives the unknown transmitter signal and retransmits it along a second downlink path $\lambda_2^m$ to a second Earth-based receiver 18B located in South America 21. Here the superscript "m" denotes a path to an Earth-based receiver. The Earth-based receivers 18A and 18B will be referred to by the reference 18 to indicate either or both without differentiation, and as 18A or 18B as appropriate when being specific.

The total signal propagation path length from the transmitter 10 to the first receiver 18A is equal to the sum of the lengths of the paths $\lambda_1^u$ and $\lambda_1^m$, and that from the transmitter 10 to the second receiver 18B is equal to the sum of the lengths of the paths $\lambda_2^u$ and $\lambda_2^m$.

A reference transmitter 22 at a known geographical position in Africa 23 transmits a reference signal along third and fourth uplink paths $\lambda_1^r$ and $\lambda_2^r$ to the first and second satellites 14 and 16 respectively; here the superscript "r" denotes transmission from the reference transmitter 22. The reference transmitter 22 is selected from those using the communications channel associated with one of the satellites 14, 16. The satellites 14, 16 retransmit the reference signal to the receivers 18 along the downlink paths $\lambda_1^m$ and $\lambda_2^m$ respectively.

Figure 2:
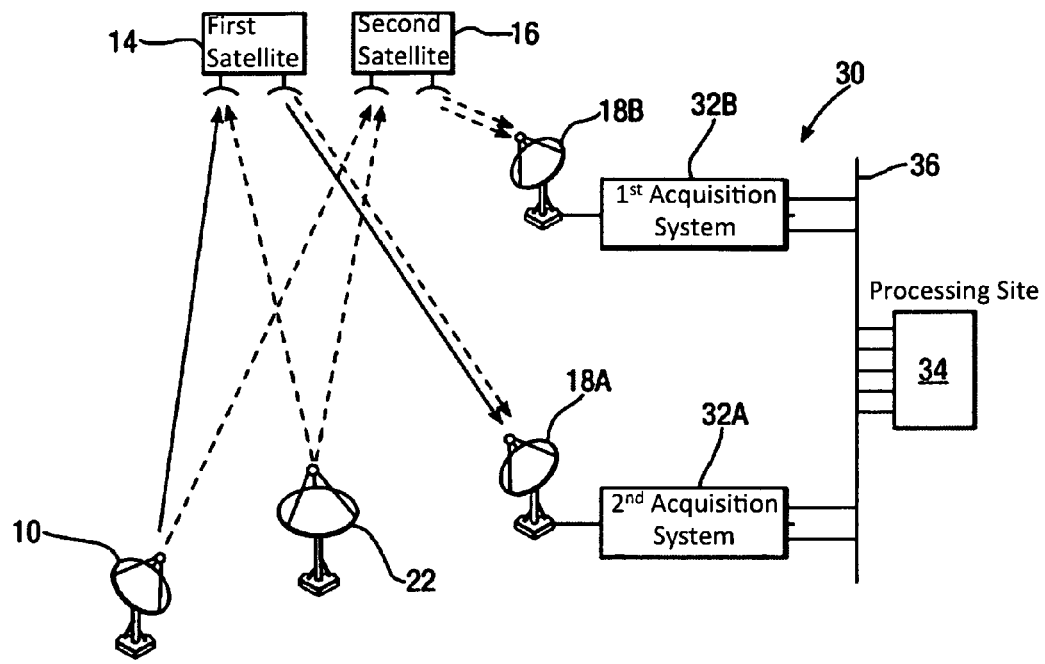
FIG. 2 is a schematic diagram of a transmitter location system of the invention together with associated Earth-based transmitters and satellite relays.

Referring now also to FIG. 2, a transmitter location system of the invention is shown in schematic form and is indicated generally by 30. The unknown transmitter 10, reference transmitter 22 and receivers 18A, 18B are indicated by antenna symbols. The satellites 14, 16 are indicated by rectangles. The receivers 18A, 18B are connected respectively to first and second acquisition systems 32A, 32B, each of which processes the unknown (U) and reference (R) signals in separate channel units which are described in detail below. The acquisition systems 32A, 32B are connected to a central control and processing computer system (not shown) at a processing site 34 via an area network 36.

Figure 3:
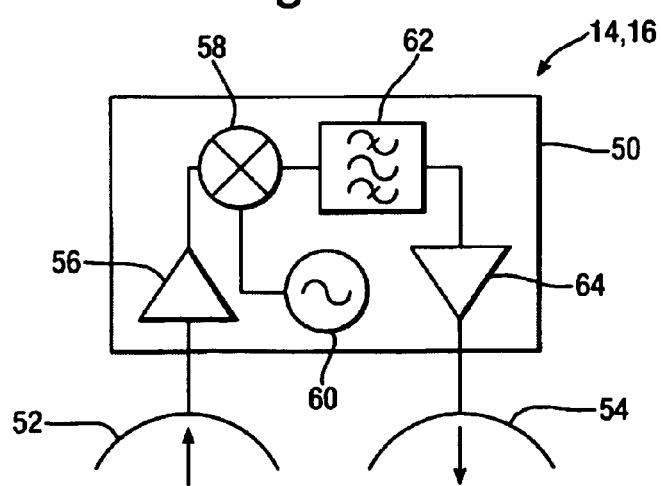
FIG. 3 shows detailed circuitry of a satellite relay in FIG. 2.

The circuitry of the satellites 14, 16 is shown in FIG. 3. Each satellite 14, 16 comprises a container 50 on which is mounted a receive (uplink) antenna 52 and a transmit (downlink) antenna 54. The receive antenna 52 is connected to a low noise amplifier 56, which is in turn connected to a mixer 58 receiving a local oscillator input from a frequency translation oscillator 60. The local oscillator frequency is 1.5 GHz. The mixer 58 consequently produces a frequency downshift of 1.5 GHz in signals received at the satellites 14, 16 Output from the mixer 58 passes to a bandpass filter 62 and thereafter to a power amplifier 64 supplying a signal feed to the transmit antenna 54.

Although this specific embodiment describes the same local oscillator frequency for both satellites 14, 16, this is not necessary. Another embodiment could include a first satellite with a translation frequency of 1.5 GHz and a second satellite with a translation frequency of 2.25 GHz for example.

Figure 4:
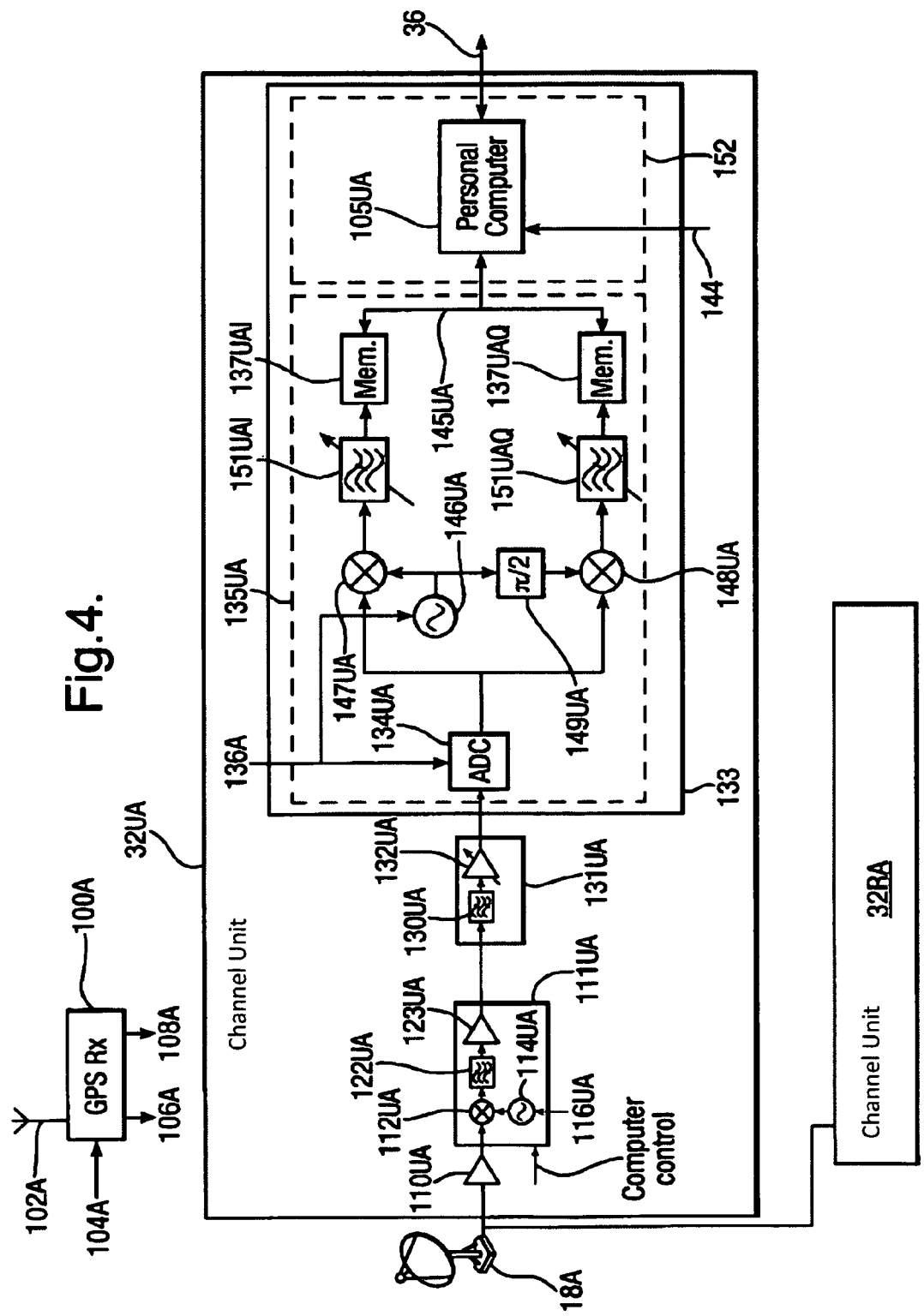
FIG. 4 shows detailed circuitry of an acquisition system of the FIG. 2 system.

Referring now also to FIG. 4, the circuitry of acquisition system 32A is shown in more detail. The acquisition system 32A comprises two channel units 32UA, 32RA and a Global Positioning System (GPS) receiver 100A with an antenna 102A linking the receiver 100A to one or more GPS satellites (not shown) for supply of timing signals. The GPS consists of a number of satellites deployed in space and from which such signals are available. The GPS receiver 100A has a control input 104A together with outputs 106A and 108A for timing (t) and frequency (fr) signals respectively, these signals being used by the channel units 32UA, 32RA during signal sampling. The two channel units 32UA, 32RA process the unknown and reference signals respectively. Channel unit 32RA has a structure identical to that of channel unit 32UA; elements of channel unit 32RA are referenced below using reference signs like to those used to label corresponding elements of channel unit 32UA except that suffices UA are replaced by suffices RA as appropriate. The output 106A in fact represents two outputs each connected to a respective channel unit 32UA, 32RA of the acquisition system 32A.

As shown in FIG. 2, receiver 18B has associated with it acquisition system 32B. Acquisition system 32B has a structure identical to that of acquisition 32A and comprises a GPS receiver 102B and two channel units 32UB, 32RB. The channel units 32UB, 32RB each have a structure identical to that of channel unit 32UA shown in FIG. 4; elements of channel units 32UB, 32RB are referenced below using reference signs like to those used to label corresponding elements of channel unit 32UA except that suffices UA are replaced by suffices UB or RB as appropriate.

Since there are two acquisition systems 32A, 32B, there are consequently four individual channel units 32UA, 32RA, 32UB, 32RB each of which may have a different start time T at which signal sampling is initiated. The timing and frequency signals associated with the two receivers 18A, 18B are denoted $t_A$, $fr_A$ and $t_B$, $fr_B$ respectively, and are very similar but not necessarily identical. This is because the unknown 10 and reference 22 transmitters may be located so far apart on the surface of the Earth that they have access to differing parts of the GPS. In consequence, signals in the receiver 18A are not in phase coherence with signals in the receiver 18B, and it is an advantage of the invention that it does not require such coherence.

Control inputs 104A, 104B of GPS receiver 100A, 100B are connected to respective local host personal computers 105A, 105B which supply control signals to them. The frequency of signal fr is 5 MHz. The timing signal t controls signal sampling in the procedure of locating an unknown transmitter, as will be described in more detail later. Like the frequency signal fr, it is generated by GPS receivers 100A, 100B from signals it receives from the GPS. To commence the procedure of locating an unknown transmitter, the computers 105A, 105B sends instructions to respective control inputs 104A, 104B indicating a start time; when the GPS indicates that this time has occurred the GPS receivers 100A, 100B initiate generation of the timing signal as a series of pulses in which adjacent pulses have a constant time difference $\Delta t$. The timing interval $\Delta t$ is the same for both acquisition units 32A, 32B. The computers 105A, 105B obtain the time of any signal sample taken in response to the timing signal from $t_0 + j\Delta t$, where $t_0$ is the start time and j is the sample number.

Referring to FIG. 4, output signals from the receiver 18A pass to a low noise amplifier 110UA and thence to a mixer 112UA, which receives a local oscillator input signal from an oscillator 114UA. The oscillator 114UA is connected at 116UA to the GPS receiver output 108A, and is phase locked to the frequency fr. Oscillator 114UA and mixer 112UA are integrated together with control electronics and interfaces into a microwave downconverter 111UA. Oscillators 114UA, 114RA associated with receiver 18A have frequencies of 12.365 GHz and 12.375 GHz respectively. Oscillators 114UB, 114RB associated with receiver 18B have frequencies of 12.365125 GHz and 12.375125 GHz respectively.

The offset between oscillators 114UA, 114RA and 114UB, 114RB significantly reduces cross talk between signals which otherwise would produce spurious correlations during signal processing (specifically, in the calculation of cross ambiguity function (CAF)) and which would otherwise confuse measurements of time-difference of arrival (TDOA) and frequency difference of arrival (FDOA) for the reference and unknown signals received at the two receivers 18A, 18B via respective satellites 14, 16, as will be explained later. The need for the 125 kHz offset in the IFs of the acquisition systems 32A, 32B is necessary when receivers 18A, 18B are co-located. When receivers 18A, 18B are on sites with significant spatial separation, and therefore a significant degree of isolation at the IFs being used, it is not necessary to include the 125 kHz offset. Nevertheless, it may be appropriate, for the simplification of software, to retain the 125 kHz offset. In the further description of the specific embodiment, it will be assumed that the 125 kHz offset is retained.

Receiver 18A splits up into two channels corresponding to channel units 32UA, 32RA. Likewise receiver 18B splits up into two channels units 32UB, 32RB. Channel 32UA will be taken as typical of the channels. Channel units 32UA, 32RA combined with the GPS receiver 100A and acquisition PC 105A constitute acquisition unit 32A. Similarly acquisition unit 32B comprises channel units 32UB, 32RB and a GPS receiver 100B.

Output signals from the microwave downconverter 111UA are centred on 140 MHz and the downconverter has a bandwidth of 72 MHz. A signal conditioning unit 131UA comprising a filter 130UA and a variable gain amplifier 132UA filters the 140 MHz output into a bandwidth of 5 MHz centred on 140 MHz. The bandwidth of the filtering is not critical but is sufficiently wide to accommodate the widest bandwidth that is intended to be digitized in the ADC 134UA. Furthermore, the 5 MHz bandwidth is sufficient to accommodate a 125 kHz offset between channels with minimal signal degradation. The variable gain amplifier 132UA is capable of adjusting the level of the input signal into the ADC 134UA to make full use of the dynamic range of the ADC 134, and so that the signal is not lost through quantisation noise (being too weak) or distorted by saturation of the digitizer (being too strong).

The ADC 134UA is a high speed, high stability, 12-bit device. It has a timing input 136A connected to the GPS receiver output 106A, from which it receives the timing signal t. On receipt of each pulse of the timing signal, the ADC 134UA produces a digitised sample of the output signal from the variable gain amplifier 132UA. The signal sampling rate is a minimum of twice the bandwidth of the output signal and is under control of local host computer 105UA. The maximum frequency input to the ADC 134UA is determined by the frequency response of its ADC electronics and it is possible, for example, to input a maximum frequency of 142.5 MHz, yet sample the signal at a rate of 65 MHz, for a 5 MHz bandwidth signal. In this situation, the second harmonic of the 65 MHz signal is 130 MHz and mixes with the 142.5 MHz signal to produce a difference of 12.5 MHz. The band of frequencies covering the range 137.5 MHz to 142.5 MHz is converted to a band of frequencies from 7.5 MHz to 12.5 MHz. Application of a suitable low pass filter isolates the mixing product at the difference frequency from other mixing products. For example, mixing with the 65 MHz fundamental will produce a mixing product with frequencies ranging from 77.5 MHz to 82.5 MHz. Likewise mixing with the third harmonic will produce a mixing product with frequencies ranging from 57.5 MHz to 52.5 MHz. It can be seen that these products are easily distinguishable from the mixing product 7.5 MHz to 12.5 MHz.

The output from ADC 134UA is split into two paths. One path is termed the in-phase path, denoted by a suffix I and the other path is termed the quadrature path, denoted by a suffix Q. Along the in-phase path, the digitised signal is multiplied by a digitally-generated sine wave from an oscillator 146UA in a multiplier 147UA. The product is input to a variable cut-off frequency low pass filter 151UAI (known as a decimation filter) which filters out the high frequency components of the product waveform and reduces the digital sample rate to a value which is a multiple of the cut-off frequency. The multiple of the cut-off frequency is chosen to minimise the aliasing of signals but is variable dependent on particular requirements. Normally a multiple greater than two is used (a multiple of two being the Nyquist sampling rate). The decimated samples are stored in memory 137UAI. On the Q path, the digital output of the oscillator 146UA is delayed by one quarter of a cycle of the oscillation by a delay unit 149UA. This delayed version is multiplied by the output of ADC 134UA in a multiplier 148UA. The product is input to a decimation filter 151UAQ. The decimated samples are stored in memory 137UAQ. Although not shown in detail in FIG. 4, the decimation filters 151UAI, 151UAQ and memories 137UAI, 137UAQ are synchronously clocked using the reference signal 136A so that timing synchronism is not lost between the I and Q arms. The system bounded by the dotted line 135UA is available as a commercial off-the-shelf product. One such example (of which there are a number) is Agilent's E1439 which takes a 70 MHz input and is capable of storing 300 million in-phase and 300 million quadrature 16 bit samples in memories 137UAI and 137UAQ respectively.

Oscillators 146UA, 146RA operate at 10 MHz. Oscillators 146UB, 146RB operate at 9.875 MHz. The difference in frequencies between oscillators 146UA, 146RA and 146UB, 146RB is present to offset the difference in oscillators 114UA, 114RA and oscillators 114UB, 114RB which is introduced to combat crosstalk and which is necessary if receivers 18A and 18B are co-sited.

The use of tunable local oscillators 146UA, 146RA and adjustable decimation filters 151UAI, 151UAQ ensures that the bandwidth of the signal digitized by the ADC 134UA can be made to match closely the signal of interest. In this way the digitisation of extraneous noise is minimised. This lack of extraneous noise has a beneficial effect on correlation output signal to noise ratio. Collectively, ADC 134UA, oscillator 146UA, mixers 147UA, 148UA, filters 151UAI, 151UAQ and memories 137UAI, 137UAQ form a digitisation unit 135UA.

Memories 137UAI, 137UAQ are connected to a local host personal computer 105UA by an interface bus 145UA. The interface bus 145UA is preferably one of a number of commercial standards used to transfer data to the personal computer's memory. One such standard is the Peripheral Component Interconnect (PCI) standard. In this case, the digisation unit 135UA is likely to occupy a PCI slot in the local host personal computer 105UA. Other interfaces may also be used such as VXI (Versa Module Eurocard, eXtensions for Instrumentation) and MXI (Multisystem eXtension Interface). In the Agilent E1439 example, the digitisation unit 135UA would occupy a slot in a VXI chassis with the PC controller occupying slot 0. Alternatively an MXI interface could be used occupying slot 0 in the VXI chassis and connecting to a PCI slot in the PC. In yet another variant, an IEEE 1394 'Firewire' interface is used to interface from the VXI bus to the PCI bus typically contained in the local host personal computer 105UA.

In summary, the interface bus 145UA represents one of any number of means to transfer samples from the memories 137UAI, 137UAQ of the digitisation unit 135UA to the memory of local host personal computer 105UA. In any particular means, the sequence of the samples is maintained so that it is possible to determine the time relationship between each individual sample and a datum related to the overall start time of the sampling. This subject is elaborated further below. The data in the local host personal computer 105UA is transferred to longer term storage, typically on the personal computer's hard disk. Additionally, due to an advantage of the invention, the required signal processing may be carried out in memory before the data are transferred to long term storage.

Figure 5:
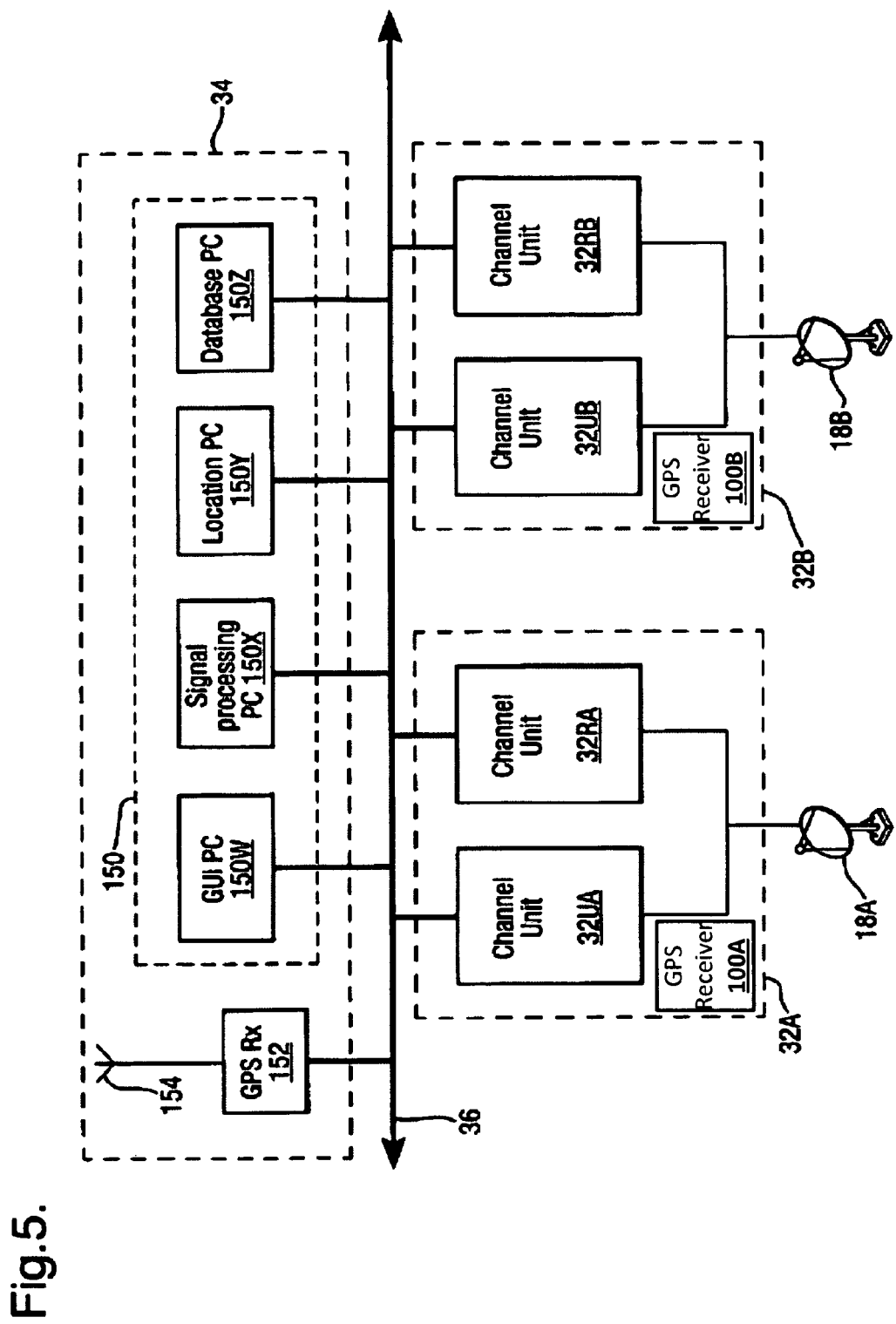
FIG. 5 shows the Earth-based part of the FIG. 2 system in more detail.

With reference to FIG. 5, the acquisition units 32A, 32B connect to a processing site 34 using an area network. In the case where the processing site 34 is remote, the acquisition units 32A, 32B connect over a wide area network.

In FIG. 5, elements of the processing site 34 are shown in more detail. The site 34 incorporates a central control and processing computer suite 150 connected to area network 36 and to a GPS receiver 152 having an antenna 154 communicating with the GPS system. The computer suite 150 comprises of one or more personal computers connected over a local area network. Illustrated in FIG. 5 is the situation where processing tasks are distributed amongst a number of personal computers. Specifically computer 150W hosts the Graphic User Interface, computer 150X performs digital signal processing, computer 150Y performs location processing, and computer 150Z hosts databases. In an alternative embodiment, all functions can be hosted on a single PC, with an increase in the time taken to obtain a location following the acquisition of signals.

The transmitter location system 30 operates as follows. The unknown transmitter 10 transmits a signal producing interference with signals in a communications channel of the first satellite 14. The unknown signal frequency is determined by spectrum analysis equipment monitoring the satellite communications channels. The unknown signal propagates to the satellites 14, 16 where it is frequency downshifted by 1.5 GHz by the mixers 58 and retransmitted to the first and second receivers 18A and 18B respectively. A phase calibrator signal is then selected by human intervention. It may be any signal which is present in a communications channel of the first satellite 14, which originates at a transmitter having a sidelobe directed at the second satellite 16, and which (preferably) has a similar bandwidth to that of the unknown signal as determined from monitoring the satellite 14 downlink. It has a frequency differing from that of the unknown signal sufficiently to enable these signals to be separated into different channels. By way of an example, the unknown signal might have a centre frequency of 14.005 GHz and comprise a 128 kb/s data signal. This signal would be downshifted in frequency to 12.505 GHz by translation oscillator 60. An adjacent signal on the same transponder is selected as a reference by monitoring the satellite 14 downlink spectrum. As an example a 256 kb/s data signal could be identified in the channel some 10 MHz higher in frequency than the unknown signal i.e. at 12.515 GHz corresponding to a transmitter frequency of 14.015 GHz. The reference signal is relayed by the satellites 14 and 16 to respective receivers 18A, 18B.

The signal-to-noise ratio at the first satellite 14, which is the target satellite for the main lobe of the unknown transmitter 10, is likely to be significantly greater than 1, and has typical values of 5 to 15 dB. However, the second satellite 16 is likely to be associated with signals having a very low signal-to-noise ratio, because it only receives low power signals from a sidelobe of the unknown transmitter 10. Such low signal levels are not detectable by conventional means, and it is necessary to use a signal correlation technique described below.

In general, it is not necessary for the signal to noise ratio at the first satellite 14 to be significantly greater than 1. What is needed is that the post correlation signal to noise ratio (SNR) exceeds about 100. This situation can be achieved even though the signal to noise ratio in each channel is much less than 1, provided the available processing gain is high enough.

After reception at the receiver 18A the unknown and reference signals are amplified at 110UA, 110UB and mixed at 112UA, 112UB with a local oscillator 116UA frequency of 12.365 GHz. In acquisition unit 32B, the unknown and reference signals are amplified at 110UB, 110RB and mixed with a local oscillator 116UB, 116RB frequency of 12.365125 GHz. The local oscillator frequencies are tuned by the respective local host computers so that the difference between each of them and the relevant unknown or reference frequency is close to a predetermined intermediate frequency (IF) of 140 MHz. Mixing in the mixers 112UA, 112RA then converts the unknown and reference signals to IF signals which pass to respective pre-select filters 122UA and 122RA. The pre-select filters 122UA, 122RA have fixed bandwidths of typically 72 MHz, for an IF of 140 MHz. For an IF of 70 MHz, which is used in some microwave downconverters, the bandwidth is typically 36 MHz. Similar processing occurs in acquisition unit 32B.

For an initial set of signal data, the unknown channel local oscillator 114UA is tuned to produce the unknown signal centred on an IF of 140 MHz. The unknown channel signal conditioning filter 130UA sets the bandwidth of the down-converted signal. A wide bandwidth reduces errors in measuring time up to a point where other errors become more important, and this sets the 4 MHz limit. The reference channel local oscillator 114RA is tuned to produce the reference signal centred on an IF of 140 MHz. As has previously indicated, local oscillators 114UB, 114RB are tuned to produce an IF of 139.875 MHz. The unknown and reference channel filters 130UA, 130UB have passbands and frequency selectivity appropriate to avoid aliasing in the undersampling ADC 134UA. A bandwidth of 5 MHz is sufficiently wide to enable accurate timing measurement for transmitter location and sufficiently narrow to avoid aliasing effects on the ADC 134UA. After this the IF signals are adjusted in amplitude by setting the gain of the amplifiers 132UA, 132UB appropriately in order to utilise the full dynamic range of the ADC 134UA (i.e. 12 bits). Similar considerations apply to channel units 32UB, 32RB in acquisition unit 32B.

The frequencies of the local oscillators 146UA, 146RA, 146UB, 146RB are accurately phase locked to the GPS signal so that the phase and frequency of the unknown signal relative to the reference signal is preserved in the respective acquisition systems 32A and 32R. These frequencies are set under control of the corresponding local host computers 105UA, 105RA, 105UB, 105RB.

Signal sampling by the ADC 134UA is initiated as follows, sampling by ADCs in other channel units being carried out likewise. The computer suite 150 indicates a start time to the local host computer 105UA, which relays it to GPS receivers 100A. When the GPS indicates that the start time has occurred, GPS receiver 100A initiates the timing signal t. The start time is computed based on the calculated delay of the signal from the known transmitter locations through the two satellites to the locations of the monitoring stations. If the path via satellite 14 is longer than that via satellite 16, then the timing signal for the path via satellite 14 is delayed by a time offset given by the difference in the two path lengths divided by the velocity of light. In the case of the unknown signal the offset for the reference signal is used or the average of the offsets for multiple reference signals. Acquisition is implemented to a timing accuracy of 0.001 second. As has been said, this signal consists of a train of timing pulses at successive constant sampling time intervals $\Delta t$ of 0.0153846 μs. The pulses are accurately phase-locked to the GPS frequency fr, and therefore also to the frequency of local oscillators 114UA, 114RA in acquisition system 32A. ADC 134UA produces a digital signal sample of the unknown signal in response to each timing signal. In this embodiment, the samples are produced at a rate of 65 MHz.

At the output of ADC 134UA, the digital samples are replicated and passed to digital mixers 147UA, 148UA which multiply the replicated digital samples with a replicated digital sine wave generated by local oscillator 146UA. One of the digital sine wave replicas is applied direct to the digital mixer 147UA. The other sine wave replica is phase shifted by one quarter of a cycle in phase shifter 149UA. The phase shifted sine wave is applied to mixer 148UA.

The mixing product from mixer 147UA is passed to decimation filter 151UAI. The mixing product from mixer 148UA is passed to decimation filter 151UAQ. The decimation filters 151UAI, 151UAQ are low pass filters of a variable cut-off frequency that is half the desired bandwidth of the mixed signal. The decimation filters 151UAI, 151UAQ output at a lower sample rate commensurate with the desired bandwidth. The minimum sample rate is at the desired bandwidth and which is suitable for this purpose.

Memories 137UAI, 137UAQ temporarily store the respective digital signal samples together with the associated start time. Local host computer 105UA subsequently reads out the data comprising the respective samples and start time of sampling from the memories 137UAI and 137UAQ and stores them in its internal memory. If it is decided that data need to be reprocessed, or there is other need to keep the samples, data are stored onto the computer's hard disc (not shown). Subsequently it will be stated that the samples are stored in computer 105UA without stipulating whether the samples are stored in the computer memory or on the computer's hard disc. Processing in the other channel units 32RA, 32UB, 32RB is carried out similarly.

In an alternative embodiment, acquisition system 32A has a single local host personal computer 105A which host digitization units 135UA, 135RA of the two channel units 32UA, 32RA comprised in acquisition system 32A.

In an individual determination of an unknown transmitter's position, a total of $4.1943 \times 10^9$ samples are taken by each of the four ADCs 134UA, 134RA, 134UB and 134RB before the timing signal is discontinued. The sample rate is reduced in the decimation filters so that a total of 8.192×10⁶ samples are stored in each of memories 137UAI, 137UAQ, 137RAI, 137RAQ, 137UBI, 137UBQ, 137RBI, 137RBQ.

The time that any digital signal sample is taken is obtainable from $t_0+j\Delta t$, where $t_0$ is the start time and j is the sample number. The time interval $\Delta t$ depends on the degree of decimation. For the initial sampling, $\Delta t$ is 15.3846 ns. After the decimation, $\Delta t$ is 7.8769 µs. There may be up to four different start times as has been said, one per ADC and given by $t_{0UA}$, $t_{0RA}$, $t_{0UB}$ and $t_{0RB}$ where time is defined relative to universal coordinated time (UTC). After sampling is complete, the local host computer memories (associated respectively with the first and second receivers 18A and 18B) each contain samples and start times for both the unknown and reference transmitters 10 and 22. Moreover, at each individual receiver 18A or 18B, the unknown and reference signals are downconverted and sampled coherently because the mixers 112 and the ADCs 134 employ local oscillator and timing signals phase locked to the GPS frequency and time signal fr and t. However, fr, t and $t_0$ may not be exactly the same at receiver 18A as they are receiver 18B, because the receivers 18A, 18B may be located so far apart on the surface of the Earth that they have access only to differing parts of the GPS.

What matters for coherence is that it is not lost in the downconversion process. U.S. Pat. No. 6,018,312 defines a correlation process based on the cross ambiguity function (CAF) and also a phase correction that is possible using a reference signal. The correlation and correction described in U.S. Pat. No. 6,018,312 is based on signals at RF. The signals that are correlated are normally at baseband, having been converted into in-phase and quadrature components in a downconversion process. In principle, if it were possible to produce digital samples at a high enough rate, the radio frequency signals themselves could be cross correlated in the cross ambiguity function. The correlation strength achieved with the downconverted signals compared to the correlation strength that would be achieved if the RF signals were correlated is a measure of the coherence of the downconversion process.

The unknown signal and the reference signal are generally received at different radio frequencies. The downconversion to baseband of these unknown and reference signals is achieved using local oscillators phase locked to a high performance frequency standard such as derived from a GPS receiver. These systems typically incorporate a crystal oscillator, which is very stable in the short term, coupled to a signal derived from the GPS downlink, which is very stable in the long term. If the local oscillators are locked to some multiple of the high performance frequency standard, say K fold, the phase perturbations (in radians) of the local oscillators reflect those of the high performance standard multiplied up by the factor K. Likewise if the local oscillators are locked to some other multiple of the high performance standard, say L fold, the phase perturbations of the local oscillators reflect those of the high performance standard multiplied up by L. Given that K>L, the additional phase perturbation engendered by downconverting using the two different multiples is $(K-L)\Delta\phi_i$ where $\Delta\phi_i$ is the instantaneous phase perturbation of the high performance reference. It can be seen from this expression that the phase noise is that of a signal derived from the high performance reference which is at the difference frequency between the two local oscillators. This difference is approximately the difference in uplink frequency between the unknown and reference signals, i.e. $f^U-f^R$ where $f^U$ and $f^R$ are the uplink frequencies of the unknown and reference signals respectively.

The allan variance is used to describe oscillator stability. The square root of the allan variance can be described as fractional phase wander. The coherence time can be approximated as the time taken for the phase wander to equal one radian. This is the useful upper limit of the integration time 'T' in the Ambiguity function described in U.S. Pat. No. 6,018,312. Hence the following approximate relationship applies:

$$\sigma_y(T) \cong \frac{1}{2\pi|f^U-f^R|T} \quad (1)$$

where the term on the left hand side is the square root of the allan variance.

Figure 6:
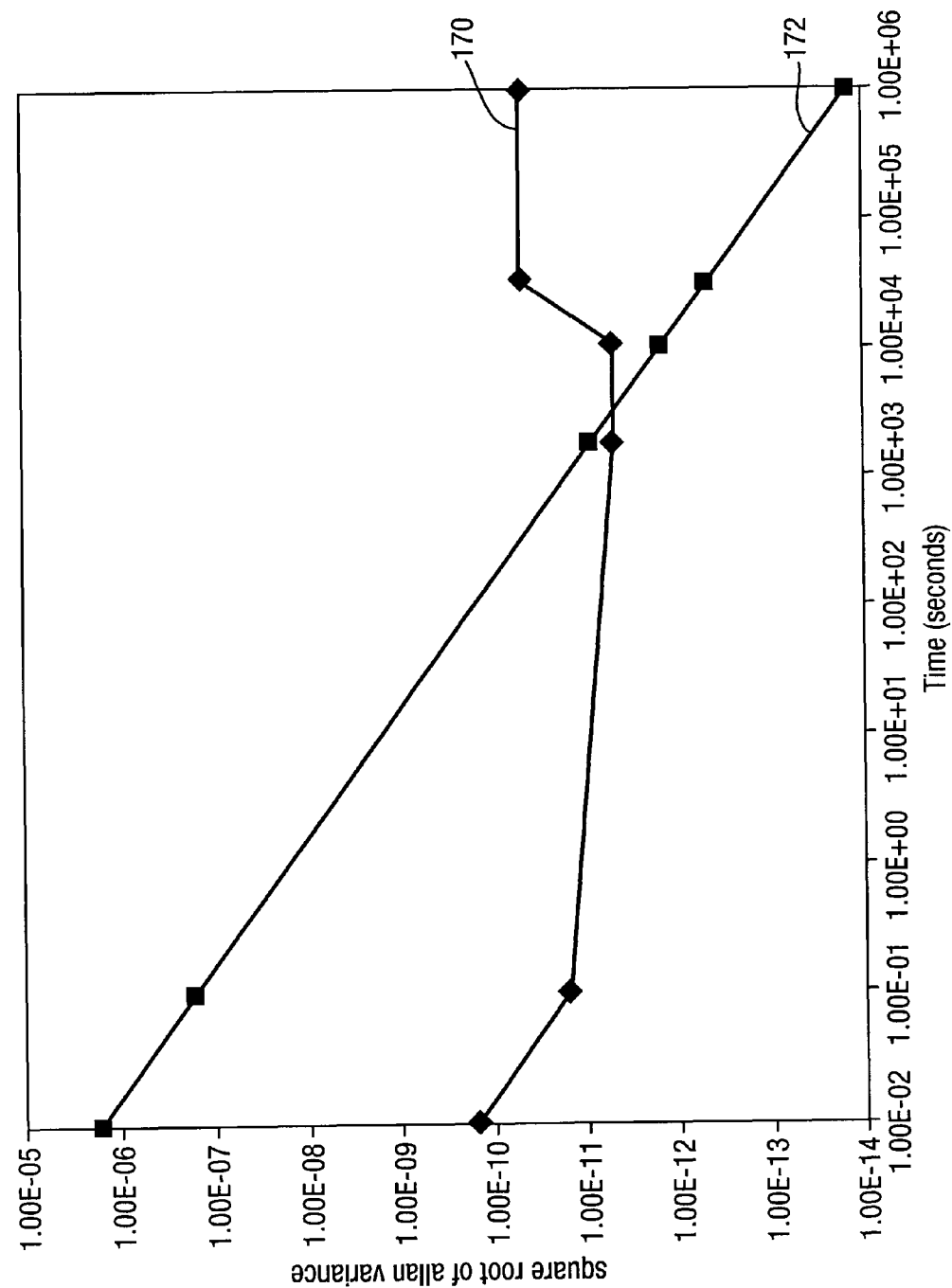
FIG. 6 illustrates the frequency stability of a typical GPS derived high-performance oscillator.

The square root of the allan variance is usually quoted for high performance oscillators. In FIG. 6, 170 shows the square root of the allan variance for a typical GPS derived high performance oscillator compared with the requirement 172 for phase drift of one radian, described in (1) based on a difference between unknown and reference signals of 10 MHz. It can be seen that equality is achieved for an integration time of around 3000 seconds. Hence this defines the coherence time in this particular example, indicating that phase calibrated correlations can be achieved with integration times up to 3000 seconds.

With reference to FIGS. 4 and 5, the digital signal samples stored in the local host computers 105 are transferred from the two receiver sites to the processing site 34 along via the area network 36 for further processing. As has previously been mentioned, the further processing functions can be split between individual PCs or can be achieved by fewer PCs undertaking multiple functions.

Referring again to FIG. 5, the processing site 34 comprises a GPS receiver 152 and a computing suite 150. The GPS receiver unit 152 is used for the purposes of timekeeping and may be replaced by other means of keeping time accurate to around 1 second of UTC.

Sampled data are transferred to the hard disc of signal processing PC 150X. In an alternative embodiment, two signal processing PCs may be used; one to process the unknown signal and the other to process the reference signal. The benefit of this arrangement is faster processing through parallel operation.

Data are dealt with in blocks of typically 32768 samples per channel, for convenience this is a power of two.

Firstly a raw differential frequency offset (DFO) of the reference signal is determined. This value may be known from previous measurements, in which case this stage of the determination can be omitted.

To determine the raw DFO of the reference signal, a block of reference data is read from disc of computer 150X into its memory for the 32RA channel and a block of data for the 32RB channel. The data samples are typically stored in fixed-point format requiring four bytes of storage per complex sample. The data are read from disc into memory in floating point format facilitating further computation without loss in precision. The computer memory requirements for floating point format data are not onerous as only a limited number of data samples need to be read into computer memory at any one time in order to be processed.

The data for the 32RB channel are shifted by a pre-determined number of samples relative to the 32RA channel. To achieve the shift, data are indexed, typically starting at 0, so that data are indexed from 0 to N-1. Because data are typically stored in a First In First Out (FIFO) buffer during sampling, data with index 0 occurred at an earlier time than data with index N-1. Data can be shifted in a positive or negative direction. For example if data is shifted so that the data sample that was previously at index 12 is now at index 16 in the 32RB data block, the 32RB data block has been retarded compared to the 32RA data block, i.e. events in the 32RB block now appear to occur at a later time than they did in the unshifted data. Hence shifting in a positive direction is retarding the data and shifting in the negative direction is advancing the data. Data are shifted in computer memory by reading data from one indexed memory block into another indexed memory block and taking account of the shift in index in the process.

Continuing the example, unshifted data indexed from N-4 to N-1 are discarded. Likewise data indexed from 0 to 3 are zeroed. Hence a small portion of the data samples at the leading and trailing edges of the block are discarded. This loss of data results in a typically small loss of correlation processing gain.

The ability to offset the 32RB channel relative to the 32RA depends on the knowledge of the path lengths from the reference transmitter 22 via the two satellites 14, 16 to the monitoring stations 18A, 18B. Satellite ephemerides can be used to calculate the positions of the two satellites. These positions, along with the knowledge of the position of the reference transmitter 22, allow the computation of the path lengths via the two satellite paths. The difference in path lengths divided by the velocity of light determines the time offset of 32RB relative to 32RA. The difference in path lengths is the difference in combined uplink and downlink path lengths. If the path length via path B is longer than via path A, the samples received in path B need to be advanced relative to path A.

Following the shifting of 32RB relative to 32RA, the complex conjugate of each sample at 32RA is multiplied by the sample of the same index at 32RB.

Following the multiplication, the product data are low pass filtered and decimated. The decimation is dependent on the low pass filtering and this in turn is dependent on the anticipated value of the DFO. It is normal to keep the residual DFO being searched to a relatively low value, offsetting, if necessary, a larger value of DFO in the downconversion processes by using offset values of local oscillator in the downconversion chains. For example, the two satellites 14, 16 could be operating at different values of translation oscillator frequency. A typical example is satellite 14 operating with a translation oscillator of 1.5 GHz and satellite 16 operating with a translation oscillator of 2.5 GHz, resulting in a raw DFO of around 1 GHz. This value of 1 GHz would be offset by setting the RF of the downconverters 111RA and 111RB different by 1 GHz. Gross offsets in satellite translation oscillators are determined a priori such as from published information on the configuration of the satellites.

A typical value of residual DFO is less than 10 kHz. Given an initial sample rate of 512 kHz, a decimation factor of 32 is appropriate. Operationally, the decimation factor is computed from the range of residual DFO that is being searched and the sample rate of the data. The range of DFO being searched is an operator judgement. This judgement is affected by prior knowledge of diurnal translation oscillator drift, time of day and previous measurements of DFO offset.

Having multiplied and decimated, the decimated samples are read into separate computer memory indexed by decimated sample number and block number. The data are then Fourier Transformed to the frequency domain and the real and imaginary components are each squared and combined together and converted to a logarithmic scale in order to provide a power spectrum.

In order to account for uncertainties in the DTO of the reference signal, a range of possible DTOs are calculated around the nominal value. These uncertainties are typically due to uncertainties in the satellite ephemerides. If satellite ephemerides are not available, knowledge of the longitudes of satellites in geostationary orbit will often suffice to determine a search range of DTO for the reference signal.

The DFO is measured using the peak search approach described below to search over values of DTO and DTO estimate signal to noise ratio. Provided the signal to noise ratio of the peak is above 20 dB, the peak is used and the DFO measured for that peak.

Once the coarse DFO of the reference signal has been determined, attention is turned to the measurement of the DTO and DFO of an unknown signal relative to a reference signal. The use of the terms 'unknown' and 'reference' are used in the context of a single measurement. Use of reference signals as phase and position calibrators is be described in more detail below.

In order to start the processing, a search range is defined on the Earth. This search range is defined as a minimum and maximum longitude and latitude. A number of calculations of DTO and DFO are made for points within the region in order to determine the maximum and minimum values DFO and DTO within the search range.

For the full computation of the CAF surface for the unknown signal, the search range in delay and frequency are converted into numbers of points on the CAF surface in the delay and frequency directions. Specifically:

$$n_\tau = \frac{\Delta \tau}{\Delta t}; n_v = \frac{\Delta v}{\Delta f};$$

where;
$\Delta \tau$ is the search range in delay;
$\Delta v$ is the search range in frequency offset;
$\Delta t$ is $1/f_s$, where $f_s$ is the sample rate;
$\Delta f$ is $1/T$, where T is the total sample duration.

For a typical delay span of 2 milliseconds, a typical frequency search range of 15.7 Hz, a typical sample rate of 256 kHz, and a total sample duration of 65 seconds, $n_\tau$ is 512 and $n_v$ is 1024. This gives a processing gain of 75 dB. There are four sets of data samples UA, RA, UB and RB. Samples on all four sets are segmented in the time domain to blocks of length $N/n_v$. B data are frequency shifted in the opposite direction to the determined DFO of the reference signal i.e.—DFO(R). In order to achieve this frequency shifting, a phase term is calculated;

$$\phi_{jk} = -2\pi DFO(R)\left[j\frac{N}{n_v} + k\right]\Delta t; j = 0, \ldots, n_v - 1; k = 0, \ldots, \left(\frac{N}{n_v} - 1\right) \quad (3)$$

This formulation includes the block number j and the index k within a block. Strictly speaking, according to the definition of the cross ambiguity function (CAF), the time origin should be in the middle of the sample. Here the time origin has been taken at the beginning of the sample on the grounds that the fixed time offset will introduce a fixed phase offset to all channels, which will be removed in the differential measurement process.

The frequency shift is implemented at the full sample rate of the signal to accommodate large values of DFO, such as is caused by residual differences in translation oscillator offset.

A shifted version of the B terms is produced;

$$b(fs)_{jkI} = b_{jkI} \cos \phi_{jk} + b_{jkQ} \sin \phi_{jk}; \ b(fs)_{jkQ} = b_{jkQ} \cos \phi_{jk} - b_{jkI} \sin \phi_{jk} \quad (4)$$

where:

$b_{jkI}$ is the in-phase component of the unshifted b term;
$b_{jkQ}$ is the quadrature component of the unshifted b term;
$bs_{jkI}$ is the in-phase component of the shifted b term;
$bs_{jkQ}$ is the quadrature component of the shifted b term.

This shifting is done for both the unknown and reference signals.

In the next phase, data are processed in blocks. The unshifted A data and shifted B data blocks are transformed to the frequency domain using an FFT of size $2N/n_v$. This activity is performed for both unknown and reference signals. A two fold increase in FFT size over the minimum necessary is chosen avoid circular correlation effects in the delay domain. In the transformation process, the first $N/n_v$ points are non-zero and are the data samples in the block and the remaining $N/n_v$ points are zeroed out. In the frequency domain, the points are oversampled since the points are now spaced at intervals of $\Delta f/2$.

In a similar manner to the frequency shift, the time offset of the reference signal is applied in the frequency domain. In this case, the phase term is computed as:

$$\phi_k = -2\pi DTO(R) k \frac{\Delta f}{2}; k = 0, \ldots, \left(\frac{2N}{n_v} - 1\right) \quad (5)$$

The time offset is applied to the UB and RB channels. This time offset compensates for the DTO of the reference signal that exists due to the different path lengths via satellites 14 and 16.

The complex conjugate of the UA frequency domain terms is multiplied by the BU frequency domain terms. Likewise the complex conjugate of the RA frequency domain terms is multiplied by the RB frequency domain terms.

The product terms are decimated by the frequency domain decimation factor. The frequency domain decimation factor is denoted $D_f$ and is one half of the number of points low-pass filtered in the frequency domain to provide a single frequency domain point. The one half factor results from the 2× oversampling that has been introduced. As the points are separated by $\Delta t$ in the time domain, it can be seen that the frequency domain decimation factor is given by:

$$\frac{N}{n_v} \Delta t \frac{1}{D_f} = \Delta \tau; D_f = \frac{N}{n_\tau n_v} \quad (6)$$

as can be seen by applying (2).

The product terms are inverse transformed to the delay domain. The product terms are padded out with zeros to total length $n_\tau I_\tau$, where $I_\tau$ is a delay domain interpolation factor, typically 2. Thus a total of $n_\tau(I_\tau - 1)$ zero points are added. The number of points in the inverse transform for each product term is $n_\tau I_\tau$. Each point in the delay domain is the complex product of samples from A and B channels, the B channel being offset by a delay determined from the index of the point. Note now the delay points are separated by $\Delta t/I_\tau$ seconds.

The real and imaginary product terms are written into separate memory storage indexed by delay and time (block number). Separate memory storage areas are used for the (UA*)UB=$p_U$ and (RA*)RB=$p_R$ products hence there are a total of four memory storage areas used.

To further process, samples are read from memory indexed by block number, for a given delay. For each delay, the time domain data are Fourier transformed to the frequency domain, using an FFT. There are $n_v$ points in the time domain. In order to facilitate interpolation, the data are padded out with $(I_v-1)n_v$ zeros, where $I_v$ is a Frequency Domain interpolation factor, typically two.

A refinement to the CAF processing to compensate for the changing Earth-Satellite geometry is described in U.S. Pat. No. 6,618,009. This compensation is manifested in two parts. Firstly the DTO is time-varying and secondly the DFO is time varying. The delay variation is compensated by including the variable delay in the time offset in (5). Explicitly, this term now becomes:

$$\phi_{kj} = -2\pi DTO_j(R) k \frac{\Delta f}{2}; k = 0, \ldots, \left(\frac{2N}{n_v} - 1\right); \quad (7)$$
$$j = 0, \ldots, n_v - 1$$

Here the DTO of the reference signal is explicitly worked out for every block using satellite ephemeris, the known position of the reference source and the absolute time that the sample was taken. This DTO value is used to shift the B samples. It should be noted that the correction possible is dependent on the quality of the satellite ephemerides.

In order to correct for DFO variation with time, a total phase is estimated for each satellite path at each specific block time based on the reference signal location. This total phase is defined as:

$$\Phi_X^R = \frac{2\pi}{c} \{ f^R l_X^R + (f^R - f_X^T) l_X^M \} \quad (8)$$

where X identifies the A or B path. The superscript M denotes the receiving ground station, 18A in the case of satellite 14, and 18B in the case of satellite 16. Also;

$f^R$ frequency transmitted by the reference site;
$f_X^T$ translation frequency for satellite X;
$l_X^R$ path length from the reference site to satellite X;
$l_X^M$ path length from the satellite to the receiving site;
c velocity of light.

Although the total phase is calculated, the variation of the phase with time from the start of the sample set is what is needed. This allows a number of fixed terms (such as the delay through the transponders) to be neglected. Furthermore it is the difference across the two satellite paths and the deviation from a constant DFO(R). From (8) the term:

$$\Phi_{BA}^R(t) = \frac{2\pi}{c} \{ f^R [l_B^R(t) - l_A^R(t) + l_B^M(t) - l_A^M(t)] - f_B^T l_B^M(t) + f_A^T l_A^M(t) \} \quad (9)$$

is defined, being the time dependent difference in phase between the two satellite paths. The phase correction is given by:

$$\Delta \phi(t) = \Phi_{BA}^R(t) - \Phi_{BA}^R(t_0) + 2\pi(t-t_0) DFO(R, t_0) \quad (10)$$

where $t_0$ is the time of the first sample. Note that the phase variation and DFO components are added. This is because a phase that is increasing at a constant rate with time results in a negative DFO. Product data are phase corrected according to:

$$p_r'(\tau,t) = p_r(\tau,t)\cos \Delta\phi(t) - p_i(\tau,t)\sin \Delta\phi(t)$$

$$p_i'(\tau,t) = p_r(\tau,t)\sin \Delta\phi(t) + p_i(\tau,t)\cos \Delta\phi(t) \quad (11)$$

where $p_r$ denotes the real part of the product $p_U$ or $p_R$, $p_i$ denotes the imaginary part of the product.

It can be seen that there is both a delay and time component of the corrected product. Hence data for each delay are corrected as a function of time. Note there are $n_v$ complex time samples at each of $n_\tau I_\tau$ delays.

As previously described, the corrected products are transformed to the frequency domain using an FFT size of $I_v n_v$ to facilitate interpolation in the frequency domain. These components, which are complex functions of delay and frequency shift, are the Cross Ambiguity Function (CAF) components denoted by $A(\tau,v)$. In what follows the real part of the CAF component will be subscripted with r and the imaginary part subscripted with i. Likewise the CAF for the unknown signal will be subscripted with U and the CAF for the reference signal will be subscripted with R.

In the frequency domain, data are converted to a decibel format for display and other purposes, viz:

$$A(\tau,v)|_{dB} = 10 \log_{10}[A_r(\tau,v)^2 + A_i(\tau,v)^2] \quad (12)$$

Figure 7:
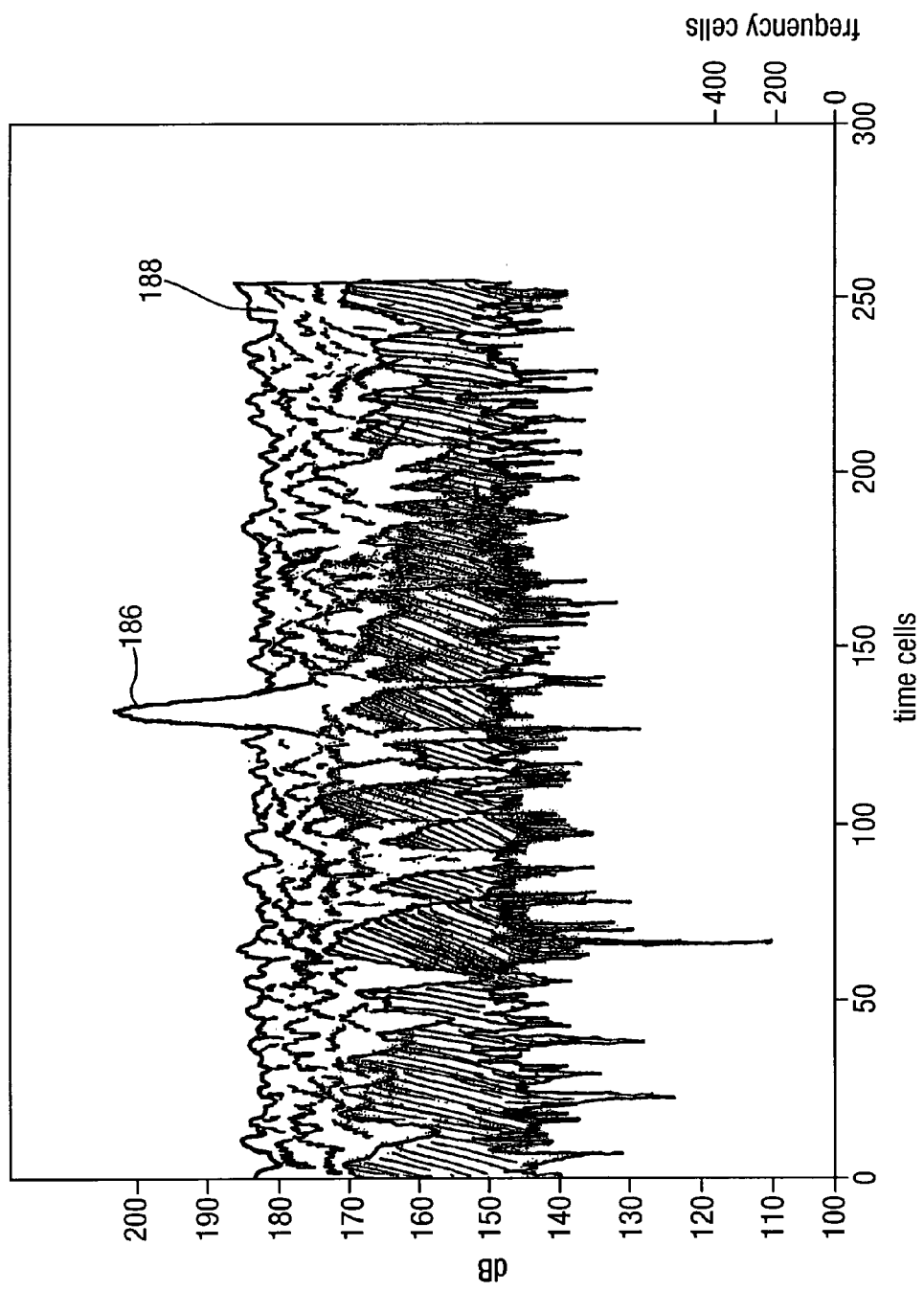
FIG. 7 shows an example of a cross ambiguity function surface generated during signal processing carried out by the FIG. 2 system.

FIG. 7 shows an example of a cross ambiguity function surface (hereinafter simply called the ambiguity surface) in the dB format as derived from equation (12). The dB response of the CAF is plotted against time cells and frequency cells. The peak correlation strength 186 needs, ultimately, to be distinguishable from any noise-induced peak, such as 188, in the domain defined by time and frequency offsets allowable given the possible locations on the ground and positions and velocities of the satellites.

Figure 8A:
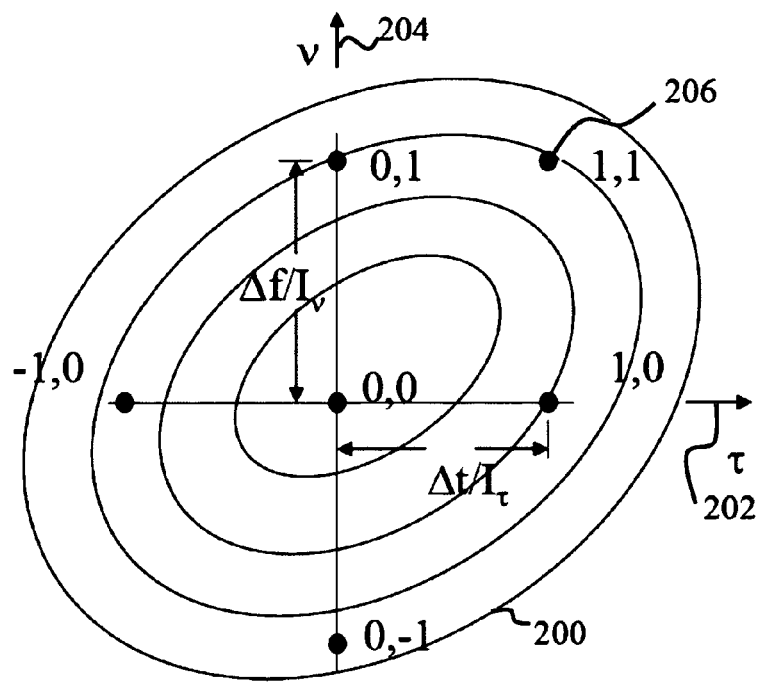
FIGS. 8a & 8b show plan views of the FIG. 7 surface.
Figure 8B:
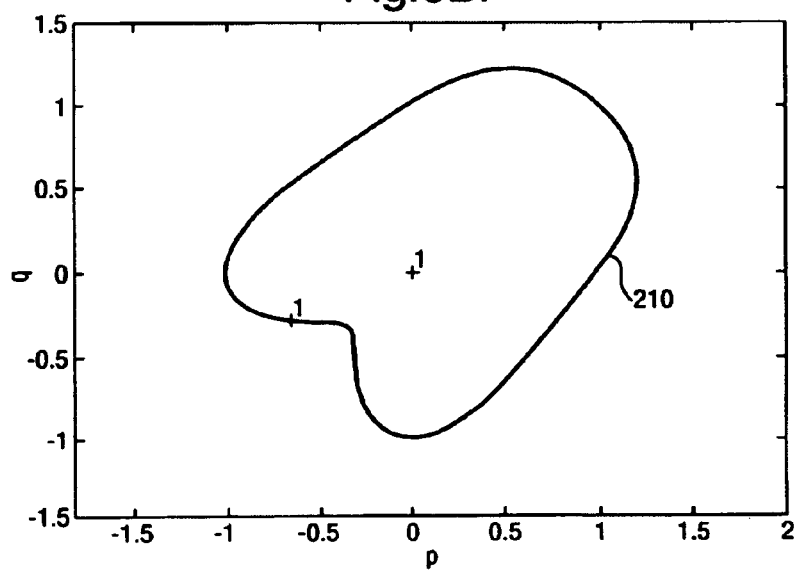

FIG. 8A shows a plan view of the ambiguity surface along with the points at which the surface is sampled. Contours of constant correlation strength, such as 200, are plotted against time offset $v$ and frequency offset $\tau$. The surface is defined by grid points, such as 206. The surface is sampled at intervals of $\Delta f/I_v$ in the DFO direction and $\Delta t/I_\tau$ in the DTO direction. The ambiguity surface in dB is defined as $f_{-1,0}$; $f_{0,0}$; $f_{1,0}$ etc at the sample points.

Interpolated values of the ambiguity surface are given by:

$$f\left(\tau_0 + p\frac{\Delta t}{I_\tau}, v_0 + q\frac{\Delta f}{I_v}\right) \cong \quad (13)$$

$$\frac{q(q-1)}{2}f_{0,-1} + \frac{p(p-1)}{2}f_{-1,0} + (1+pq-p^2-q^2)f_{0,0} +$$

$$\frac{p(p-2q+1)}{2}f_{1,0} + \frac{q(q-2p+1)}{2}f_{0,1} + pqf_{1,1}$$

where $\tau_0$ and $v_0$ are the DTO and DFO at the 0,0 index point and $-1 \leq p \leq 1$, $-1 \leq q \leq 1$.

The values of p and q that maximise f are given by:

$$p = \frac{h_1 g_{22} - h_2 g_{12}}{g_{11} g_{22} - g_{12} g_{21}}; q = \frac{h_2 g_{11} - h_1 g_{21}}{g_{11} g_{22} - g_{12} g_{21}} \quad (14)$$

where:

$$g_{11} = f_{1,0} - 2f_{0,0} + f_{-1,0}; g_{22} = f_{0,1} - 2f_{0,0} + f_{0,-1} \quad (15)$$

$$g_{12} = g_{21} = f_{0,0} - f_{0,1} + f_{1,1} - f_{1,0};$$

$$h_1 = \frac{f_{-1,0} - f_{1,0}}{2}; h_2 = \frac{f_{0,-1} - f_{0,1}}{2}$$

Effective bandwidth $B_U$, duration $T_U$ and cross-coupling factor $F_U$ are used to determine errors in DTO and DFO. Specifically:

$$B_u = \frac{I_\tau}{\Delta t}\sqrt{-\frac{g_{11}}{8.686}}; T_u = \frac{I_v}{\Delta f}\sqrt{-\frac{g_{22}}{8.686}}; F_u = -\frac{g_{12}I_\tau I_v}{8.686 \Delta t \Delta f} \quad (16)$$

and:

$$\sigma_\tau = \frac{1}{B_u\sqrt{SNR\left(1 - \frac{F_u^2}{B_u^2 T_u^2}\right)}}; \sigma_v = \frac{1}{T_u\sqrt{SNR\left(1 - \frac{F_u^2}{B_u^2 T_u^2}\right)}}; \quad (17)$$

$$\rho_{\tau v} = i\frac{\sqrt{F_u}}{B_u T_u}\frac{1}{\sqrt{SNR\left(1 - \frac{F_u^2}{B_u^2 T_u^2}\right)}}$$

and where SNR is the post-correlation signal to noise ratio. The post-correlation signal to noise ratio is determined from the interpolated peak of the ambiguity surface using (14) substituted into (13) and the mean level of the noise determined from the ambiguity surface well away from the correlation peak. The measured post-correlation signal to noise ratio is the difference between the interpolated peak and the mean noise level. Because the ambiguity surface has been converted in decibels, the measured post-correlation signal to noise ratio is 0.5 dB less than the true post-correlation signal to noise ratio. The true post-correlation signal to noise ratio is used in equations (17). The existence of a clearly identifiable correlation peak requires a post-correlation signal to noise ratio to exceed about 17 dB.

A problem occurs when the ambiguity surface is corrupted by phase noise. The impact of this phase noise is discussed in U.S. Pat. No. 6,018,312. The presence of phase noise causes degradation of the correlation in the DFO direction. This, in turn, will degrade the accuracy of the interpolation procedure previously described. The following describes the phase calibration of the ambiguity surface using the reference signal correlation.

Figure 9:
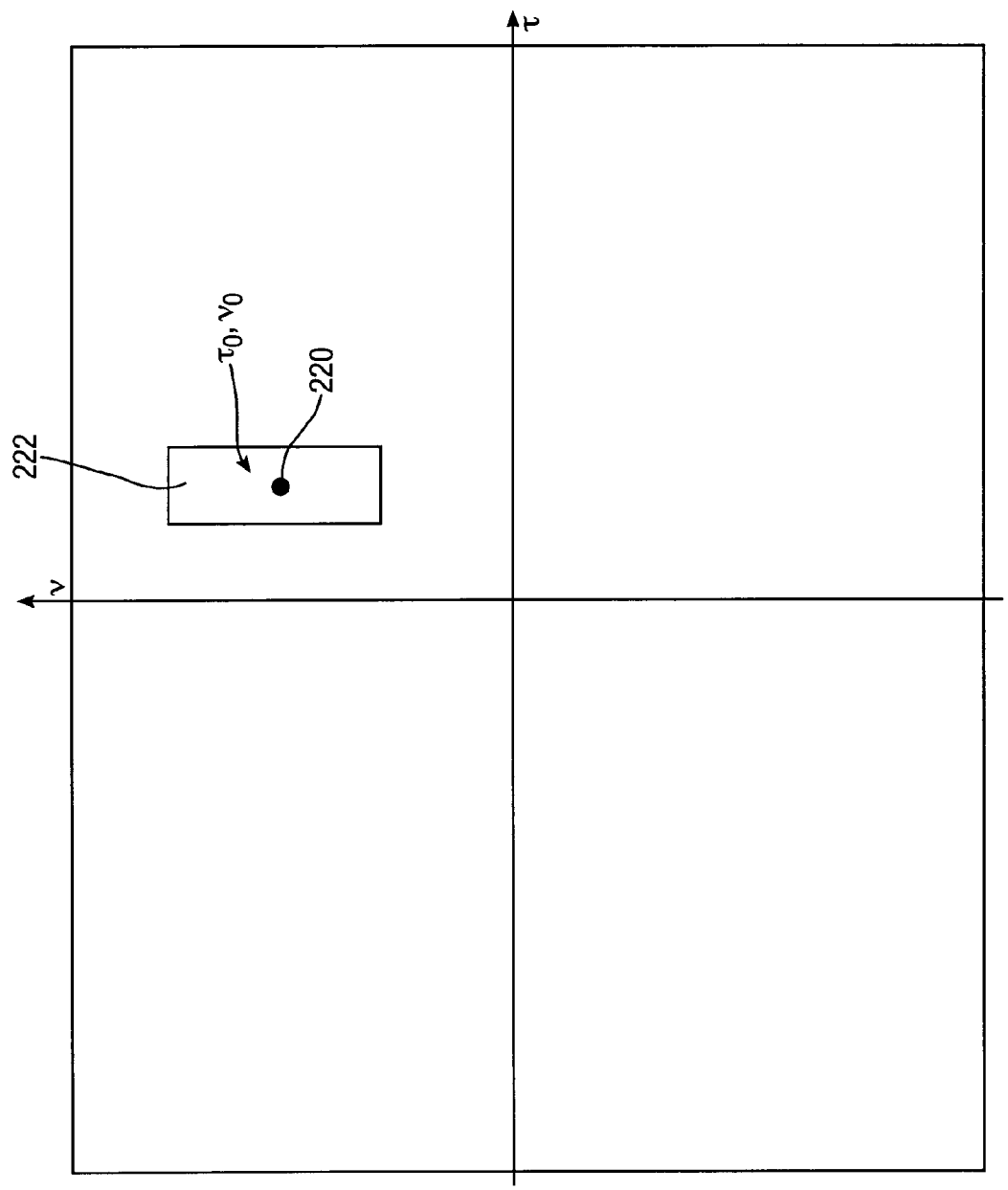
FIG. 9 illustrates phase-calibration of the surface of a cross ambiguity function.

With reference to FIG. 9, the peak 220 of the ambiguity surface for the reference signal is identified and a mask 222, is formed which weights typically 5/$I_\tau$ points either side of the peak in the delay domain and 20/$I_v$ points either side of the peak in the frequency domain with a unity weighting factor in linear amplitude or 0 in dB terms. Outside this region, points are weighted at a very low level in linear amplitude level or a large negative number in dB terms. The masking is conveniently done on the CAF dB amplitude where the mask coefficient is added to the dB CAF value. The filtered CAF will be denoted by the use of a tilde on top of the A (values of the ambiguity function).

The next stage is to perform FFTs of the filtered reference CAF in the delay and DFO directions. A forward FFT is used to transform from the delay to the frequency domain and an inverse FFT is used to transform from the DFO to the time domain. Hence the following transformation is made on the reference signal CAF components:

$$\tilde{A}_R(\tau,\nu) \Rightarrow \tilde{A}_R(f,t) \quad (18)$$

Likewise the same transformation is made on the unknown signal CAF components:

$$A_U(\tau,\nu) \Rightarrow A_U(f,t) \quad (19)$$

However, the unknown signal CAF is unfiltered.

For each indexed frequency and time point, the following product is formed:

$$p(f,t) = \tilde{A}_R^*(f,t) A_U(f,t) \quad (20)$$

The product term is then inverse FFTed from the frequency to the delay domain and FFTed from the time to the frequency domain to produce a normalised CAF:

$$p(f,t) \Rightarrow A_{U\text{-}R}(\tau,\nu) \quad (21)$$

Finally, the normalised CAF is converted to a dB format and the peak FDOA and TDOA estimated along with the measurement errors as described in (17).

Figure 10:
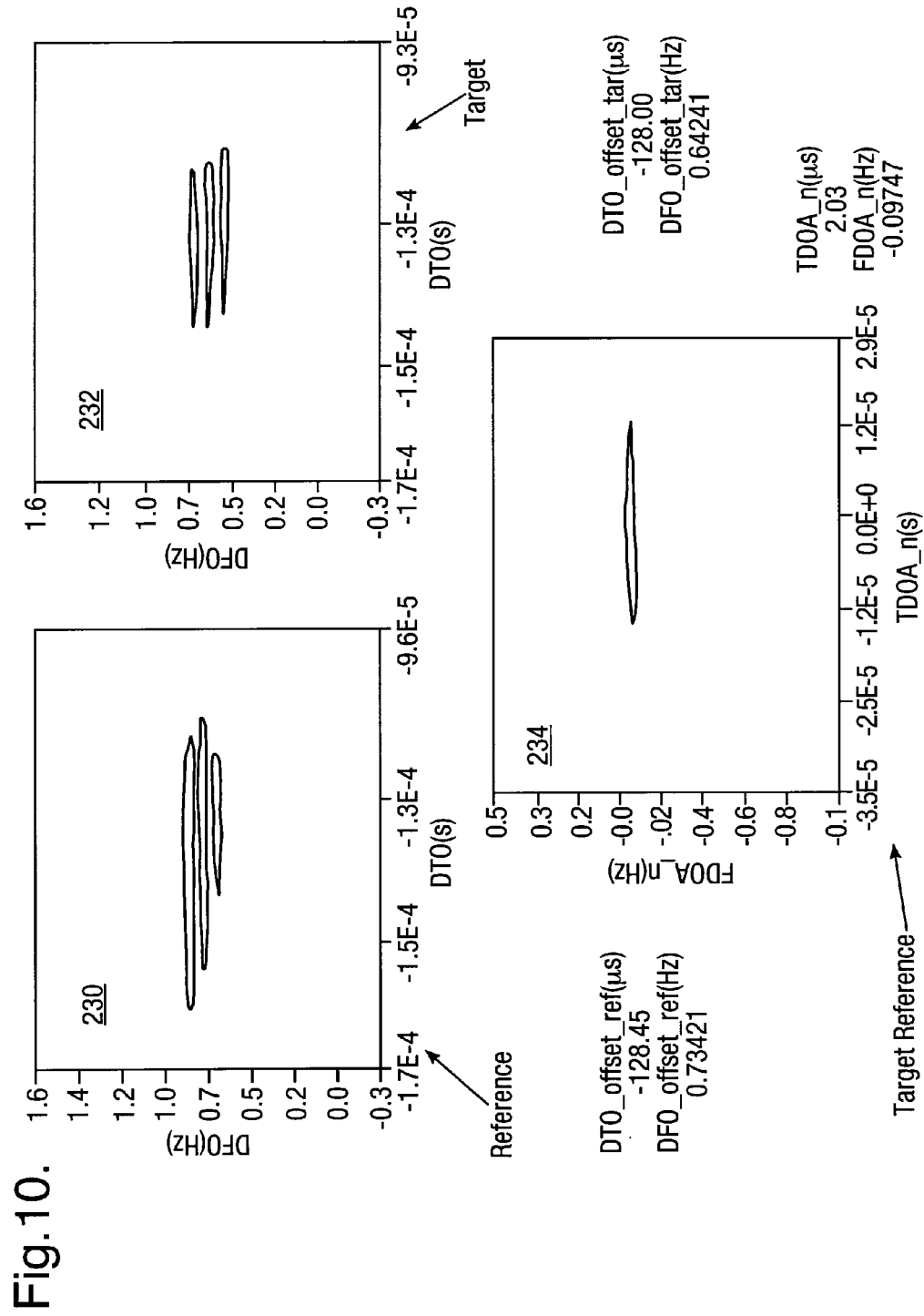
FIG. 10 shows example ambiguity surfaces for reference and unknown signals.

FIG. 10 shows an example of the Ambiguity Surfaces for the reference, 230, and unknown, 232, signals. The normalised Ambiguity Surface is shown at 234. For this surface, the TDOA error was around 1 microsecond and the FDOA error was around 0.6 milliHertz. This particular example is used to illustrate the process of phase compensation to provide precise measurement of normalized FDOA.

Figure 11:
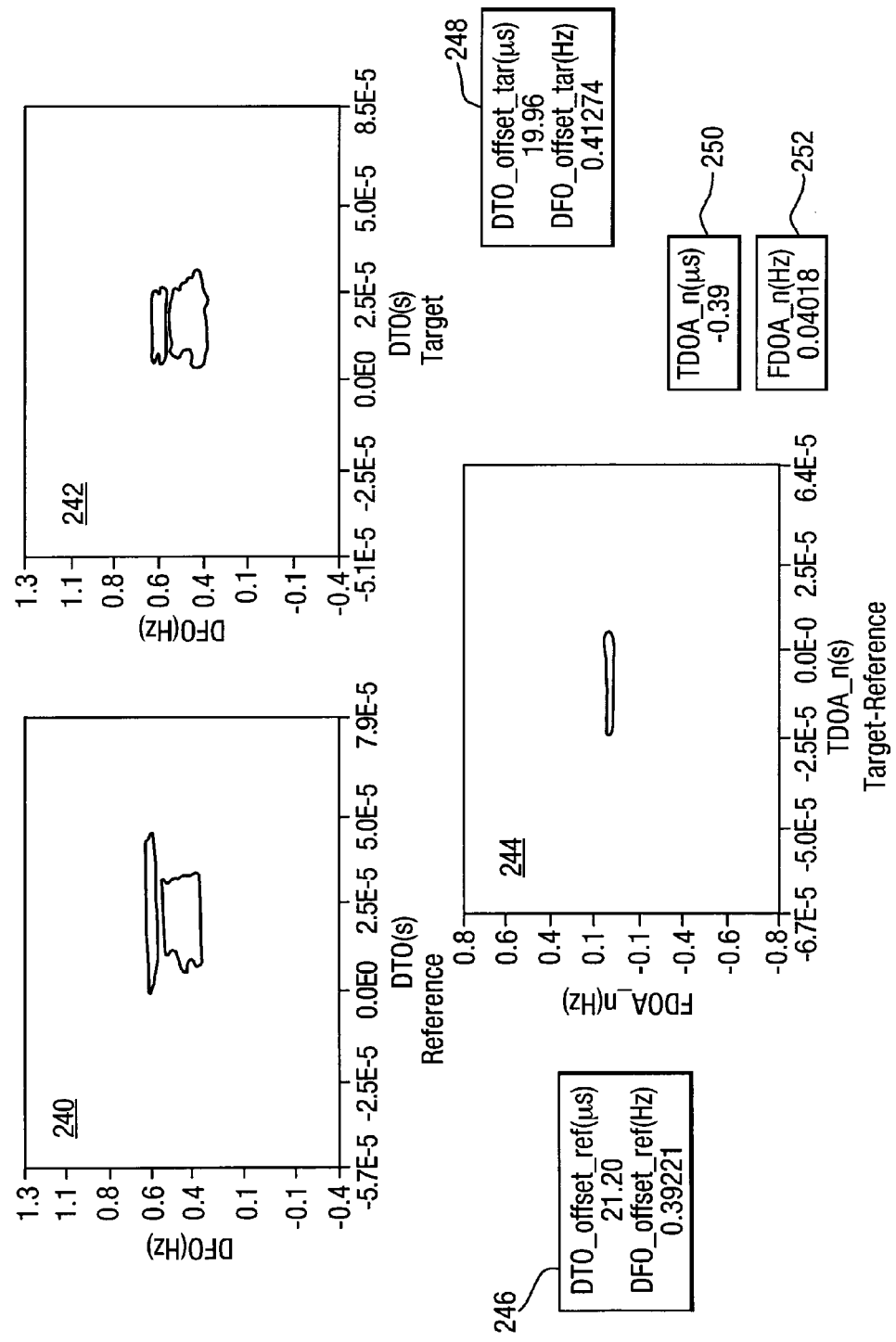
FIG. 11 illustrates drift in Differential Frequency Offset (DFO) of a signal caused by changing Earth-satellite geometry.

FIG. 11 shows an example of DFO drift caused by changing Earth-satellite geometry. The drift is present on the reference and unknown signal ambiguity surfaces and has caused a stretching of the peak in the DFO direction. 240 shows the CAF of the calibrator signal having appreciable DFO drift evidenced by smearing in the frequency direction and caused by changing Earth-Satellite geometry. 242 shows the CAF on the signal of interest with a similar DFO drift. 244 shows the normalized surface where the drift has been compensated to produce a tight normalized peak. The calibrator maximum level and the signal of interest maximum level are shown at 246 (DTO_offset_ref (μs)=21.20; DFO_offset_ref (Hz) =0.39221) and 248 (DTO_offset_tar (μs)=19.96; DFO_offset_tar (Hz)=0.41274) respectively. The normalized TDOA is shown at 250 (TDOA_n (μs)=−0.39) and the normalized FDOA is shown at 252 (FDOA_n (Hz)=0.04018).

Figure 12:
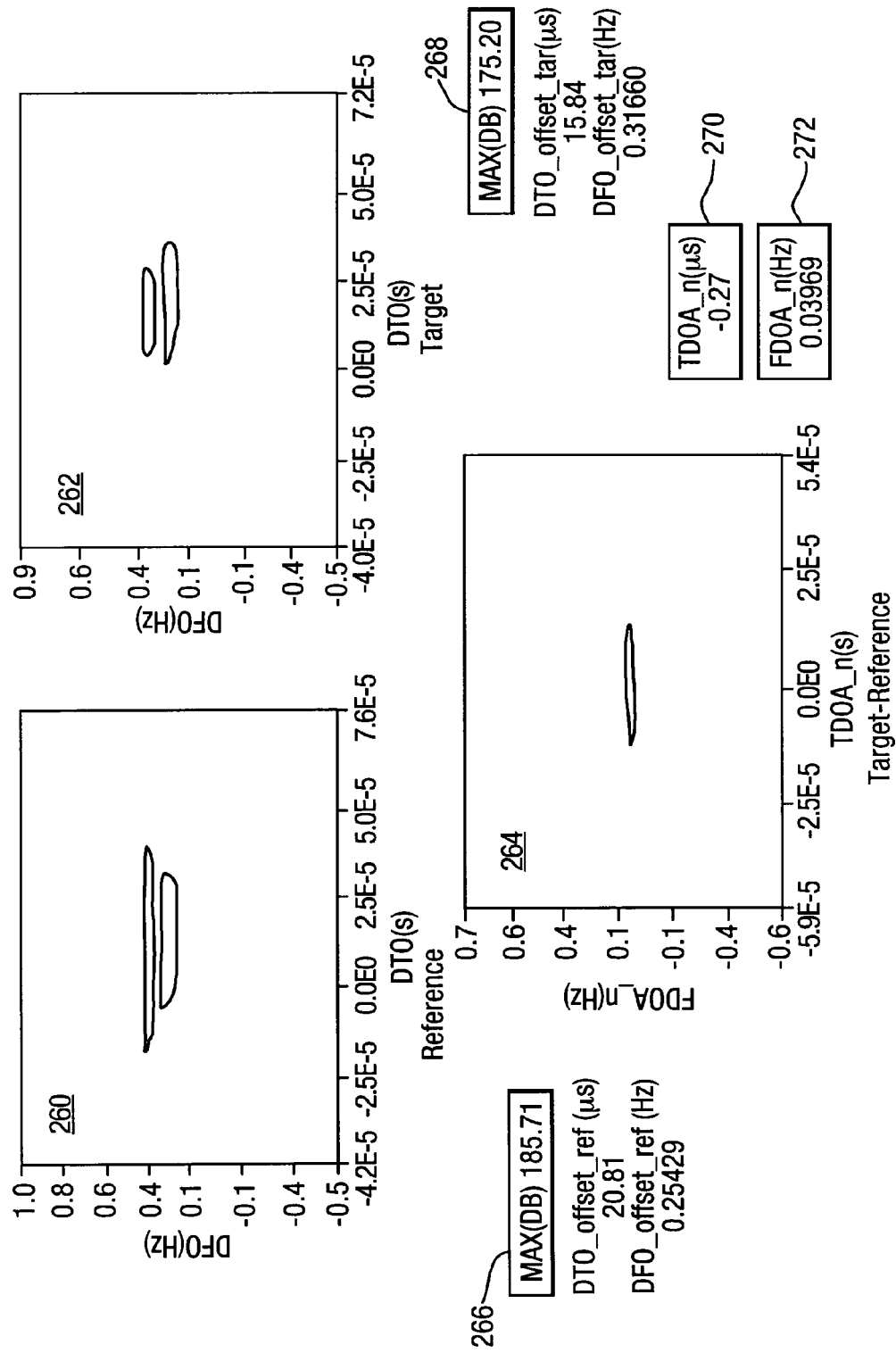
FIG. 12 illustrates reduction in DFO drift by applying drift compensation.

FIG. 12 shows the reduction in DFO drift achieved by applying drift compensation in the form of (7) and (11). 260 shows the CAF of the calibrator signal with drift compensation applied. 262 shows the CAF of the signal of interest with drift compensation applied. Compared with 246, 266 shows a 3 dB increase in the correlation strength of the calibrator signal. Compared to 248, 268 shows a 2.5 dB increase in the correlation strength of the signal of interest. Compared to the normalized, uncompensated values of TDOA_n, 250 and FDOA_n, 252, the compensated values 260 and 262 differ by less than 0.12 microseconds and 0.5 milliHertz, both of which are small values.

It can be noted from FIG. 12 that the drift compensation is not perfect, since it relies on the quality of the satellite ephemerides. The advantage of the compensation, as has previously been discussed, is the improvement in post-correlation signal to noise ratio of the individual reference and unknown ambiguity surfaces. For the reference surface, the drift compensation enables a higher signal to noise to be achieved on the filtered reference CAF components. This improvement in signal to noise enables the phase subtraction process to work on a weaker reference signal correlation than would otherwise be the case for drifting parameters.

As described in U.S. Pat. No. 6,018,312, location processing takes the outputs from the signal processing and combines these outputs with predictions of the positions and velocities of satellites to provide the location of an unknown signal.

The location accuracy is significantly affected by the accuracy of the predictions of the satellites' positions and velocities. In particular, for nominally geostationary satellites, the errors in satellite velocity cause major degradation to location accuracy. These errors are not random, but appear as discrete offsets between measured DTO and DFO values and those calculated based on satellite ephemeris.

U.S. Pat. No. 6,018,312 describes the technique of using a single reference transmission to partially correct ephemeris errors. Here the technique of measuring multiple reference transmissions to compensate for satellite ephemeris errors is described.

Measurements, corrected for satellite ephemeris error, are still subject to random measurement errors. These measurement errors place fundamental limitations on the accuracy of location of the source of an unknown signal. However, as with many measurements which are subject to random error, association of multiple measurements can result in reduced error. Association of the measurements is described more fully below.

Ephemeris compensation is carried out as follows. Satellite ephemeris error—defined by the difference between the actual and predicted satellite position and velocity is subject to temporal variation. The impact of ephemeris error on Differential Slant Range (DSR) and Differential Slant Range Rate (DSRR) is also subject to spatial variation, i.e. it depends on the point of measurement. In the following, temporal variation will first be considered followed by spatial variation. Finally, algorithms will be presented which enable the ephemeris errors to be compensated. Before detailed consideration of the estimation of DSR and DSRR errors, it is also necessary to convert actual measurements to DSR and DSRR errors. This topic is considered first.

Figure 13:
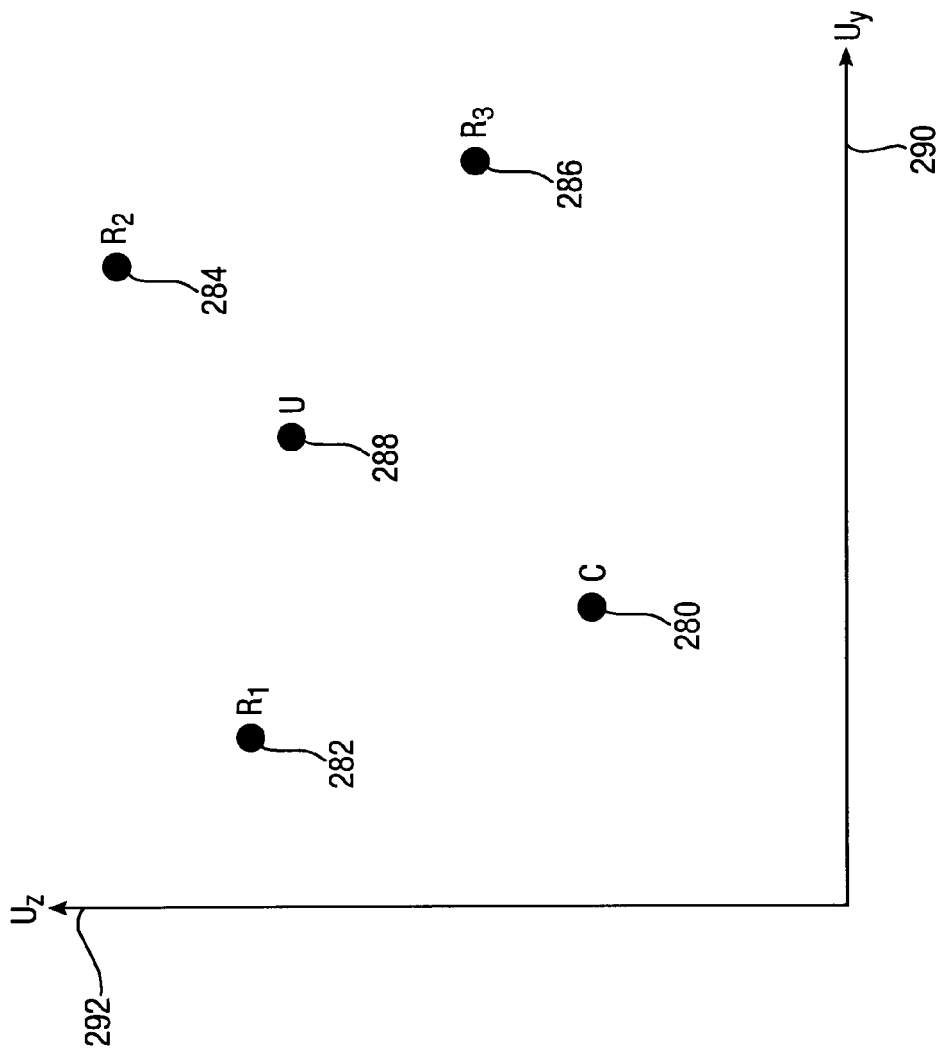
FIG. 13 shows an arrangement of Earth-based transmitters used in emphemeris compensation.

FIG. 13 shows the ephemeris compensation scenario. A number of known transmitters 282, 284, 286 are measured along with an unknown transmitter, 288. Measurements are made of DTO and DFO of the unknown signal and a number of reference signals. The DFO measurements are made relative to a phase calibrator 280 which may be a known traffic signal or could be a signal specially transmitted for the purpose. In FIG. 13 the co-ordinate system is defined as follows. The x axis is defined by a line from the centre of the Earth through the mean position of the two satellites on the geostationary arc. The mean position can be defined as the mean over the duration of the observations or can be a nominal mean position based on, say, the mean value of the nominal longitudes of the orbital position for each satellite. The z axis is along a line joining the centre of the Earth to the North pole. The y axis is defined to complete a right handed set.

The positions of the unknown, reference and calibration signals are represented in this coordinate system in terms of a unit vector u from the satellite mean position to the relevant point on the ground. The y and z components $u_y$, $u_z$ of the unit vector suffice to define the unit vector by virtue of the unit magnitude of the vector. The ambiguity in sign of the x component of the unit vector is removed by the requirement for the unit vector to point towards a location on the Earth.

For given reference positions, the DTO is measured and compared with the DTO calculated based on available information on satellite ephemerides. The difference in DTO is computed:

$$\delta DSR = c \delta DTO \quad (22)$$

where c is the velocity of light. Hence δDSR can be calculated on a per-measurement basis.

The relationship between DFO and DSRR is less straightforward. It can be shown that:

$$-\frac{c}{f^R}\text{FDOA\_n} - \left(\frac{f^R - f^C}{f^R}\right)c\dot{DTO}(C) = DSRR(R) - DSRR(C) \quad (23)$$

where;

$f^R$ is the uplink frequency of the reference transmitter;
$f^C$ is the uplink frequency of the calibrator transmitter;
FDOA_n is the difference between FDOA for the reference and calibrator transmitters;
DTO(C) dot is the rate of change of the observed differential time offset of the calibrator transmitter as monitored at the monitoring station, i.e. the combination of uplink and downlink components; and
DSRR is the uplink Differential Slant Range Rate of the term in brackets.

Taking errors:

$$\delta DSRR(R) - \delta DSRR(C) \equiv \delta\text{DSRR\_n} = \quad (24)$$
$$-\frac{c}{f^R}\delta\text{FDOA\_n} - \left(\frac{f^R - f^C}{f^R}\right)c\delta\dot{DTO}(C)$$

Hence to estimate the error in DSRR of a reference signal relative to a calibrator signal, the normalized FDOA is typically measured from the CAF surface and then compared to that calculated based on satellite ephemeris.

Likewise the rate of change of DTO is observed on the calibrator signal and compared to that calculated based on satellite ephemeris. The errors are substituted into the RHS of (24) and used to compute the LHS.

Figure 14A:
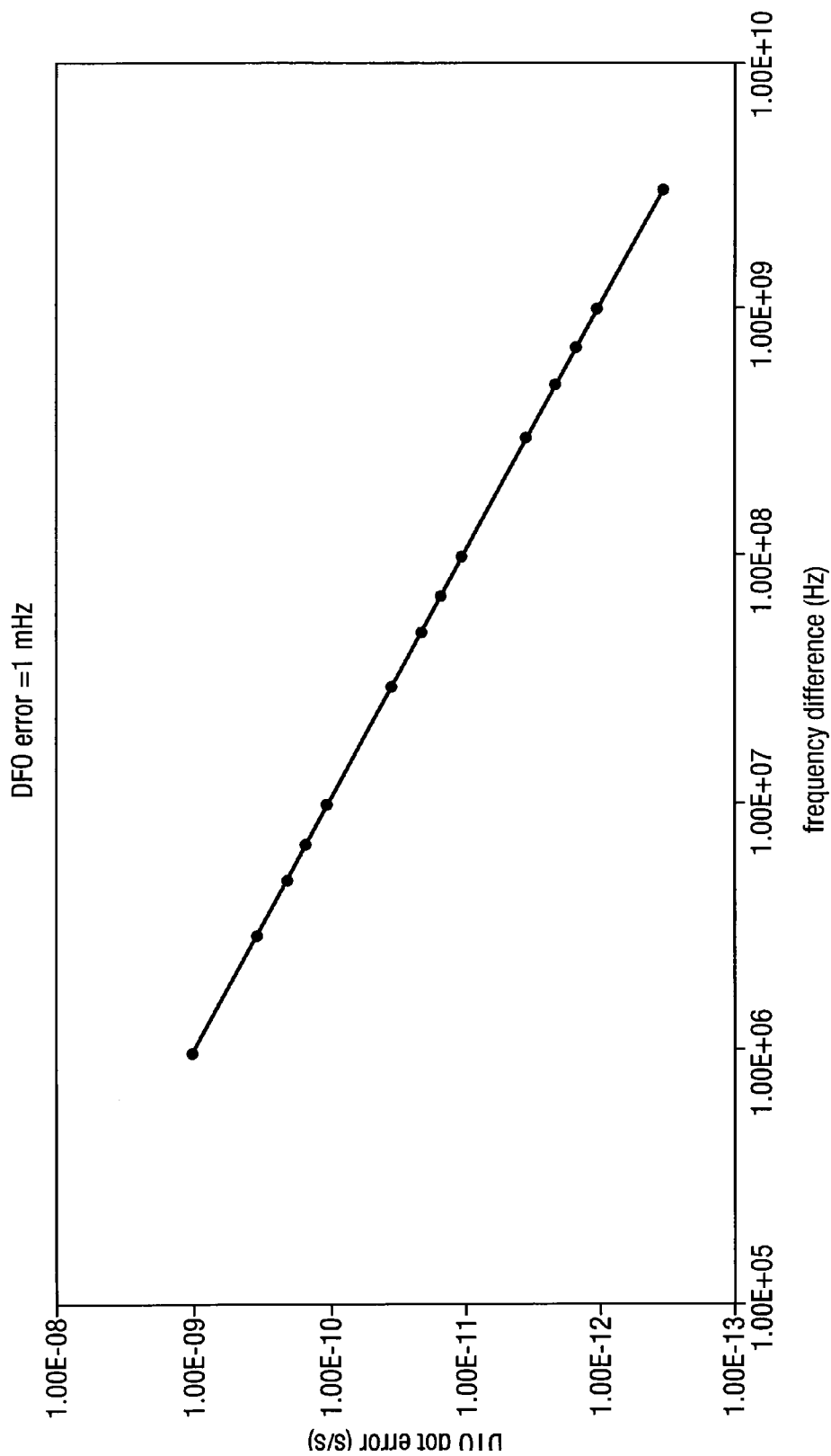

The rate of change of DTO is determined by multiple measurements of DTO and determination of the slope of the DTO v/s time curve. Alternatively, the rate of change of DTO can be calculated from the satellite ephemerides. This latter approach is less satisfactory, due to the impact of the satellite ephemeris error. The accuracy to which the rate of change of the DTO on the calibration signal needs to be determined is shown by FIG. 14a. The data are based on an acceptable error of 1 mHz. If the acceptable error is less than this value, say 0.1 mHz the error the rate of change of DTO changes pro rata, i.e. if it is 1e-9 for a 1 mHz error it is 1e-10 for a 0.1 mHz error and 1e-8 for a 10 mHz error.

FIG. 14b shows the typical sets of errors between estimated DTO (from satellite ephemeredes, based on the known position of the ground station) and measured DTO over a period of 48 hours. The rms error, 300, on an individual measurement is around 0.3 microsecond, in this example. Also shown is the interpolated curve using a curve fitting process. From the curve fitting process, the rms error in DTO dot, 302, is 3.4 e-12 corresponding to an allowable frequency difference of around 200 MHz to achieve a maximum FDOA_n error of 1 mHz, according to FIG. 14a.

Most simply, we proceed with a single calibrator and three reference signals. The only requirements for the calibrator are that it must have common phase degradation with the reference signals and the unknown signal to be measured and that it must be at a fixed position on the ground. Whether this is achieved is a function of the design of the affected and adjacent satellites. If this is not the case, the calibrator can be transmitted from a point on the ground, in sequence with the measurements and tuned alternately to the transponders of interest for the individual reference signals. The calibrator need not be a strong signal provided it is of reasonable strength in both satellite channels and can be placed at the edge of the transponder, where it does not interfere with the traffic accesses.

It has been found, both by simulation and actual observation, that small perturbations in satellite position and velocity result in DSR and DSRR errors described by:

$$\delta DSR = \delta DSR_0 + \delta\dot{DSR}_0(t-t_0) + \delta DSR_I \cos(\omega_e t) + \delta DSR_Q \sin(\omega_e t) \quad (25)$$

$$\delta DSRR\_n = \delta DSRR\_n_0 + \delta DSRR\_n_I \cos(\omega_e t) + \delta DSRR\_n_Q \sin(\omega_e t) \quad (26)$$

where:

| | |
|---|---|
| δDSR = | error in DSR |
| δDSR₀ = | mean DSR error over a siderial day |
| δDṠR₀ = | rate of change of DSR error offset |
| δDSR_I = | in phase component of sinusoidal oscillation of DSR error |
| δDSR_Q = | quadrature component of sinusoidal oscillation of DSR error |
| δDSRR_n = | error in DSRR_n |
| δDSRR_n₀ = | mean DSRR_n error over a sidereal day |
| δDSRR_n_I = | in phase component of sinusoidal oscillation of DSRR_n error |
| δDSRR_n_Q = | quadrature component of sinusoidal oscillation of DSRR_n error |
| ω_e = | angular rotation rate of Earth |
| t = | elapsed time (from arbitrary epoch) |

The definitions of angular rotation rate and elapsed time are mutually dependent, i.e. if the elapsed time is in seconds, the angular rotation rate is in units of radians/second. Also, the values of the in-phase and quadrature components depend on the selection of the time epoch.

For observations taken over a limited time range, further simplification is possible since the sine and cosine terms can be expanded as polynomials in the radian angle. Dependent on the time range it can be shown that errors of the order of 0.07% are produced over a time period of 160 minutes centred on the epoch. If extended data are available, e.g. over a period of a day or more, the full sinusoidal expansion could be used. It can be seen from the equations (25) and (26) that for the DSR measurements, a minimum of four suitably spaced measurements will enable the coefficients of (25) to be determined. If the measurements are noisy, the coefficients will be in error. By the use of more than four measurements, each with independent noise, a degree of noise smoothing can be achieved. In practice the number of measurements will be significantly greater than four, resulting in a considerable amount of averaging of the noise. For the DSRR measurements, a minimum of three suitably spaced measurements will enable the coefficients of (26) to be determined. Again the number of measurements will be significantly greater than three to enable significant noise averaging.

Where the ephemeris error contributions for a number of known locations are observed in a sequential manner and these observations include measurements on an unknown location the ephemeris correction at the unknown location can be inferred from an interpolation of the measurements of the known locations to the times of the measurements of the unknown location. Once the ephemeris errors have been estimated for the times of the measurements of the unknown location, these ephemeris errors can be spatially interpolated to give the estimate of ephemeris error for the unknown location.

It is also possible to extrapolate measurements from an earlier time to the time of measurement of an unknown signal. Likewise, it is also possible to make measurements at a time later than the time of measurement of the unknown signal and which will reduce the errors in the estimate of ephemeris error at the time of measurement of the unknown signal.

Figure 15:
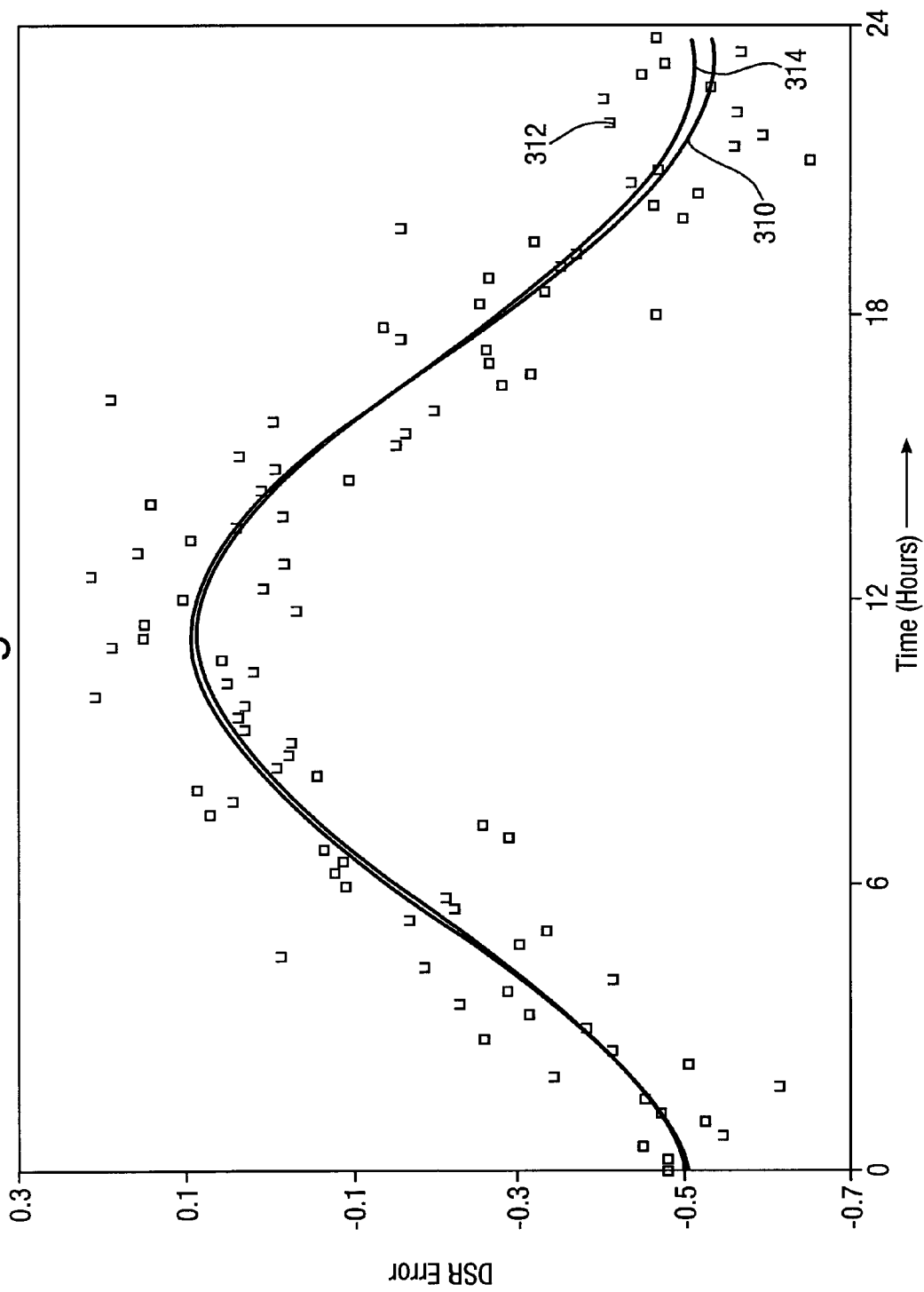
FIGS. 15 & 16 shows simulated examples of temporal error in Differential Slant Range (DSR)

FIG. 15 shows a simulated example of error in DSR for 96 evenly spaced observations over a period of 24 hours. In FIG. 15, trace 310 is the time plot of ephemeris error in DSR uncorrupted by noise. Also shown are noise-corrupted 'observations' 312. Finally the estimated least-squares fitted curve 314 is shown. For fitting an offset and in-phase and quadrature components, the rms error in each observation is reduced by $\sqrt{3}/\sqrt{N}$ for N uniform observations over 24 h, where N>>3. As an example if N=96 and each individual measurement has an rms error of 10 mHz, the interpolated error would be of the order of 2 mHz. Clearly as the interpolated error varies inversely only as the square root of the number of observations, it is important to make the individual measurements with as small an error as possible. For example, reducing the individual measurement error by an order of magnitude reduces the number of measurements to be made by two orders of magnitude.

Figure 16A:
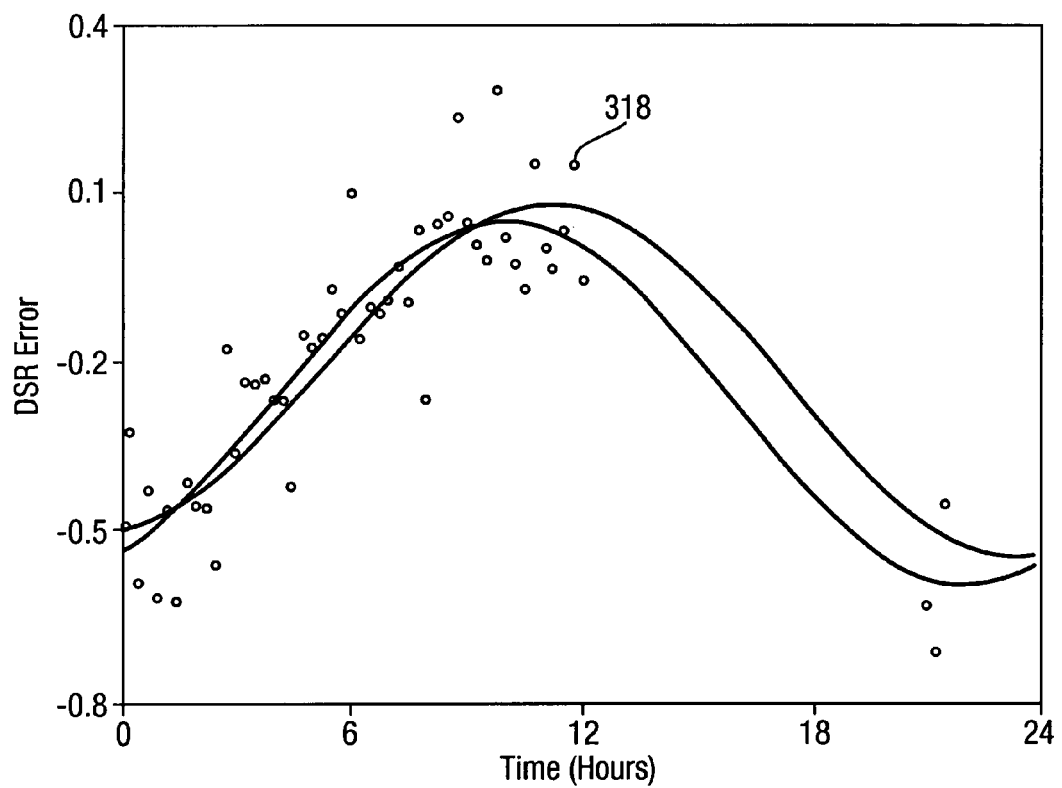
Figure 16B:
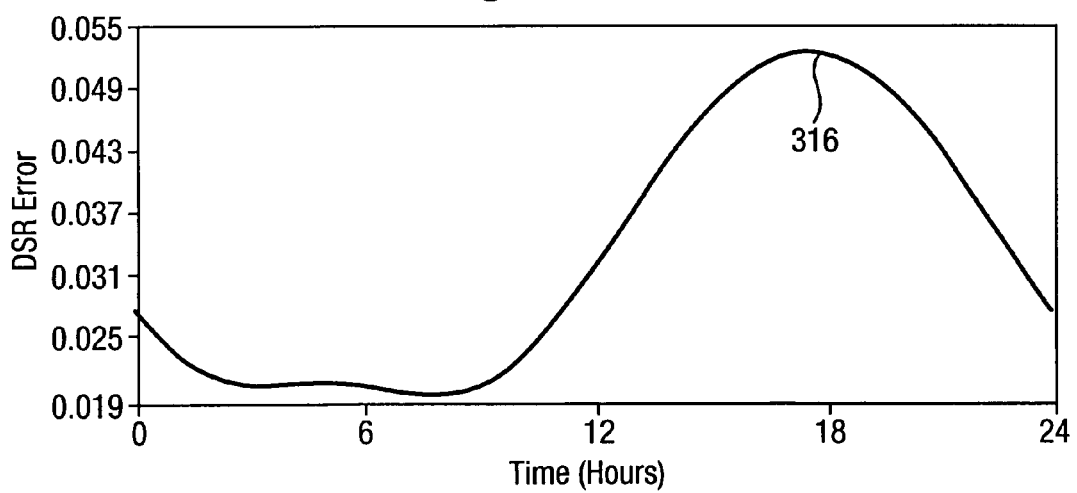

If less than 24 hours of reference data are available, the reference data can be extrapolated. FIG. 16 shows an example of the use of sparse data and including an estimate of the error in the interpolated/extrapolated value.

It can be seen from FIG. 16 that the rms error is worst case, 316, of the order of 0.05 compared to about 0.1 for each observation 318. This reduction is significantly less than for 24 hours of data. An example would be sparse observations with an rms error of 5 mHz reduced to around 2.5 mHz by the interpolation process. The exact performance depends on the number of observations and the time distribution compared to the time of observation. In particular, over the timescale of a few hours, the curve can be represented by a mean value and a slope. Assuming the individual measurements have the same error, the error in the mean value decreases as the square root of the number of points and the error in the slope decreases as the time duration and the square root of the number of points.

The main point is that the rms error can be calculated based on the estimate of parameter errors in the least-squares fit and which is possible for an arbitrary collection of observations and prediction time.

The relationship between rms error and confidence interval has been considered in the prior art (D. J. Torrieri, "Statistical Theory of Passive Location Systems", IEEE Trans., AES-20, 2, Mar. 1984), however for the purposes of correction of ephemeris errors, the use of rms error provides adequate accuracy.

Figure 17:
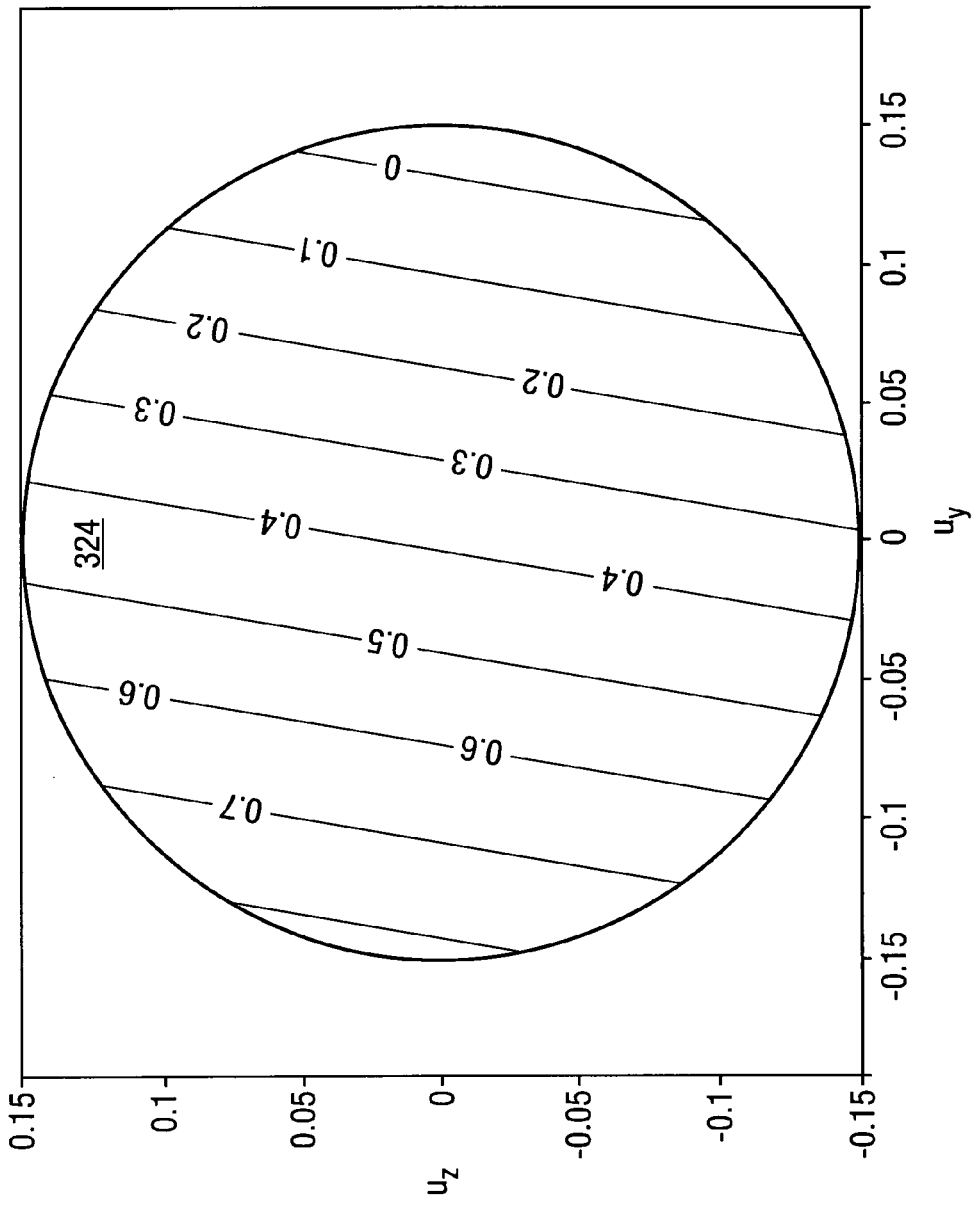
FIGS. 17 & 18 illustrate errors in DSR and Differential Slant Range Rate (DSRR) as a function of position for a pair of nominally geostationary satellites.
Figure 18:
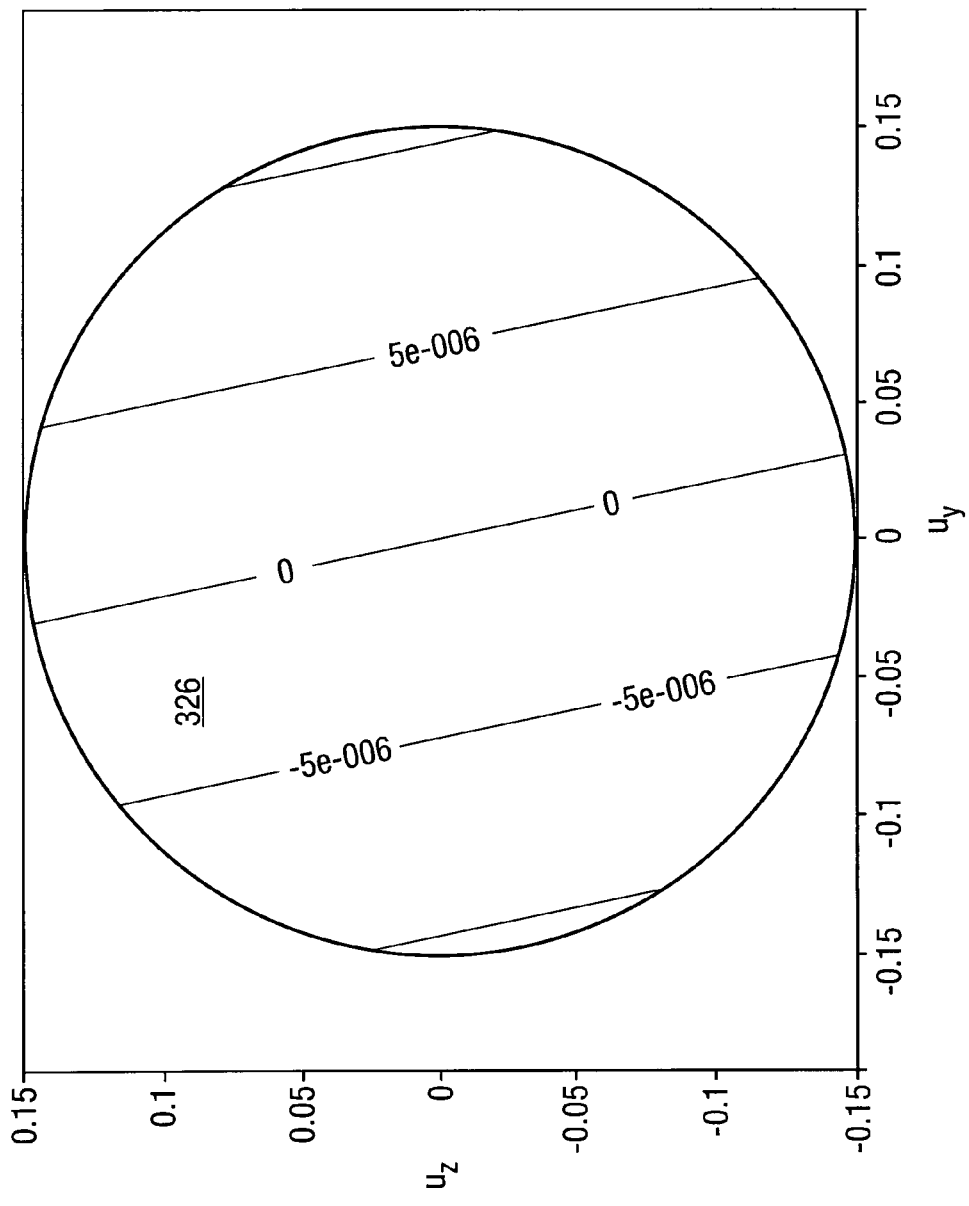

Spatial interpolation is considered based on the limitation that the angular separation between the satellites is small—a maximum of around 10 deg. Given this limited angular separation it can be shown that the spatial distribution of ephemeris error is approximately linear in $u_y$ and $u_z$. FIGS. 17 and 18 show the spatial variation of DSR 324 and DSRR 326 error for a pair of nominally geostationary satellites separated in longitude by 3 deg.

In order to spatially interpolate it can be seen that the minimum number of known locations that need to be used depends on whether or not a DTO is available for a phase calibrator.

If the phase calibrator does not provide a DTO, then three position calibrators need to be measured. These measurements enable the calculation of partial derivatives from:

$$\delta DSR(u_y, u_z) = \qquad (27)$$
$$\delta DSR(u_{y0}, u_{z0}) + (u_y - u_{y0})\frac{\partial \delta DSR}{\partial u_y} + (u_z - u_{z0})\frac{\partial \delta DSR}{\partial u_z}$$

where the partial derivatives are evaluated at $u_y = u_{y0}$ and $u_z = u_{z0}$. A 2×2 simultaneous equation results.

$$\begin{bmatrix}(u_{y1}-u_{y0}) & (u_{z1}-u_{z0}) \\ (u_{y2}-u_{y0}) & (u_{z2}-u_{z0})\end{bmatrix}\begin{bmatrix}\frac{\partial \delta DSR}{\partial u_y} \\ \frac{\partial \delta DSR}{\partial u_z}\end{bmatrix} = \qquad (28)$$
$$\begin{bmatrix}\delta DSR(u_{y1}, u_{z1}) - \delta DSR(u_{y0}, u_{z0}) \\ \delta DSR(u_{y2}, u_{z2}) - \delta DSR(u_{y0}, u_{z0})\end{bmatrix}$$

If the phase calibrator does provide DTO and the position calibrators are suitably spaced from the phase calibrator, equation (28) still applies but the measurements are obtained from one phase calibrator and two position calibrators that are suitably spaced relative to the phase calibrator.

Having estimated the partial derivatives from (28) they are applied to the calculation of DSR correction in (27) based on the estimated values of $u_y$, $u_z$ given the estimated location.

With due account to FIG. 18, it is again possible to write:

$$\delta DSRR(u_y, u_z) = \qquad (29)$$
$$\delta DSRR(u_{y0}, u_{z0}) + (u_y - u_{y0})\frac{\partial \delta DSRR}{\partial u_y} + (u_z - u_{z0})\frac{\partial \delta DSRR}{\partial u_z}$$

and to solve for the partial derivatives through:

$$\begin{bmatrix}(u_{y1}-u_{y0}) & (u_{z1}-u_{z0}) \\ (u_{y2}-u_{y0}) & (u_{z2}-u_{z0})\end{bmatrix}\begin{bmatrix}\frac{\partial \delta DSRR}{\partial u_y} \\ \frac{\partial \delta DSRR}{\partial u_z}\end{bmatrix} = \qquad (30)$$
$$\begin{bmatrix}\delta DSRR(u_{y1}, u_{z1}) - \delta DSRR(u_{y0}, u_{z0}) \\ \delta DSRR(u_{y2}, u_{z2}) - \delta DSRR(u_{y0}, u_{z0})\end{bmatrix}$$

Equation (30) gives the means of determining the slope of the errors in DSRR in the y and z directions. Here the subscript 0 would refer to the position of a calibrator signal and the subscripts 1 and 2 would refer to the two other reference signals In principle, these slopes could be determined where different calibrator signals were used for each reference. This circumstance might arise, for example, where the reference signals were in satellite channels where the translation oscillator had independent phase for the two reference signal/calibration signal combinations.

A problem arises however in using (30) in that the error in DSRR for the calibrator signal is not known, in general. What we typically have available is the error in DSRR of a reference signal relative to the calibrator ie $$\delta DSRR\_n = \delta DSRR(R) - \delta DSRR(C) \qquad (31)$$

which is a normalized differential slant range rate error.

Most simply, we proceed with a single calibrator and three reference signals. The only requirements for the calibrator are that it must have common phase degradation with the reference signals and the unknown signal to be measured and that it must be at a fixed position on the ground. A calibrator is generally:

On a transponder that utilizes the same translation oscillator as the reference and unknown signals or at least a translation oscillator derived from the same master reference oscillator and with the same translation frequency. This situation must prevail on both the main and adjacent satellites.

On either the main or adjacent satellite.

Can be on the edge of the nominal transponder bandwidth

Equation (24) allows the calculation of ephemeris error for each of the known reference stations, as referred to the calibration station based on the normalised FDOA measurements and the calculations based on the known geographical positions of the reference and calibration signals.

This term is the error between the calculated difference in Differential Slant Range Rate between the Calibration site and the $i^{th}$ reference signal site, based on knowledge of the geographical positions of the reference and calibration signals and the positions and velocities of the satellites. and the measured value. This difference, in turn, is subject to random measurement error, which will be looked at in the next section.

A straightforward extension of (29) and (30) gives:

$$\delta DSRR\_n(u_y, u_z) = \delta DSRR\_n(u_{y0}, u_{z0}) + \qquad (32)$$
$$(u_y - u_{y0})\frac{\partial \delta DSRR\_n}{\partial u_y} + (u_z - u_{z0})\frac{\partial \delta DSRR\_n}{\partial u_z}$$

and to solve for the partial derivatives through:

$$\begin{bmatrix}(u_{y1}-u_{y0}) & (u_{z1}-u_{z0})\\(u_{y2}-u_{y0}) & (u_{z2}-u_{z0})\end{bmatrix}\begin{bmatrix}\frac{\partial \delta DSRR\_n}{\partial u_y}\\\frac{\partial \delta DSRR\_n}{\partial u_z}\end{bmatrix} = \qquad (33)$$
$$\begin{bmatrix}\delta DSRR\_n(u_{y1}, u_{z1}) - \delta DSRR\_n(u_{y0}, u_{z0})\\\delta DSRR\_n(u_{y2}, u_{z2}) - \delta DSRR\_n(u_{y0}, u_{z0})\end{bmatrix}$$

From the similarity in form of (29) and (30) and (32) and (33) it is convenient to define the following vectors:

$$t_i=(u_{yi}-u_{y0})e_y+(u_{zi}-u_{z0})e_z;\ i=1,2$$

$$t=(u_y-u_{y0})e_y+(u_z-u_{z0})e_z \qquad (34)$$

Let $\delta D$ be the term to be interpolated, be it $\delta DSR$ or $\delta DSRR\_n$. Furthermore let $\delta D$ be subscripted by 0, 1 or 2 dependent on the location of the position calibrator signal measurement. Furthermore, let the unknown value be represented by $\delta D$ unsubscripted.

It can be shown that:

$$\delta D = q\delta D_2 + p\delta D_1 + (1-p-q)\delta D_0 \qquad (35)$$

where:

$$q = \left[\frac{(t \times t_1) \cdot e_z}{(t_2 \times t_1) \cdot e_z}\right];\ p = \left[\frac{-(t \times t_2) \cdot e_z}{(t_2 \times t_1) \cdot e_z}\right]$$

Finally, the rms error in the term $\delta D$ is given by:

$$\sigma^2 = q^2\sigma_2^2 + p^2\sigma_1^2 + [1-p-q]^2\sigma_0^2 \qquad (36)$$

where $\sigma_i$ is the rms error in the $i^{th}$ ($\delta DSR$ or $\delta DSRR\_n$) observation.

Equation (36) enables the rms error to be predicted for any value of $u_y$ and $u_z$ for an unknown signal in terms of the rms errors in $\delta DSR$ or $\delta DSRR$ for three known positions.

It should be noted that the geographical position of the calibrator does not affect the performance, only the geographic position of the reference signals.

Figure 19:
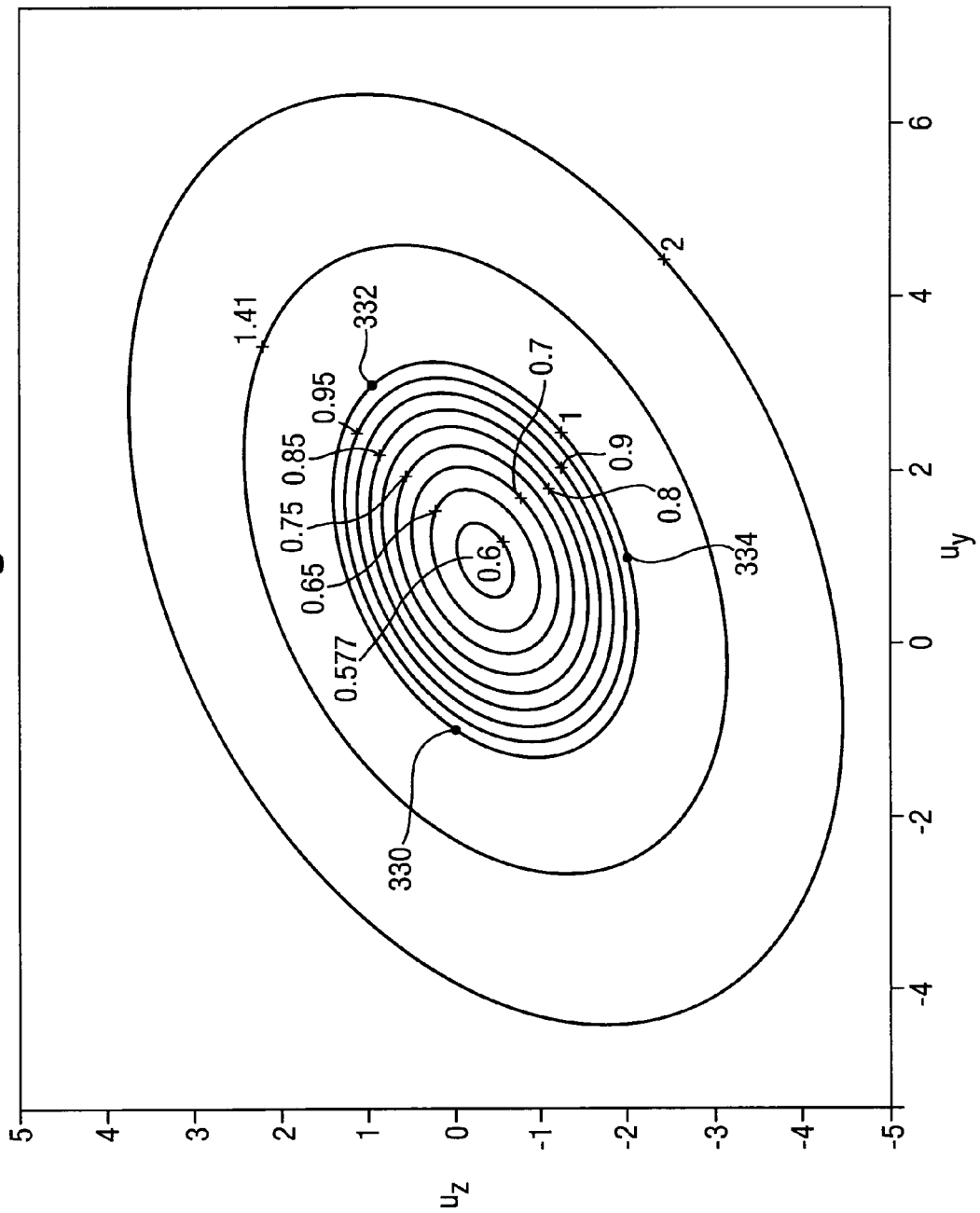
FIGS. 19 & 20 illustrate interpolation of ephemeris errors.
Figure 20:
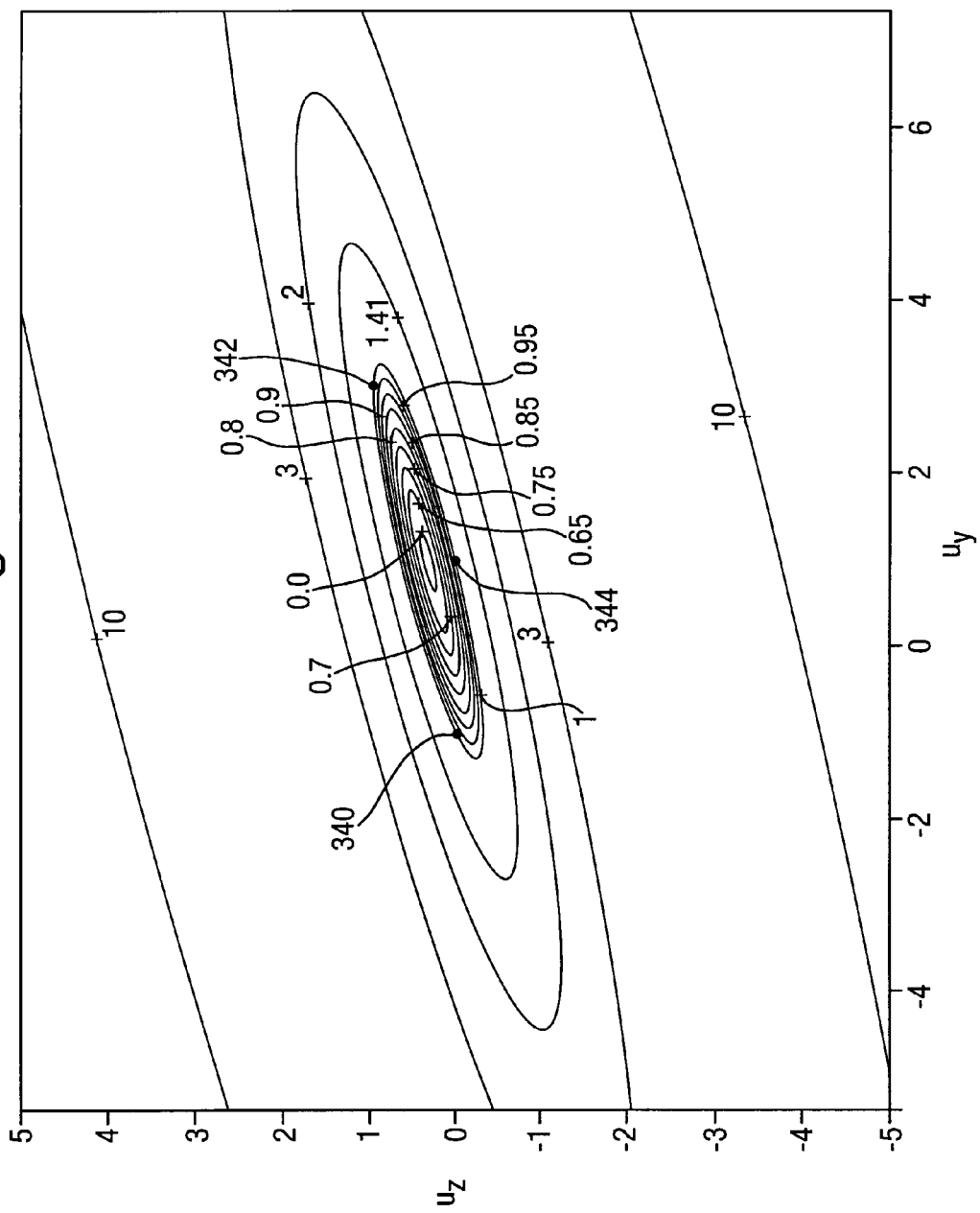

Illustrations of the impact on the geographic disposition of reference signals on the ability to interpolate the ephemeris error to an unknown position is shown in FIGS. 19 and 20 for a good and poor distribution of reference signals respectively.

In FIGS. 19 and 20, the interpolation is carried out between three points of unity standard deviation typified by 330, 332, 334 and 340, 342 and 344. The minimum standard deviation is $1/\sqrt{3}$ in both cases. In FIG. 20, much higher multiplication factors of the standard deviation are present well outside the scope of the position calibrators.

Where there are more than three reference sources available, it may be possible to combine them in a least-squares sense. However, a possible avenue is to select the combination of three reference signals that minimizes the rms error at the (approximate) position of the unknown signal.

If there are six signal sources, for example, there are twenty distinct combinations to be calculated. Since the computations are simple, the overall burden is small. The combination with the minimum rms error at the unknown position is chosen for the correction.

The process is as follows. Choose a suitable calibrator and reference signals. The calibrators are chosen with due regard to the transponder arrangement and the reference signals are chosen with regard to the calibrators. As has previously been mentioned, particularly useful for calibrators are sites with transmitters operating simultaneously in multiple transponders. Alternatively, a transmission can be injected sequentially into transponders containing reference signals under control of the monitoring station if it is not possible to find a set of reference signals and a calibrator with suitable geographic distribution on the same transponder as the unknown signal (or a transponder with a translation oscillator having phase coherence with the transponder containing the unknown signal).

Importantly it is also possible to use the calibrator signal as one of the reference signals, requiring then only two independent reference signals. This is most useful when the geographic distribution of the calibrator and two other independent reference signals provides a favourable interpolation error.

In this case (35) becomes:

$$\delta D = q\delta D_2 + p\delta D_1 \qquad (37)$$

Figure 21B:
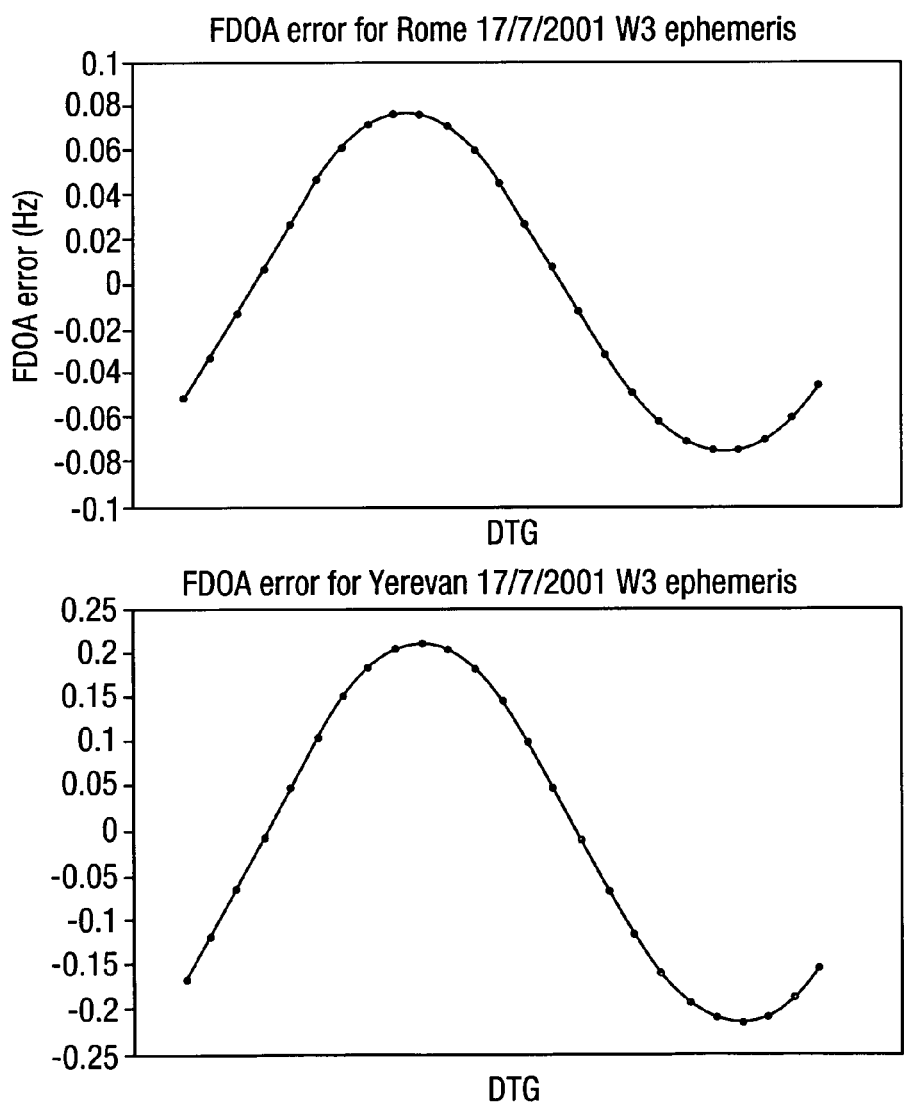

Measurements of the reference signals and the unknown signal are typically made cyclically relative to the calibration signal as shown in FIG. 21a. Here a calibrator signal 350 is used from Defford, UK and measurements are made at Beirut 352 and Yerevan, Armenia 354. Corrections on the DSR and DSRR_n of the reference signals can be interpolated to the time of measurement of the nominally unknown signal at Rome 356.

Techniques of relating observations of TDOA and FDOA to positions on the ground have been addressed previously. What is addressed here is a general method of associating multiple measurements of one or more transmitters at a single location to give an indication of location of that transmitter or those transmitters.

Figure 22A:
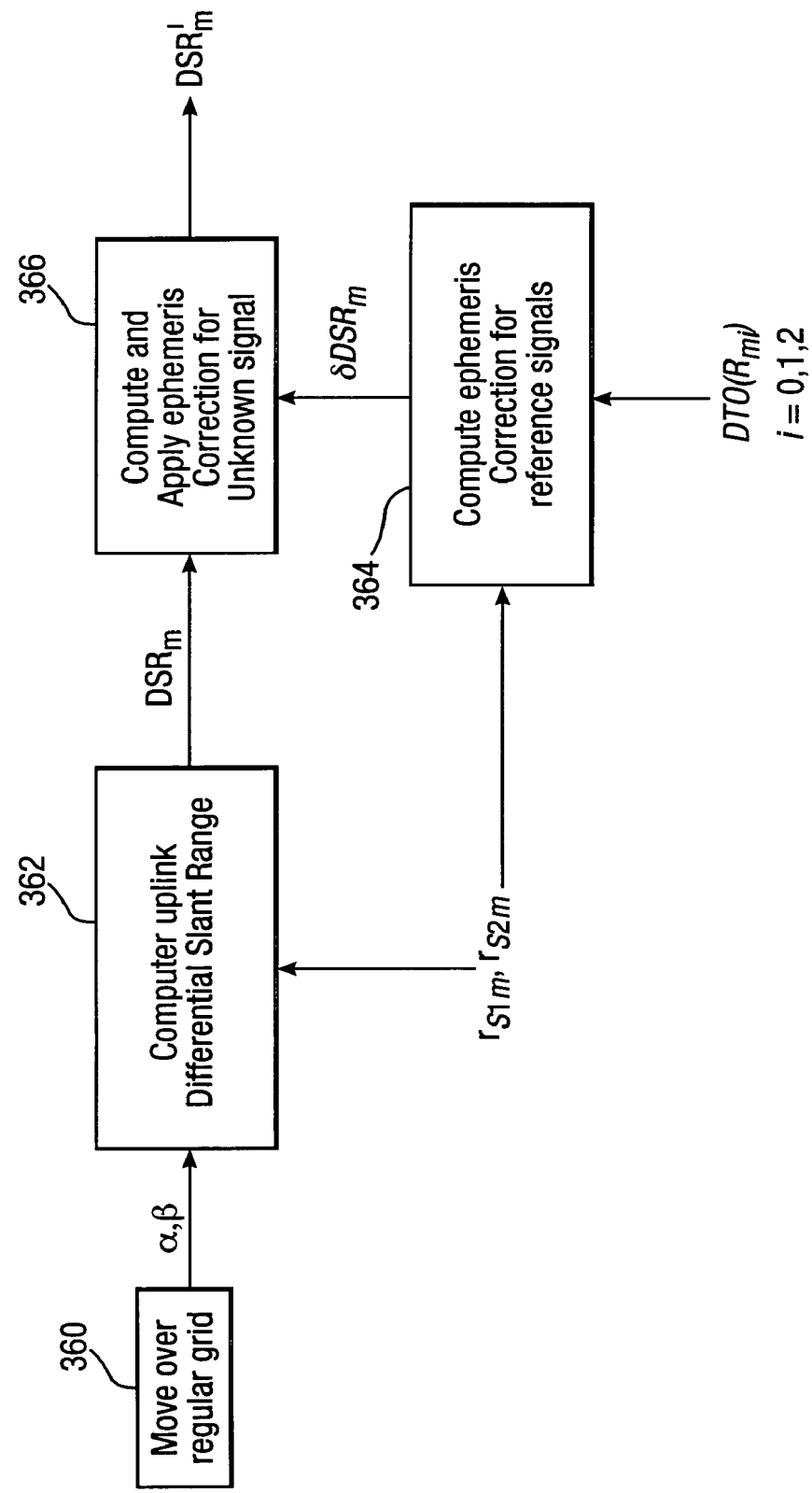
FIGS. 22a & 22b show steps in geolocation of a transmitter by association of Time Difference Of Arrival (TDOA) measurements.
Figure 22B:
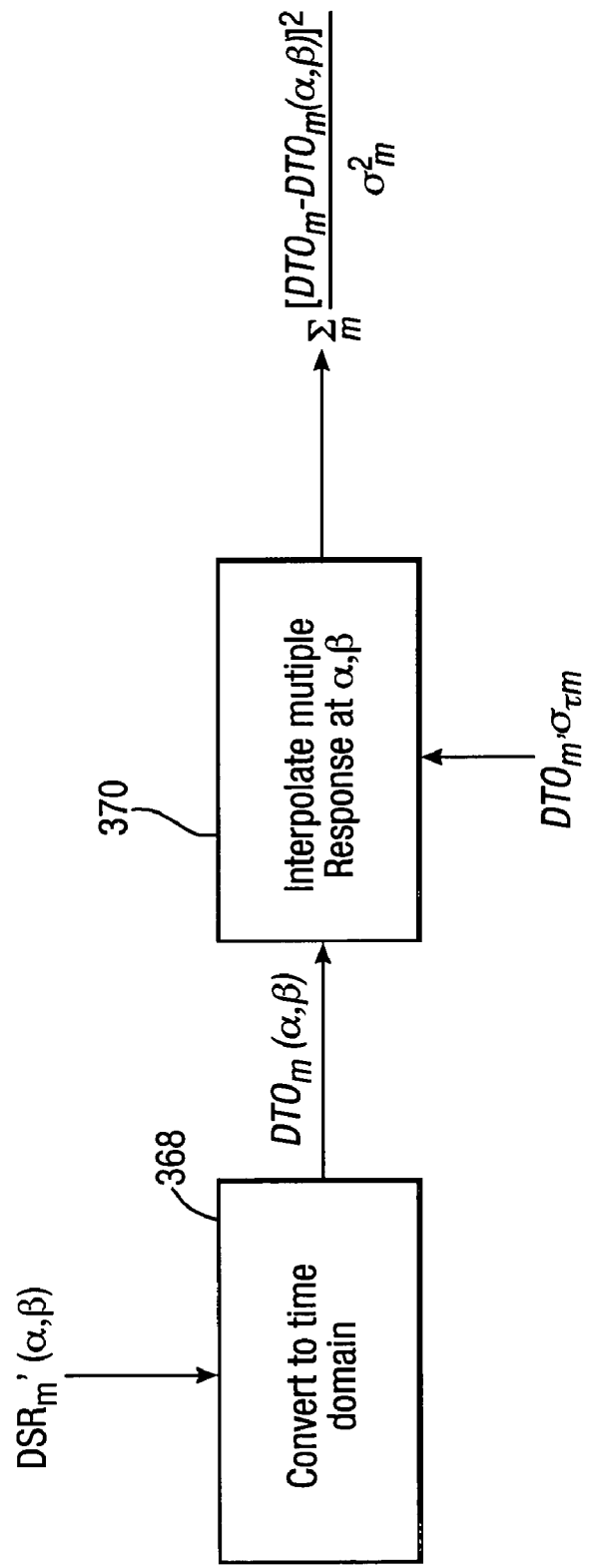

FIGS. 22a and 22b show the use of DTO measurements only, as the simplest example. This is even though the intersection of multiple DTO lines of position will often yield an inaccurate location.

The region of the Earth where the location is, likely to occur is gridded (360) at sufficiently fine resolution in longitude and latitude. For each point on the grid and for each time 'm' of the observation of the unknown signal, a Differential Slant Range is calculated, based on the knowledge of the positions of the satellites (362). Based on the temporally interpolated ephemeris correction of DSR for the reference signals, a correction to the calculated DSR at the longitude, latitude position is computed 364 by spatial interpolation using e.g. (37) and applied to the calculated DSR to produce a corrected DSR' at time m (366). The process is repeated for the whole set of points on the grid of longitude and latitude and for every observation time m.

Referring to FIG. 22b, for each observation time m the calculated, corrected DSR' is converted to a $DTO_m(\alpha,\beta)$ (368) where the $\alpha,\beta$ functionality is used to distinguish the calculated from the measured $DTO_m$. The measured $DTO_m$ has associated with it an error denoted by $\sigma_{\tau m}$.

The term:

$$\chi^2(\alpha, \beta) = \sum_m \frac{[DTO_m - DTO_m(\alpha, \beta)]^2}{\sigma_{\tau m}^2} \tag{38}$$

is computed (370) and retained for each longitude, latitude pair in the grid. When all points on the grid have been computed, all points where:

$$\chi^2(\alpha,\beta) - \chi_{min}^2 = -2\ln(1-P) \tag{39}$$

where P is the required probability of finding the correct location and $\chi_{min}^2$ is the minimum value of $\chi^2$ determined by interpolation, are joined to define the P probability contour (typically with a contouring routine). A typical value of P would be 0.95, corresponding to 95% probability.

Figure 23A:
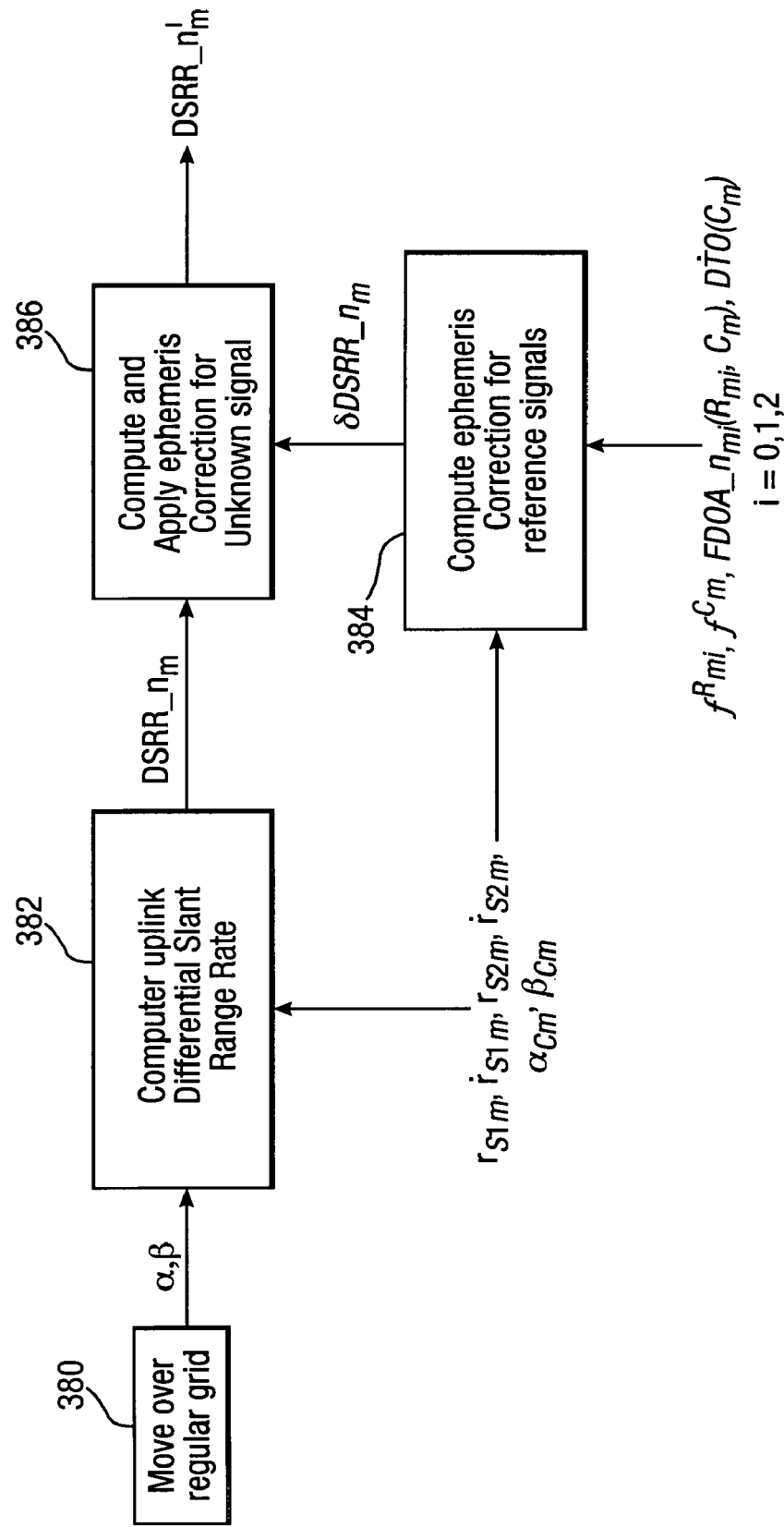
FIGS. 23a & 23b show steps in geolocation of a transmitter by association of Frequency Difference Of Arrival (FDOA) measurements.
Figure 23B:
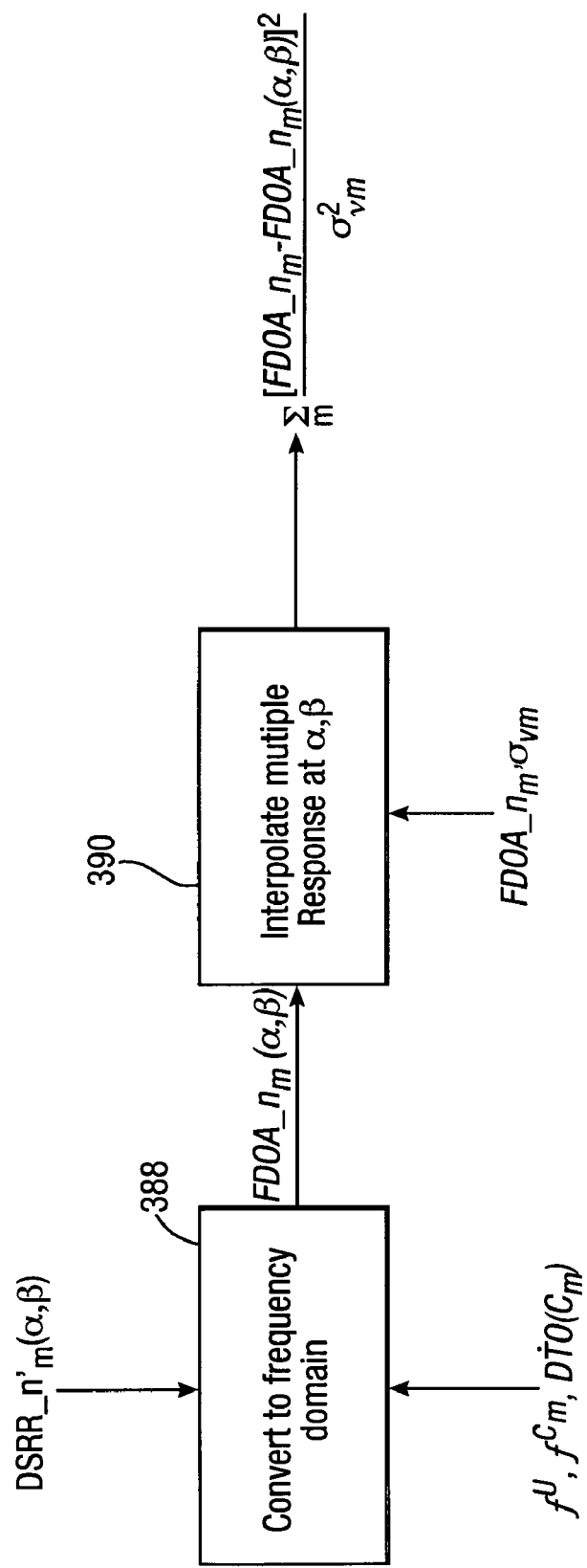

FIGS. 23a and 23b shows the situation for the use of FDOA_n measurements only. This situation may occur when there is insufficient timing information available from the signal under investigation (typically of unknown location).

The region of the Earth where the location is likely to occur is gridded as sufficiently fine resolution in longitude and latitude (380). For each point on the grid and for each time 'm' of the observation of the unknown signal, a Differential Slant Range Rate normalized to the calibration signal ie DSRR_n is calculated (382), based on the knowledge of the positions and velocities of the satellites and the location of the calibrator. Based on the temporally interpolated ephemeris correction of DSRR_n for the reference signals (calculated from knowledge of the positions and velocities of the satellites, uplink frequency of the reference signals, uplink frequency of the calibrator signal and the rate of change of DTO of the calibrator signal, which may be calculated or, preferably, measured) (384), a correction to the calculated DSRR_n at the longitude, latitude position is computed by spatial interpolation using e.g. (37) and applied to the calculated DSRR_n to produce a corrected DSRR_n' at time m (386). The process is repeated for the whole set of points on the grid of longitude and latitude and for every observation time m.

For each observation time m the calculated, corrected DSRR_n' is converted to a FDOA_$n_m(\alpha,\beta)$ (388) where the $\alpha,\beta$ functionality is used to distinguish the calculated from the measured FDOA_$n_m$. The measured FDOA_$n_m$ has associated with it an error denoted by $\sigma_{vm}$.

The term:

$$\chi^2(\alpha, \beta) = \sum_m \frac{[FDOA\_n_m - FDOA\_n_m(\alpha, \beta)]^2}{\sigma_{vm}^2} \tag{40}$$

is computed and retained for each longitude, latitude pair in the grid (390). To define a probability ellipse, equation (39) is used along with a contouring routine to find the P probability contour.

In the case where correlated pairs of DTO and FDOA_n measurements are made, such as would be the case where measurement is made of the peak of a Cross Ambiguity Function surface in accordance with equations (15), (16) and (17) and where the bandwidth and duration of the signals were both sufficient to generate measurements of useful precision. FIG. 24 shows this situation.

The region of the Earth where the location is likely to occur is gridded as sufficiently fine resolution in longitude and latitude (400). As per FIG. 24, for each point on the grid and for each time 'm' of the observation of the unknown signal, a Differential Slant Range i.e. DSR and a Differential Slant Range Rate normalized to the calibration signal ie DSRR_n are calculated (402), based on the knowledge of the positions and velocities of the satellites and the location of the calibrator. Based on the temporally interpolated ephemeris correction of DSR and DSRR_n for the reference signals (calculated from knowledge of the positions and velocities of the satellites, uplink frequency of the reference signals, uplink frequency of the calibrator signal and the rate of change of DTO of the calibrator signal, which may be calculated or, preferably, measured) (404), a correction to the calculated DSR and DSRR_n at the longitude, latitude position is computed by spatial interpolation using e.g. (37) and applied to the calculated DSR and DSRR_n to produce corrected DSR' and DSRR_n' at time m (406). The process is repeated for the whole set of points on the grid of longitude and latitude and for every observation time m.

For each observation time m the calculated, corrected DSR' and DSRR_n' are converted to a $DTO_m(\alpha,\beta)$ and FDOA_$n_m(\alpha,\beta)$ where the $\alpha,\beta$ functionality is used to distinguish the calculated from the measured values 408. The measured $DTO_m$ and FDOA_$n_m$ have associated with them errors denoted by $\sigma_{\tau m}$ and $\sigma_{vm}$.

Furthermore there is a correlation between time and frequency error given by $\rho_{\tau vm}$ in accordance with equation (17).

The term:

$$\chi^2(\alpha, \beta) = \sum_m \frac{\sigma_{vm}^2 [DTO_m - DTO_m(\alpha, \beta)]^2}{(\sigma_{\tau m}^2 \sigma_{vm}^2 - \rho_{\tau vm}^4)} + \tag{41}$$

$$\sum_m \frac{\rho_{\tau vm}^2 + \sigma_{\tau m}^2 [FDOA\_n_m - FDOA\_n_m(\alpha, \beta)]^2}{(\sigma_{\tau m}^2 \sigma_{vm}^2 - \rho_{\tau vm}^4)}$$

$$2[DTO_m - DTO_m(\alpha, \beta)]$$
$$[FDOA\_n_m - FDOA\_n_m(\alpha, \beta)]$$

is computed and retained for each longitude, latitude pair in the grid 410. To define a probability ellipse, (39) is used along with a contouring routine to find the P probability contour.

It is possible to utilize the Cross Ambiguity Function surface directly, rather than the interpolated $DTO_m$, FDOA_$n_m$ and their associated errors. Examples of where this would be appropriate is where the surface shape is individually complex, e.g. with multiple peaks and it is difficult to infer which of the peaks is the correct peak. Additionally, the signal to noise ratio of an individual measurement may be sufficiently weak as to result in the wanted peak being indistinguishable from a number of other noise peaks.

As per FIG. 25a, for a given α and β, the dB version of the Cross Ambiguity Function is evaluated at the determined $DTO_m$ and $FDOA\_n_m$ (420) by interpolation from the DTO and FDOA_n values for which the CAF surface is available. It is assumed that the region of availability of the CAF surface (limits of DTO and FDOA_n) is sufficient to encompass all pairs of $DTO_m$ and $FDOA\_n_m$ determined by the selected range of α and β.

For each measurement surface, the mean noise level is obtained by averaging the response outside the main peaks of the surface. If a peak is not evident due to the weak peak response, the average noise level is obtained from the entire surface.

For each α, β the surface response at the computed DTO and FDOA_n values at that α, β is used to determine the $SNR_m$. Having obtained a set of CAF responses and their respective SNRs over α, β, the term:

$$\chi^2(\alpha, \beta) = -\sum_m SNR_m CAF_m \bigg|_{dB} \quad (42)$$

is computed 422. The process is illustrated in FIG. 25a.

Where the individual correlation surface is weak, it may be possible to sum the dB versions of the individual surfaces to result in an identifiable peak. Having identified the α and β for the peak response, the individual surfaces can be analysed for the SNR at this point.

Where the dB versions of a number of surfaces of weak signal to noise ratio are summed, it is possible to infer the individual signal to noise ratios as follows.

The rms value of the dB variation of the averaged surface is determined away from the correlation peak. For true Rayleigh distributed noise, this should be 5.57 dB. An effective average factor can be determined as the square of the ratio of the actual rms dB variation compared to 5.57 dB. Thus if the dB rms variation is 2 dB, the effective averaging factor is 7.75.

Then the dB signal+noise level is measured and compared to the average noise level, away from the peak. FIG. 25b enables the standard deviation of the single surface noise to be estimated for the surface with the same dB signal+noise level and average noise level. Having obtained the standard deviation, this is reduced by the square root of the effective averaging factor and a true signal to noise ratio in dB is estimated from FIG. 25c. From FIG. 25d, the dB signal to noise ratio is reduced by the Processing Gain increase for incoherent summation to give the dB signal to noise ratio for a single surface. As an example, if the indicated (s+n)/n were 10 dB, the standard deviation would be 2.8 dB from FIG. 25b. This figure is reduced by the square root of the effective averaging factor, say √7.75 to give a standard deviation of 1 dB. Use of FIG. 25c gives a true signal to noise ratio of 19 dB. Use of FIG. 25d gives a per surface signal to noise ratio of 19–7.5 dB=11.5 dB. This factor in linear power terms ie 14× is used in equation (42).

In the situation where there are mixed but independent measurements of DTO and FDOA_n or there is negligible correlation between the DTO and FDOA_n measurement errors, then results of the form (38) can be directly combined with results of the form (40) to give an overall chi-squared which can be used to form an overall probability boundary in accordance with (39).

FIGS. 26a, 26b and 26c show the improvement possible using the association approach. A (hypothetically) unknown transmitter 430 is located at Rome. A single pair of DTO 432 and FDOA_n 434 measurements along with their errors 436, 438 produces an estimated error ellipse 440. The reference position was at Defford, UK. The true location of the transmitter lies at the periphery of the ellipse and the major axis of the ellipse is around 666 km and the minor axis is around 15 km. In FIG. 26c, a total of six pairs of DTO and FDOA_n measurements are associated after correction for ephemeris errors based on observations on transmitters at Beirut and Yerevan. The major axis of the error ellipse is now 7 km and the minor axis is 6 km. The true location of the transmitter 444 is 1 km away from the 'maximum likelihood' result 446 at the centre of the ellipse.

The invention claimed is:

1. A method of locating the source of an unknown signal, characterised in that the method comprises the steps of:
   i. calculating a differential offset for a signal for each of a plurality of positions within a region in which the transmitter must lie, for each of a series of times m with respect to first and second signal relays and respective first and second receivers, the positions of the signal relays and receivers being known;
   ii. generating a cross-ambiguity function (CAF) using data corresponding to samples of the unknown signal received at the first and second receivers via the first and second signal relays respectively;
   iii. estimating the level of noise and values of waveform parameters from the CAF; and
   iv. using data generated in steps (i), (ii) and (iii) to obtain a measure of the likelihood that the source is located within defined areas within said region;
   wherein the differential offsets are differential time offsets (DTOs), or differential frequency offsets (DFOs), or both DTOs and DFOs.

2. The method of claim 1 further comprising the step of evaluating a differential offset and its error at each time m for the unknown signal with respect to the first and second relays and the first and second receivers using data corresponding to signal samples obtained from the receivers.

3. The method of claim 2 wherein the method comprises the steps of:
   (i) defining intervals of latitude and longitude in which the source is likely to be located;
   (ii) defining a matrix of positions (α, β) within said intervals, each position having latitude α and longitude β;
   (iii) for each position (α, β) calculating a differential offset $D_m(\alpha, \beta)$ for a signal originating at the position (α, β) for each of a series of times m, with respect to first and second signal relays and respective first and second receivers, the positions of the signal relays and receivers being known;
   (iv) evaluating the differential offset $D_m$ at each time m for the unknown signal with respect to the first and second relays and the first and second receivers using data corresponding to signal samples obtained from the receivers;
   (v) evaluating the error $\sigma_m$ associated with measured values $D_m$ obtained in step (iv);
   (vi) for each position (α, β) calculating the value $$\chi^2(\alpha, \beta) = \sum_m \frac{[D_m - D_m(\alpha, \beta)]^2}{\sigma_m^2}$$

(vii) interpolating a minimum value $\chi^2$ min of the values $\chi^2(\alpha, \beta)$; and (viii) associating positions $(\alpha, \beta)$ in the matrix for which $\chi^2(\alpha, \beta) = \chi^2_{min} - 2 \ln(1-P)$ to define a region within which the source of the unknown signal is located with a pre-selected probability P;

wherein the calculated and measured differential offsets are either differential time offsets $DTO_m(\alpha, \beta)$, $DTO_m$ or differential frequency offsets $DFO_m(\alpha, \beta)$ $DFO_m$.

4. The method of claim 2 wherein the method comprises the steps of:

(i) defining intervals of latitude and longitude in which the source is likely to be located;

(ii) defining a matrix of positions $(\alpha, \beta)$ within said intervals, each position having latitude $\alpha$ and longitude $\beta$;

(iii) for each position, calculating a differential time offset $DTO_m(\alpha, \beta)$ for a signal originating at the position $(\alpha, \beta)$, for each of a series of times m, with respect to first and second signal relays and respective first and second receivers, the positions of the signal relays and receivers being known;

(iv) for each position, calculating a differential frequency offset $DFO_m(\alpha, \beta)$ for a signal originating at the position $(\alpha, \beta)$, for each of a series of times m, with respect to the first and second signal relays and the first and second receivers;

(v) evaluating the differential time offset $DTO_m$ at each time m for the unknown signal with respect to the first and second relays and the first and second receivers using data corresponding to signal samples obtained from the receivers;

(vi) evaluating the differential frequency offset $DFO_m$ of the unknown signal at each time m with respect to the first and second relays and the first and second receivers, using data corresponding to signal samples obtained from the receivers, to generate measurements correlated with those in step (v);

(vii) evaluating errors $v_{\tau m}, v_{vm}$ associated with the measured values $DTO_m$ and $DFO_m$ obtained in steps (v) and (vi) respectively and the correlation $\rho_{\tau vm}$ therebetween;

(viii) for each position $(\alpha, \beta)$ calculating the value $$\chi^2(\alpha, \beta) = \sum_m \frac{\sigma_{vm}^2 [DTO_m - DTO_m(\alpha, \beta)]^2}{(\sigma_{\tau m}^2 \sigma_{vm}^2 - \rho_{\tau vm}^4)} + \qquad (41)$$

$$\sum_m \frac{\rho_{\tau vm}^2 + \sigma_{\tau m}^2 [DFO_m - DFO_m(\alpha, \beta)]^2}{(\sigma_{\tau m}^2 \sigma_{vm}^2 - \rho_{\tau vm}^4)}$$

(ix) interpolating a minimum value $\chi^2_{min}$ of the values $\chi^2(\alpha, \beta)$; and (x) associating positions $(\alpha, \beta)$ in the matrix for which $\chi^2(\alpha, \beta) = \chi^2_{mm} - 2 \ln(1-P)$ to define a region within which the source of the unknown signal is located with a pre-selected probability P.

5. The method of claim 3 wherein the calculated values $DTO_m(\alpha, \beta)$ and/or $DFO_m(\alpha, \beta)$, as the case may be, are calculated by the steps of:

(i) calculating corresponding values $DSR_m(\alpha, \beta)$ of differential slant range and corresponding values $DSRR_m(\alpha, \beta)$ of differential slant range rate using knowledge of the relays' positions and velocities, or corresponding values $DSR_m(\alpha, \beta)$ of differential slant range or corresponding values $DSRR_m(\alpha, \beta)$ of differential slant range rate using knowledge of the relays' positions and velocities;

(ii) applying respective corrections to values calculated in step (i) to account for ephemeris errors;

(iii) (iii) converting the corrected values generated in step (ii) to values of differential time offset $DTO_m(\alpha, \beta)$ and differential frequency offset $DFO_m(\alpha, \beta)$ or differential frequency offset $DFO_m(\alpha, \beta)$ as the case may be.

6. The method of claim 5 wherein corrections $\delta DSR_m (\alpha, \beta)$ to calculated values $DSR_m (\alpha, \beta)$ of differential slant range are established by the steps of:

(i) temporally interpolating corrections $\delta DSR_m (\alpha, \beta)$ (i=1 to N) for a time m for each of N ground-based reference transmitters having known locations $(\alpha_i, \beta_i)$; and (ii) spatially interpolating a correction $\delta DSR_m (\alpha, \beta)$ for a desired location $(\alpha, \beta)$ using the N corrections generated in step (i), wherein N=3.

7. The method of claim 6 wherein the corrections $\delta DSR_m (\alpha, \beta)$ are obtained by use of two position calibrators and one phase calibrator.

8. The method of claim 6 wherein temporal interpolation of a correction $\delta DSR_m (\alpha_i, \beta_i)$ for the ith reference transmitter for time m is carried out by the steps of:

(i) measuring and calculating differential slant range for said reference transmitter at a series of n times $t_j$ (j=1 to n) and taking the difference between corresponding measured and calculated values to generate a series of j known corrections $\delta DSR_m (\alpha_i, \beta_i)$ (j=1 to n);

(ii) using data generated in step (i) to obtain (a) the correction $\delta DSR_{to} (\alpha_i, \beta_i)$ and rate of change of correction $[\partial/\partial t][\delta DSR_{t_0}(\alpha_i, \beta_i)]$ at a known origin of time $t_0$; and (b) in-phase $\delta DSR_I (\alpha_i, \beta_i)$ and quadrature $\delta DSR_Q (\alpha_i, \beta_i)$ components of the sinusoidal oscillation of DSR correction, and hence (c) a general expression for $\delta DSR_t (\alpha_i, \beta_i)$ as a function of time t; and (iii) setting t=m, wherein $n \geq 4$.

9. The method of claim 8 wherein spatial interpolation of values $\delta DSR_m (\alpha, \beta)$ to generate a correction $\delta DSR_m, (\alpha, \beta)$ for a position $(\alpha, \beta)$ is carried out by the steps of:

(i) using the values $\delta DSR_m (\alpha_i, \beta_i)$ to obtain (a) a correction $\delta DSR_m (\alpha_0, \beta_0)$ at a known spatial origin $(\alpha_0, \beta_0)$; and (b) spatial rates of change of correction $\delta DSR_m$ at the origin $(\alpha_0, \beta_0)$;

(ii) using the results of (i) to obtain a general expression for $\delta DSR_m (\alpha, \beta)$ as a function of position $(\alpha, \beta)$; and (iii) evaluating $\delta DSR_m (\alpha, \beta)$ for a desired matrix position $(\alpha, \beta)$.

10. The method of claim 9 wherein the relays are comprised in respective satellites and said spatial rates of change are $$\frac{\partial}{\partial u_y} \delta DSR_m \bigg|_{\alpha_0, \beta_0} ; \frac{\partial}{\partial u_z} \delta DSR_m \bigg|_{\alpha_0, \beta_0} ,$$

$u_y$, $u_z$ being the y and z components respectively of a unit vector from the mean satellite position to a point on the ground in a coordinate system wherein the x axis passes through the centre of the Earth and the mean satellite position, the z axis passes through the centre of the Earth and the North Pole, and the y axis forms a right-handed set together with the x and z axes.

11. The method of claim 9 wherein N>4.

12. The method of claim 5 wherein corrections $\delta DSR_m$ ($\alpha$, $\beta$) to calculated values $\delta DSRR_m$ ($\alpha$, $\beta$) of differential slant range rate are established by the steps of:
 (i) temporally interpolating corrections $\delta DSRR_m$ ($\alpha_i$, $\beta_i$) (i=1 to N) for a time m for each of N ground-based reference transmitters having known locations ($\alpha_i$, $\beta_i$); and
 (ii) spatially interpolating a correction $\delta DSRR_m$ ($\alpha$, $\beta$) for a desired location ($\alpha$, $\beta$) using the N corrections generated in step (i), wherein N=3.

13. The method of claim 12 wherein temporal interpolation of a correction $\delta DSRR_m$ ($\alpha_i$, $\beta_i$) for the ith reference transmitter for time m is carried out by the steps of:
 (i) measuring and calculating differential slant range rate for said reference transmitter at a series of n times $t_j$ (j=1 to n) and taking the difference between corresponding measured and calculated values to generate a series of j known corrections $\delta DSRR_{t_j}$ ($\alpha_i$, $\beta_i$)(j=1 to n);
 (ii) using data generated in step (i) to obtain
  (a) the correction $\delta DSRR_{t_0}$ ($\alpha_i$, $\beta_i$) and rate of change of correction $[\partial/\partial t][\delta DSR_{t_0}(\alpha_i \beta_i)]$ at a known origin of time $t_0$; and
  (b) in-phase $\delta DSRR_I(\alpha_i, \beta_i)$ and quadrature $\delta DSRR_Q$ ($\alpha_i,\beta_i$) components of the sinusoidal oscillation of DSRR correction; and hence
  (c) a general expression for $\delta DSRR_t(\alpha_i, \beta_i)$ as a function of time t; and
 (iii) setting t=m, wherein n≧4.

14. The method of claim 13 wherein spatial interpolation of values $\delta DSRR_m(\alpha_i, \beta_i)$ (i=1 to N) to generate a correction $\delta DSRR_m$ ($\alpha$, $\beta$) for a position ($\alpha$, $\beta$) is carried out by the steps of:
 (i) using the values $\delta DSRR_m(\alpha_i, (\beta_i)$ to obtain
  (a) a correction $\delta DSRR_m(\alpha_0, \beta_0)$ at a known spatial origin ($\alpha_0, \beta_0$); and
  (b) spatial rates of change of correction $\delta DSRR_m$ at the origin ($\alpha_0, \beta_0$)
 (ii) using the results of (i) to obtain a general expression for $\delta DSRR_m(\alpha, \beta)$ as a function of position ($\alpha, \beta$) and;
 (iii) evaluating $\delta DSRR_m(\alpha, \beta)$ for a desired matrix position ($\alpha, \beta$).

15. The method of claim 14 wherein the relays are comprised in respective satellites and the spatial rates of change are $$\left.\frac{\partial}{\partial u_y}\delta DSRR_m\right|_{\alpha_0,\beta_0}; \left.\frac{\partial}{\partial u_z}\delta DSRR_m\right|_{\alpha_0,\beta_0},$$

$u_y$, $u_z$ being the y and z components respectively of a unit vector from the mean satellite position to a point on the ground in a coordinate system wherein the x axis passes through the centre of the Earth and the mean satellite position, the z axis passes through the centre of the Earth and the North Pole, and the y axis forms a right-handed set together with the x and z axes.

16. The method of claim 14 wherein N>3.

17. The method of claim 1 wherein measured values $DTO_m$ of differential time offset and/or measured values $DFO_m$ of differential frequency offset are obtained by converting corresponding measured values $DSR_m$ of differential slant range and corresponding values $DSRR_m$ of differential slant range rate respectively, or corresponding values $DSRR_m$ of differential slant range rate respectively.

18. The method of claim 1 wherein any measured values $DSRR_m$ and any calculated values $DSRR_m(\alpha, \beta)$ of differential slant range rate are respectively measured and calculated relative to the differential slant range rate of a ground-based calibration transmitter of known location with respect to the first and second signal relays and the first and second receivers.

19. The method of claim 1 wherein values of DTO and DFO for the unknown signal are obtained by cross-ambiguity function (CAF) processing, or DFO for the unknown signal are obtained by cross-ambiguity function (CAF) processing.

20. The method of claim 19 wherein a DTO and a coarse DFO for a reference signal from a reference transmitter are obtained by the steps of:
 (i) sampling the reference signal at the first and second receivers respectively at a series of times to generate first and second signal samples of the reference signal;
 (ii) applying a frequency offset to the second signal sample;
 (iii) applying each of a series of time offsets to the second signal samples and calculating a cross-ambiguity function (CAF) for the first and second signal samples for each time offset;
 (iv) applying further frequency offsets to the second signal samples and repeating step (iii) for each such offset; and
 (v) finding the values of time offset and frequency offset corresponding to the largest CAF value.

21. The method of claim 20 wherein a DTO and a DFO for the unknown signal are obtained by the steps of
 (i) sampling the unknown signal at the first and second receivers respectively at a series of times to generate pluralities first and second signal samples of the unknown signal;
 (ii) frequency-shifting and time-shifting the second signal sample with respect to the first by applying the coarse DFO and DTO of the reference signal; and
 (iii) evaluating the CAF for a series of time and frequency offsets.

22. A method of claim 19 wherein CAF processing of a signal is carried out by the steps of
 (i) sampling the signal at the first and second receivers respectively to generate first and second signal samples;
 (ii) dividing the first and second signal samples into first and second series of data blocks;
 (iii) taking a pair of data blocks, the pair having a first data block from the first series and a corresponding second data block from the second series;
 (iv) applying a frequency offset to data in the second data block;
 (v) transforming data in the first and second data blocks to the frequency domain by applying a FFT;
 (vi) applying a time offset to data in the second data block;
 (vii) multiplying the complex conjugate of data in the first block and corresponding data in the second block to form a third block of data;
 (viii) transforming data in the third block into the time domain by applying an inverse FFT to each block; and (ix) repeating steps (iii) to (viii) for remaining pairs of data blocks, each pair having a first data block from the first series and a corresponding second data block from the second series.

23. The method of claim 1 further comprising the steps of:
(i) for each of a series of times m, sampling the unknown signal at first and second receivers via first and second signal relays respectively;
(ii) generating a corresponding series of m CAF surfaces;
(iii) for a given latitude $\alpha$ and longitude $\beta$, computing differential time and frequency offsets $DTO_m$, $DFO_m$ at each time m, finding the associated CAF surface value $CAF_m$ at each time m, and corresponding values $SNR_m$ of signal-to-noise ratio; and
(iv) evaluating the chi-squared value $$\chi^2(\alpha, \beta) = -\sum_m SNR_m CAF_m.$$

24. The method of claim 1 further comprising the steps of (i) applying a weighting factor of a low linear level to points outside a window surrounding the peak on a CAF surface generated from samples of the signal originating at a given position, to generate a modified CAF function;
(ii) applying an FFT to the frequency domain and an inverse FFT to the time domain of the modified CAF function and a CAF function generated from samples of the unknown signal to generate surfaces $\tilde{A}_R(f,t)$, $A_U(f,t)$ respectively;
(iii) generating the product function $p(f,t) = \tilde{A}_R^*(f,t) A_U(f,t)$;
(iv) applying to the function $p(f,t)$ an inverse FFT to the delay domain and an FFT to the frequency domain to generate a normalised CAF; and
(v) using the normalised CAF to find time- and frequency-difference of arrival for the unknown signal and measurement errors associated therewith.

25. The method of claim 1 wherein CAF processing includes the steps of:
(i) introducing a variable delay into time-offsets used to calculate a CAF function; and
(ii) estimating a total phase for respective signal paths via the first and second signal relays at specific block times based on the given position.

26. A computer program for performing the method according to claim 1.

27. The method of claim 4 wherein the calculated values $DTO_m(\alpha, \beta)$ and/or $DFO_m(\alpha, \beta)$, as the case may be, are calculated by the steps of:
(iv) calculating corresponding values $DSR_m(\alpha, \beta)$ of differential slant range and corresponding values $DSRR_m(\alpha, \beta)$ of differential slant range rate using knowledge of the relays' positions and velocities, or corresponding values $DSR_m(\alpha, \beta)$ of differential slant range or corresponding values $DSRR_m(\alpha, \beta)$ of differential slant range rate using knowledge of the relays' positions and velocities;
(v) applying respective corrections to values calculated in step (i) to account for ephemeris errors;
(vi) (iii) converting the corrected values generated in step (ii) to values of differential time offset $DTO_m(\alpha, \beta)$ and differential frequency offset $DFO_m(\alpha, \beta)$, or differential frequency offset $DFO_m(\alpha, \beta)$ as the case may be.

28. The method of claim 7 wherein temporal interpolation of a correction $\delta DSR_m(\alpha_i, \alpha_i)$ for the ith reference transmitter for time m is carried out by the steps of:
(iii) measuring and calculating differential slant range for said reference transmitter at a series of n times $t_j$ (j=1 to n) and taking the difference between corresponding measured and calculated values to generate a series of j known corrections $\delta DSR_m(\alpha_i, \beta_i)$ (j=1 to n);
(iv) using data generated in step (i) to obtain
(a) the correction $\delta DSR_{t_0}(\alpha_i, \beta_i)$ and rate of change of correction $[\partial/\partial t][\delta DSR_{t_0}(\alpha_i, \beta_i)]$ at a known origin of time $t_0$; and
(b) in-phase $\delta DSR_I(\alpha_i, \beta_i)$ and quadrature $\delta DSR_Q(\alpha_i, \beta_i)$ components of the sinusoidal oscillation of DSR correction, and hence
(c) a general expression for $\delta DSR_t(\alpha_i, \beta_i)$ as a function of time t; and
(iii) setting t=m, wherein n≧4.

29. The method of claim 10 wherein N>4.

30. The method of claim 15 wherein N>3.

* * * * *